United States Patent
Michelman

(10) Patent No.: US 7,328,366 B2
(45) Date of Patent: Feb. 5, 2008

(54) METHOD AND SYSTEM FOR RECIPROCAL DATA BACKUP

(75) Inventor: Eric Michelman, Bellevue, WA (US)

(73) Assignee: Cascade Basic Research Corp., Bellevue, WA (US)

( * ) Notice: Subject to any disclaimer, the term of this patent is extended or adjusted under 35 U.S.C. 154(b) by 483 days.

(21) Appl. No.: 10/838,293

(22) Filed: May 4, 2004

(65) Prior Publication Data
US 2004/0260973 A1 Dec. 23, 2004

Related U.S. Application Data

(60) Provisional application No. 60/495,697, filed on Aug. 15, 2003, provisional application No. 60/476,594, filed on Jun. 6, 2003.

(51) Int. Cl.
*G06F 11/00* (2006.01)
(52) U.S. Cl. .......................... 714/6; 711/162
(58) Field of Classification Search ............ 714/6; 711/162
See application file for complete search history.

(56) References Cited

U.S. PATENT DOCUMENTS

| | | | |
|---|---|---|---|
| 6,065,062 A * | 5/2000 | Periasamy et al. ........... 709/242 |
| 6,430,611 B1 * | 8/2002 | Kita et al. .................. 709/223 |
| 6,728,751 B1 * | 4/2004 | Cato et al. .................. 709/202 |
| 7,100,077 B2 * | 8/2006 | Saika .......................... 714/15 |
| 7,117,397 B1 * | 10/2006 | Kondo et al. .................. 714/48 |
| 2004/0153458 A1 | 8/2004 | Noble et al. .................. 707/10 |
| 2004/0260973 A1 * | 12/2004 | Michelman .................. 714/13 |
| 2005/0012770 A1 * | 1/2005 | Endo ............................ 347/19 |
| 2005/0021950 A1 * | 1/2005 | Rothbarth et al. .......... 713/165 |
| 2005/0050227 A1 * | 3/2005 | Michelman .................. 709/245 |
| 2005/0071390 A1 * | 3/2005 | Midgley et al. ............. 707/204 |
| 2005/0081008 A1 * | 4/2005 | Gold et al. .................. 711/162 |
| 2005/0131996 A1 * | 6/2005 | Mastrianni et al. ......... 709/203 |
| 2005/0193238 A1 * | 9/2005 | Golasky et al. ............... 714/6 |
| 2006/0190692 A1 * | 8/2006 | Yamagami ................... 711/162 |
| 2006/0195616 A1 * | 8/2006 | Petersen ..................... 709/250 |
| 2006/0236062 A1 * | 10/2006 | Boss et al. .................. 711/170 |

OTHER PUBLICATIONS

Batten et al., "pStore: A Secure Peer-to-Peer Backup System," *MIT 6.824*, pp. 1-12, Dec. 2001.

(Continued)

*Primary Examiner*—Christopher McCarthy
(74) *Attorney, Agent, or Firm*—Seed IP Law Group PLLC

(57) ABSTRACT

Methods and systems for a reciprocal backup of data, including files, directories, and application data are provided. Example embodiments provide a Reciprocal Backup System ("RBS"), which enables users of two or more computer systems connected over a network to engage each other for automated reciprocal backup needs using peer-to-peer computing techniques. The peer computer systems negotiate a reciprocal backup relationship where each provides the other with backup storage in a secure fashion. The intermittent nature of some partners is handled automatically by the RBS, which supports fully automated and scheduled backups as well as immediate backup and restoration of data objects. In one embodiment, the RBS comprises reciprocal backup system partner support and one or more storage repositories. The RBS partner support includes a reciprocal backup manager and scheduler and a reciprocal backup agent. These components cooperate to provide the backup and restoration operations of the RBS.

241 Claims, 32 Drawing Sheets

Reciprocal Backup System

OTHER PUBLICATIONS

Cox et al., "Pastiche: Making Backup Cheap and Easy," *OSDI 2002*, Dec. 2002.

Elnikety et al., "Peer-to-Peer Cooperative Backup System," *WIPS 2002*, Jan. 2002.

Psaila, "Secure P2P Backup System," URL=http://www.thesisabstracts.com/articles/publish/printer85.shtml, download date Jan. 9, 2005.

312 Inc.: LeanOnMe, URL=http://www.312inc.com/3_sol_prod_LOM.html, download date Jan. 9, 2005.

Pensamos Digital: Magic Mirror Backup, URL=http://www.pensamos.com/mmb, download date Jan. 9, 2005.

Vembu StoreGrid, URL=http://www.vembu.com/storegrid/desktop-backup.html, download date Jan. 9, 2005.

* cited by examiner

METHOD AND SYSTEM FOR RECIPROCAL DATA BACKUP

BACKGROUND OF THE INVENTION

1. Field of the Invention

The present invention relates to methods and systems for backing up and restoring data on computer systems connected by a network and, in particular, to methods and systems for reciprocal data backup between backup partners using peer-to-peer computer communications.

2. Background Information

As computers become used more frequently in everyday life, as well as for business and social functions, the reliability of computer systems has greater impact. Data may be lost for a variety of reasons, including due to a physical problem with the computer system disk drive or related components; the user inadvertently overwriting or deleting a file, theft (especially with portable computers), or the user intentionally overwriting a file (e.g. modifying it and saving it) and then later desiring an earlier version of the file. The need to reliably and frequently save copies of data in various states of modification so that they can be restored when necessary has become an ever-increasingly important part of our on-line and computerized existence.

The process of saving data, typically known as "backing up" data, is often neglected for a variety of reasons, including cost, time, effort, reliability, capacity limitations, and others. Traditional approaches for backing up data fall into three categories: 1) copying data to removable and storable media, such as diskettes, CDs, tape, and DVDs; 2) copying data to secondary (non-removable) media on the same system; and 3) copying the data to on-line servers or other storage available over a network, which can be performed automatically at scheduled intervals or periodically upon request.

Each of these approaches has drawbacks. The first approach of copying to removable media is limited in a large part by the inconvenience to the user and physical constraints of the media. Specifically, it takes time and effort to: a) make sure blank storage (disk, CD, tape, DVD, etc.) is available and ready prior to a backup; b) find and run the backup program; c) wait for it to "write" the media, which for CDs and DVDs can take most of an hour; d) be available to switch out media if the backup requires more capacity; and e) label the newly written media and store it somewhere safe. In addition, removable backup media is particularly vulnerable to loss, defects, or damage, rendering a portion or all of the stored data unreadable or unusable. For example, such media is rarely stored in a secure place, such as a bank's safe-deposit box, because it is not practical to do so after every backup. In practice, removable media are stored around a house or office, leaving them susceptible to misplacement, fire, theft, and accidents. Also, backup media such as diskettes, CDs, and DVDs suffer from limited capacity, generally far less than the amount of data that can be stored on a personal computer's disk drive and hence the amount required to fully back up an entire computer system. A tape or additional hard disk drives may be used to solve the capacity problem, but these in turn are very costly.

The second approach of copying to resident secondary media, such as additional hard disk drives, provides very limited reliability and is more costly, although it addresses the capacity problem. Specifically, if the entire computer system becomes vulnerable, merely having another copy of the data on the same machine will rarely provide a reliable backup mechanism. If however, data is lost due to user overwrite, or if one of the drives fails, redundant copies of data may allow restoration of an earlier version of a desired file. In addition, this approach suffers from similar problems to the first approach with respect to running a backup program, keeping track of where redundant copies have been made, etc., and thus requires a lot of proactive involvement from users.

The third approach of copying to on-line servers is limited primarily by expense, reliability, and accountability. Although copying files to on-line servers may be less cumbersome than using removable media, especially if the task is performed automatically, on-line backup service is generally expensive even for relatively small amounts of storage. Also, online servers are sometimes "off-line," rendering the stored data inaccessible for restoration, and occasionally lose data due to malfunctions or software bugs. In addition, many on-line services companies have gone out of business and ceased operations in the past years because such servers are expensive to maintain. The stored data may well then be unavailable permanently.

BRIEF SUMMARY OF THE INVENTION

Embodiments of the present invention provide enhanced computer- and network-based methods and systems for backup and restoration of data. Example embodiments provide a Reciprocal Backup System ("RBS"), which enables the users of two or more computer systems connected over a network to engage each other for reciprocal backup needs using peer-to-peer computing techniques. The RBS allows users to backup data on each other's computer systems in a secure manner that allows each user access to only that user's files. In addition, users can achieve a range of control over the backup process from fully automated all the way to specifying particular data to be backed up or restored upon explicit request. Through the reciprocal sharing of space on each other's disk drives, backup storage is available at little effort and no cost other than the loss of use of that disk space.

In one example embodiment, the Reciprocal Backup System comprises one or more functional components/modules that work together to provide reciprocal backup. For example, a Reciprocal Backup System may comprise Reciprocal Backup System Partner Support and one or more storage repositories. The RBS Partner Support comprises two subcomponents, a reciprocal backup manager and scheduler and a reciprocal backup agent. These components are present on each computer system that participates in a reciprocal backup relationship. The manager and scheduler controls the overall flow of the RBS through reciprocal backup engine and the scheduling of tasks that are completed by the reciprocal backup agent. The reciprocal backup agent fields all requests from backup partners, including the depicted reciprocal backup system, and interfaces to the storage repositories.

According to one approach, a reciprocal backup system provides support for a first backup partner to establish a reciprocal backup relationship with a second backup partner. Once the reciprocal relationship is established, either of the partners can cause data to be backed up to the other partner computer system's storage facilities, automatically or on a controlled basis. Similarly, either of the partners can request data for restoration purposes. Each backup partner serves as an originating partner when it requests performance of backup and restoration operations and serves as a depository partner for receiving data and servicing restoration requests from other reciprocal partners. A reciprocal backup relationship supports both even and uneven exchanges of storage. In one embodiment, the partners negotiate acceptable reciprocal storage.

According to another approach, the RBS automatically handles backup partners that are intermittently connected to the network, either both or one. In some instances, the data is cached to provide snapshots of the data and then delivered when the designated depository partner computer system reconnects to the network. The RBS also handles backup partner computer systems that have persistent connections, and those that have persistent connections but are unavailable at a particular time.

In another embodiment, interfaces to the functions of the RBS are provided for application programs to use for backup and restoration of data.

DETAILED DESCRIPTION OF THE INVENTION

Figure 1:
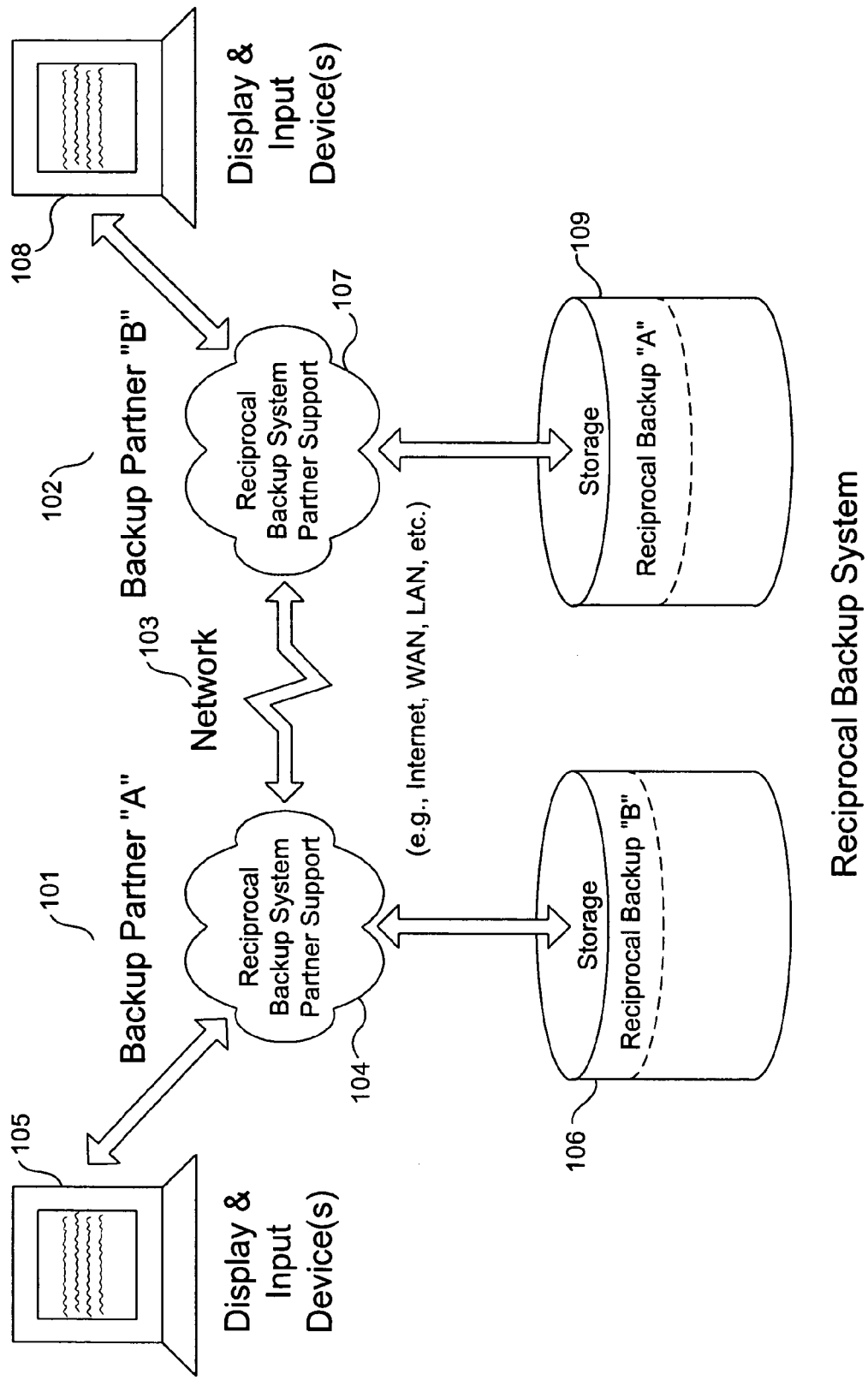
FIG. 1 is a block diagram of an example Reciprocal Backup System.

Embodiments of the present invention provide enhanced computer- and network-based methods and systems for backup and restoration of data. Example embodiments provide a Reciprocal Backup System ("RBS"), which enables the users of two or more computer systems connected over a network to engage each other for reciprocal backup needs using peer-to-peer computing techniques. The RBS allows users to backup data on each other's computer systems in a secure manner that allows each user access to only that user's files. In addition, users,can achieve a range of control over the backup process from fully automated all the way to specifying particular data to be backed up or restored upon explicit request. Through the reciprocal sharing of space on each other's disk drives, backup storage is available at little effort and no cost other than the loss of use of that disk space.

The Reciprocal Backup System allows for users to participate in backup arrangements with one or more computer systems over a network in a manner that automates the backup process, while still providing users with control over what data is backed up, what data is restored, and when backups and/or restorations are performed. In addition, the RBS allows users to set up complex arrangements for controlling redundancy in particular fashions so that data can be redundantly backed up to multiple computers and restored selectively.

For example, a user might be willing to allocate a 10% portion of the user's computer system disk drive to each of three friends or colleagues (allocating a total of 30% of the disk drive's capacity for backup). In return, the user would receive equal amounts of backup storage on the three friend's computers' disk drives. The user could then use the backup storage on the multiple other computers in different ways: (1) to backup different data files to different computers, or (2) to back up the same data to multiple different computers, to achieve triple redundancy of, for example, sensitive data. Of course, mixing and matching are possible, backing up some data multiple times and other data just once. In some embodiments, the reciprocal backup storage may be allocated unevenly or even paid for.

For the purposes of the methods and systems of the present invention, the phrases "reciprocal backup arrangement" or "reciprocal backup relationship" refer to a dynamically established arrangement between two peer computer systems present on a network where each computer system provides the other with backup facilities. Each computer system that participates in the reciprocal backup relationship (and/or its user) is also referred to as a "backup partner." There may be multiple reciprocal backup arrangements between different computer systems, each relationship of which defines its own backup storage amounts and schedule. Each arrangement may comprise even or uneven amounts of storage between the partners, and negotiations for storage are addressed when the arrangement/relationship is created. The network may be an external network, such as the Internet, or an internal network, such as a LAN, within a business or residence.

Specifically, each computer system (backup partner) provides storage for backup and is capable of storing data from the other partner and providing previously stored data to the other partner (restoring data) by sending data directly to and receiving data directly from the other computer system. In a reciprocal backup system, the peer computer systems may use some type of naming server (centralized or decentralized) to locate each other, but communicate directly with each other over the network to exchange or transfer actual data. Data is transferred directly from one computer system to another using "peer-to-peer" technology, without requiring an intervening server. Peer-to-peer technology and background information on peer-to-peer computing is described further in Oram, Andy, *Peer to Peer: Harnessing the Benefits of a Disruptive Technology*, O'Reilly and Assocs., Inc., 2001, which is incorporated herein by reference in its entirety. The reciprocal backup and restore operations in such a peer-to-peer arrangement take into account the potentially variable presence of the participating computer systems, such as intermittent and unavailable connections. In some cases, an intermediate "caching" server may be used by the RBS to cache requests and data. Later, when the other computer then comes on line, the caching server then transfers the request or data.

FIG. 1 is a block diagram of an example Reciprocal Backup System. In FIG. 1, Backup Partner A (101) is connected via network 103 to Backup Partner B (102). The network 103 may be any network or communications media, wired and wireless, including, for example, Internet, another WAN, a LAN, or a proprietary connection that abides by a standard peer-to-peer communications protocol. Backup Partner A (101) comprises display and input devices 105, RBS partner support (software, hardware, or a combination of both) 104, and storage device(s) 106, where the reciprocal backup storage for Backup Partner B (102) resides. Similarly, Backup Partner B (102) comprises display and input devices 108, RBS partner support (software, hardware, or a combination of both) 107, and storage device(s) 109, where the reciprocal backup storage for Backup Partner A (101) resides. When storage is provided in a reciprocal backup relationship, the storage provided by a resident system for other backup partners is termed reciprocal backup storage. As shown in FIG. 1, the allocated storage for each side of the reciprocal backup arrangement may be uneven. In this example, the reciprocal backup storage for Backup Partner B (102) on storage device 106 appears less than the reciprocal backup storage for Backup Partner A (101) on storage device 109.

Figure 2:
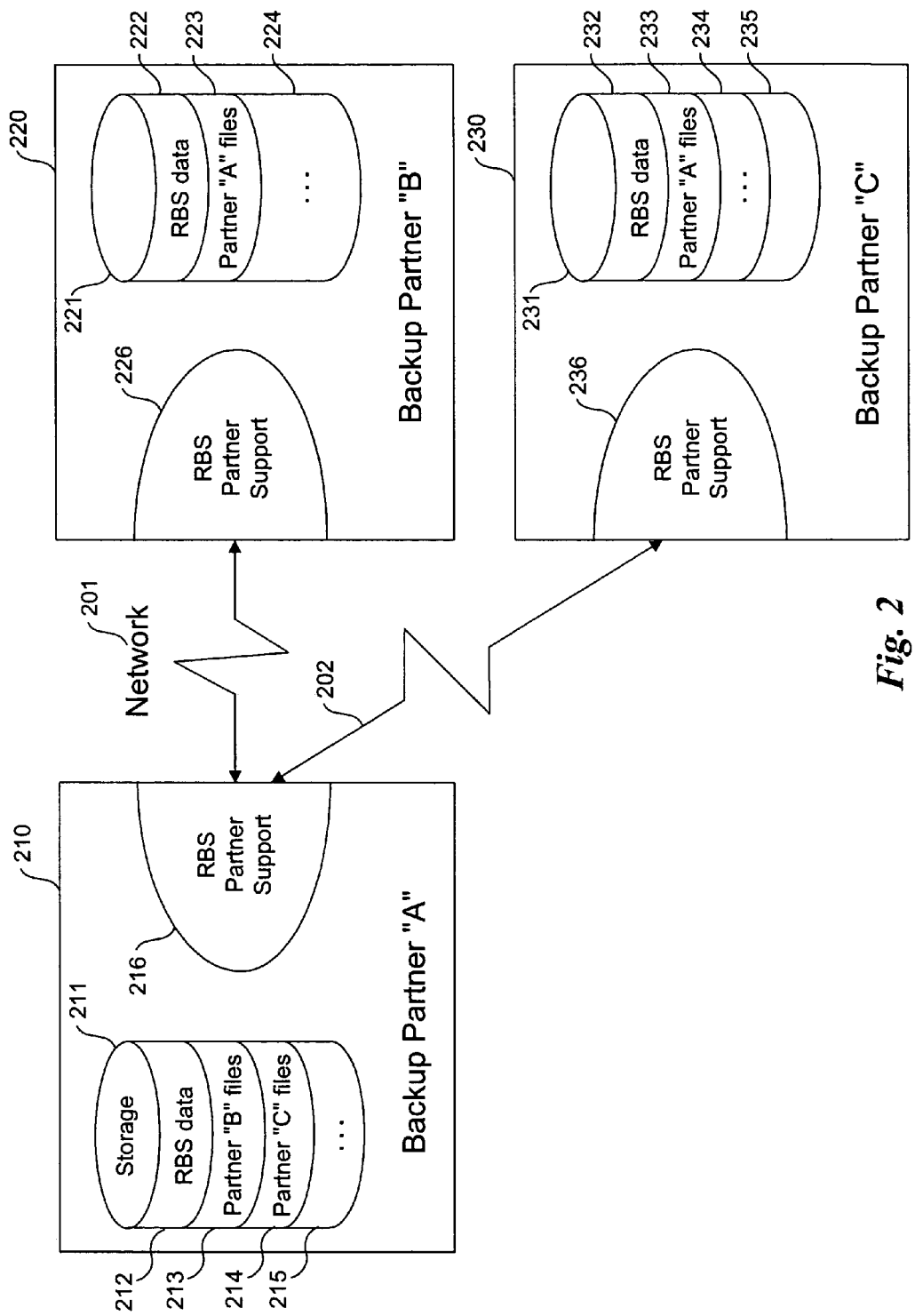
FIG. 2 is a block diagram of multiple computer systems providing reciprocal backup services to each other.

FIG. 2 is a block diagram of multiple computer systems providing reciprocal backup services to each other. Such an arrangement may be desirable to achieve redundant backup or to efficiently allocate backup storage across different computer systems. For example, in FIG. 2, Backup Partner A (210) has established reciprocal backup relationships with both Backup Partner B (220) and Backup Partner C (230). There may also be reciprocal backup relationships between Backup Partner B (220) and Backup Partner C (230), which are not shown. As described, each backup partner creates reciprocal backup storage, whether or not the storage is the same size or not. (Note that one skilled in the art will recognize that storage of size "0" could also be allowed, thus reducing the reciprocity to effectively one way storage, but still allow the automated techniques in a peer-to-peer environment to be utilized.) Thus, in return for Partners B (220) and C (230) providing backup storage for the data of Backup Partner A (210) in areas 223 and 233, respectively, the storage 211 of Partner A (210) has reciprocally allocated storage 213 for the data of Partner B (220) and storage 214 for the data of Partner C (230). The storage device of each backup partner may store additional RBS data such as RBS data 212, 222, and 232.

Figure 3:
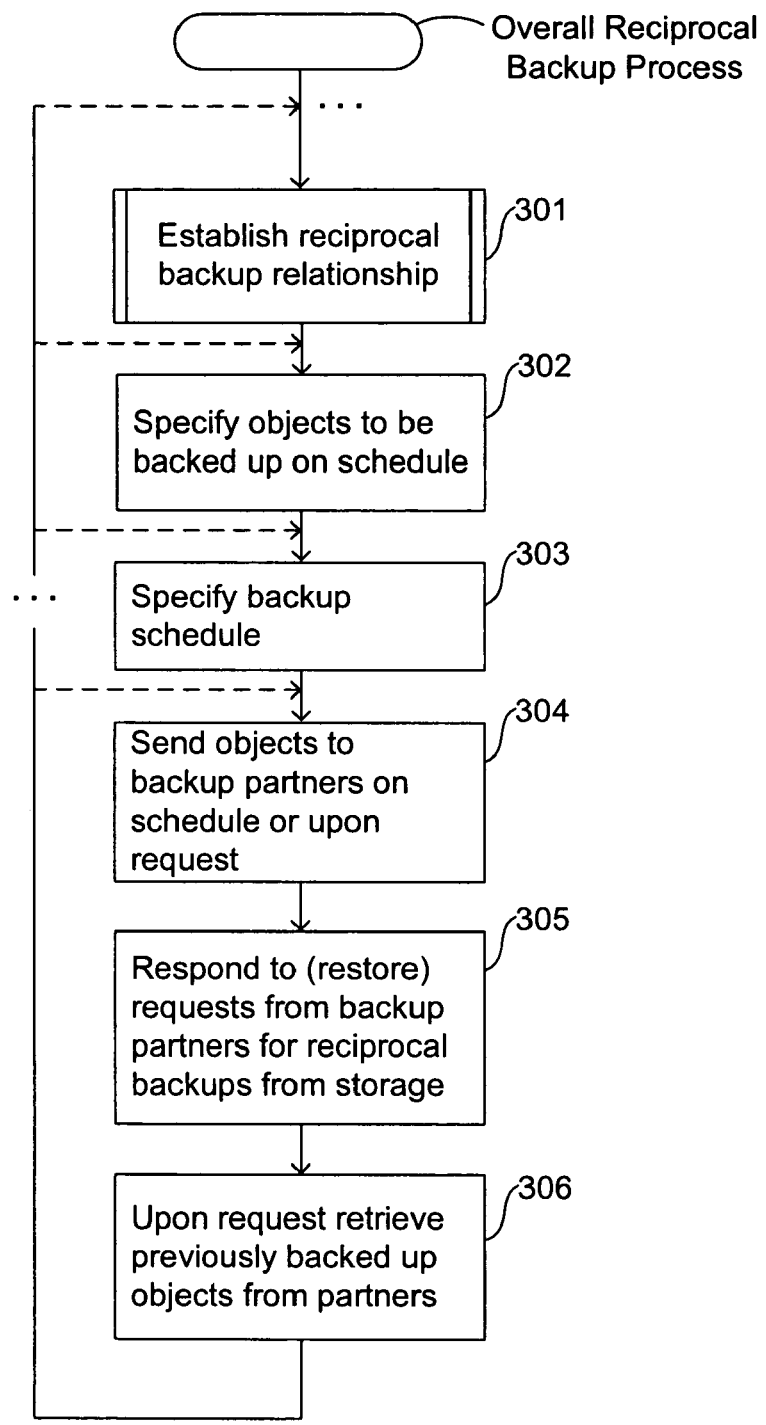
FIG. 3 is an example flow diagram of an overview of the reciprocal backup process.

In overview, the RBS includes services that achieve a computer-implemented reciprocal backup process by allowing users through their computer systems to establish reciprocal backup relationships and by carrying out through the backup partner computer systems reciprocal backup and restoration operations. FIG. 3 is an example flow diagram of an overview of the reciprocal backup process. Each step of FIG. 3 is presumed to be executed on each backup partner computer system. In step 301, one or more reciprocal backup relationships are established. An example interface and process for establishing a reciprocal backup relationship with another computer system is described with respect to FIGS. 6, 7A, and 7B. In one embodiment, the relationship storage requirements are negotiated between the backup partners. The timing of establishing or negotiating the storage arrangements may be separate from initial establishment of the relationship. In some embodiments, the reciprocal relationship is established initially, and the storage requirements are negotiated thereafter, in one or more operations, periodically, or on an ongoing basis. In other embodiments, the storage requirements as requested are accepted when the relationship is accepted. If a reciprocal backup relationship is ultimately declined, then the process goes no further with that other computer system at that time.

In step 302, a backup partner specifies data (e.g., files) that are to be backed up on a scheduled basis, and in step 303, the backup partner specifies the backup schedule for that data. There may be a separate data selection and time schedule for each reciprocal backup relationship. The selection of data and scheduling of backup times is further described with reference to FIGS. 8 and 9.

When a backup partner (e.g., Backup Partner A 210 in FIG. 2) backs up data to a backup partner's computer (e.g., Backup Partner B 220 in FIG. 2), the initiating partner (Partner A 210) is called the "originating backup partner" or "originating partner" and the receiving partner (Partner B 220) is called the "depository partner" or "depository backup partner." Note that these roles change depending on the operation—given the inherent reciprocity, Partner A is the originating partner for Partner A's data and the depository partner for Partner B's data; yet Partner B is the originating partner for Partner B's data and the depository partner for Partner A's data. Thus, these terms are used in the context of a particular transaction and a backup partner acts in both roles.

In step 304, the backup partner (in its role as originating partner) sends data to a determined other backup partner (in the other partner's role as depository partner) when the schedule so indicates or upon request from a user. In step 305, the backup partner (in its role as depository partner) responds to requests from other backup partners to retrieve and send back previously backed up data for restoration purposes. In step 306, the backup partner (in its role as originating partner) requests previously backed up data to perform its own restorations upon (e.g., user) request. One process of selecting data to be restored is described further with respect to FIG. 10. Note that steps 302-306 are repeated as needed by each backup partner and although files must be backed up before they can be restored, these steps can otherwise happen in any order, not just the order illustrated in FIG. 3. Also part of the overall process, but not shown, is a step of removing a backup partner. The removal of a backup partner, hence ending a reciprocal backup relationship, is described further with respect to FIG. 11.

Although the techniques of reciprocal backup and the Reciprocal Backup System are generally applicable to any type of backup for archival, emergency, or other purposes, the phrase "backup" is used generally to imply any type of backup process for any purpose, whether or not the restoration of data is needed. Also, the examples described herein refer typically to the backup and restoration of "files;" however, it will be understood by one skilled in the art that the methods and techniques presented here are also applicable and may be useful to backup and restore other data, such as data belonging to and structured by application programs. One skilled in the art will recognize how to modify the structures and program flow exemplified herein to account for differences in types of data being backed up and restored. Essentially, the concepts and techniques described are applicable to any environment where the backup and/or restoration of data is contemplated. Also, although certain terms are used primarily herein, one skilled in the art will recognize that other terms could be used interchangeably to yield equivalent embodiments and examples. In addition, terms may have alternate spellings which may or may not be explicitly mentioned, and one skilled in the art will recognize that all such variations of terms are intended to be included. Also, when referring to various data, aspects, or elements in the alternative, the term "or" is used in its plain English sense, unless otherwise specified, to mean one or more of the listed alternatives.

Figure 4:
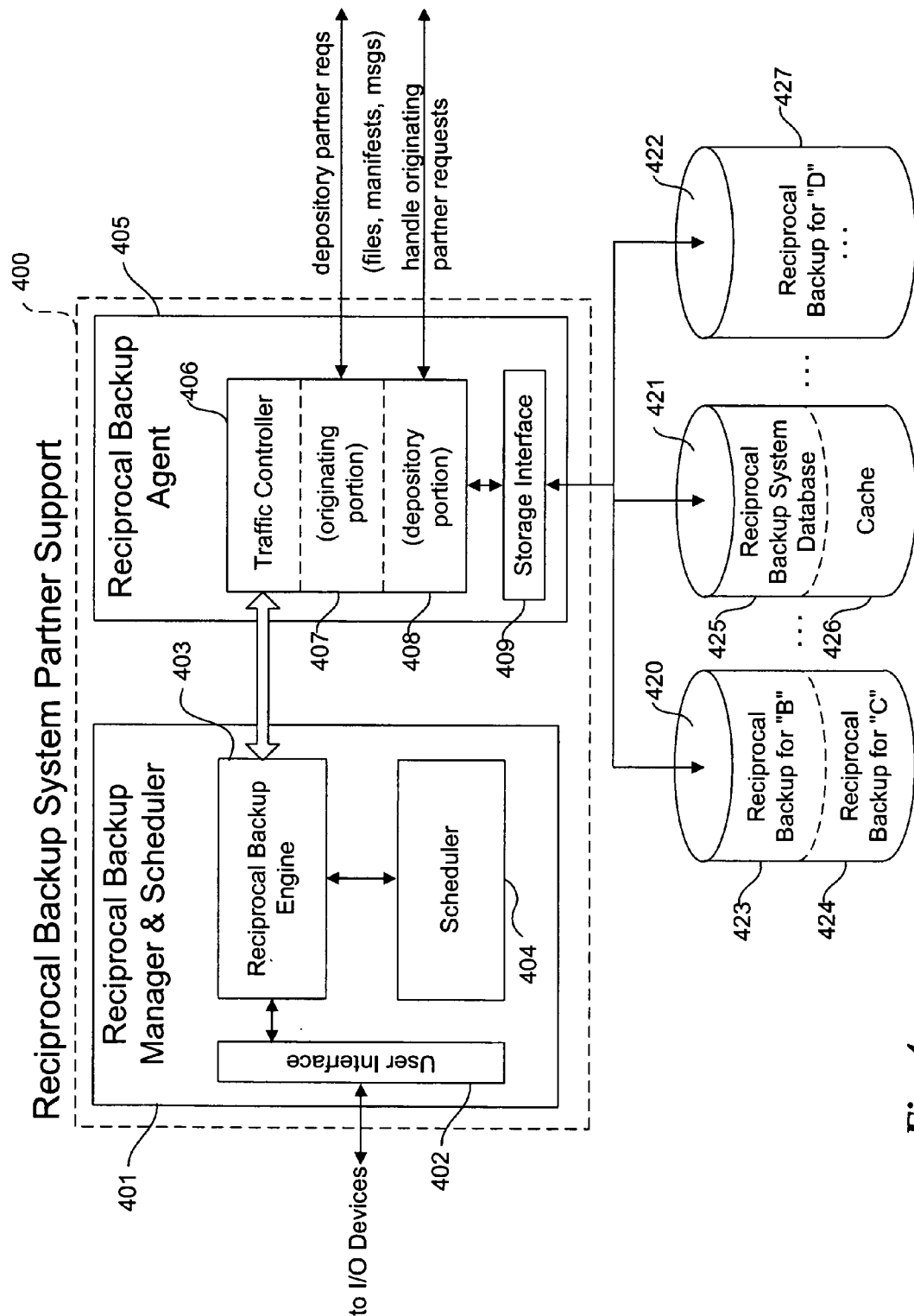
FIG. 4 is an example block diagram of components of a Reciprocal Backup System.

FIG. 4 is an example block diagram of components of a Reciprocal Backup System. In one embodiment, the Reciprocal Backup System comprises one or more functional components/modules that work together to provide reciprocal backup. One skilled in the art will recognize that these components may be implemented in software or hardware or a combination of both. In FIG. 4, a Reciprocal Backup System comprises Reciprocal Backup System Partner Support 400 and one or more storage repositories 420-422. One skilled in the art will recognize that many alternate arrangements, architectures, modules, etc. exist for implementing the components of an RBS, and still provide equivalent function. For example, the modules may be combined differently, or different functions associated with different modules.

In one embodiment, the RBS Partner Support 400 comprises two subcomponents, a reciprocal backup manager and scheduler 401 and a reciprocal backup agent 405. These components are present on each computer system that participates in a reciprocal backup relationship. The manager and scheduler 401 controls the overall flow of the RBS through reciprocal backup engine 403 and the scheduling of tasks that are completed by the reciprocal backup agent 405. The reciprocal backup agent 405 fields all requests from backup partners, including the depicted system, and interfaces to the storage repositories 420-422.

More specifically, the reciprocal backup manager and scheduler 401 comprises user interface 402, reciprocal backup engine 403, and scheduler 404. The backup engine 403 interfaces to the user through user interface 402 to determine directives (operations or requests) that correspond to the user input and communicates these corresponding requests to the reciprocal backup agent 405. The engine 403 also interfaces with a scheduler 404 to generate corresponding requests to the reciprocal backup agent 405 upon receiving indications from the scheduler 404 of scheduled events, such as a prescheduled backup operation.

The reciprocal backup agent 405 is responsible for the communication between the depicted system and any of its backup partners. The backup agent 405 comprises a traffic controller 406 and a storage interface 409. Specifically, the traffic controller 406 receives requests (or other directives) from the manager and scheduler 401 as well as from the backup partners of the depicted system. Traffic controller 406 also generates requests (or other directives) to the other backup partners on behalf of the depicted computer system. The traffic controller 406 thus contains an originating portion 407 and a depository portion 408, which correspond to the originating partner and depository partner roles of the depicted system, as described above. The traffic controller 406 contacts the resident manager and scheduler 401 when needed, such as for modifying the relationship parameters between the depicted system and one of the partners. Also, the traffic controller 406, through storage interface 409, handles requests by storing and retrieving data as specified in the received requests.

The storage repositories 420-422 are used, among other things, to store the reciprocal backup for backup partner systems of the depicted system. For example, the depicted system is shown as having reciprocal backup relationships with at least three other backup partners: Partner B, Partner C, and Partner D. Thus, repository 420 contains allocated reciprocal backup area 423 for Partner B and area 424 for Partner C. Similarly, repository 422 contains allocated reciprocal backup area 427 for Partner D. Repository 421 contains the database (or other repository) for storing information for the RBS, such as lists of current backed up files on the various backup partner systems, as well as other information related to maintaining the backup relationships. In addition, repository 421 may contain a local cache for storing snapshots of data when one of the backup partners are unavailable, instead of the depicted partner using a caching server on a separate computer system. One skilled in the art will recognize that the use of any of these areas of the data repositories for a particular purpose is exemplary and many other configurations are contemplated.

Example embodiments described herein provide applications, tools, data structures and other support to implement a Reciprocal Backup System to be used for peer-to-peer backup facilities. One skilled in the art will recognize that other embodiments of the methods and systems of the present invention may be used for other purposes, including being integrated into more conventional (non-peer-to-peer) automated backup systems. In the following description, numerous specific details are set forth, such as data formats and code sequences, etc., in order to provide a thorough understanding of the techniques of the methods and systems of the present invention. One skilled in the art will recognize, however, that the present invention also can be practiced without some of the specific details described herein, or with other specific details, such as changes with respect to the ordering of the code flow.

In one example embodiment, the RBS is invoked by executing an application program on the computer system. Other example embodiments execute the RBS as part of the operating system, or embedded into some other application environment. FIGS. 5-11 describe an example user interface for interacting with a Reciprocal Backup System as an application program. One skilled in the art will recognize that many other interfaces are contemplated to provide reciprocal backup functionality.

Figure 5:
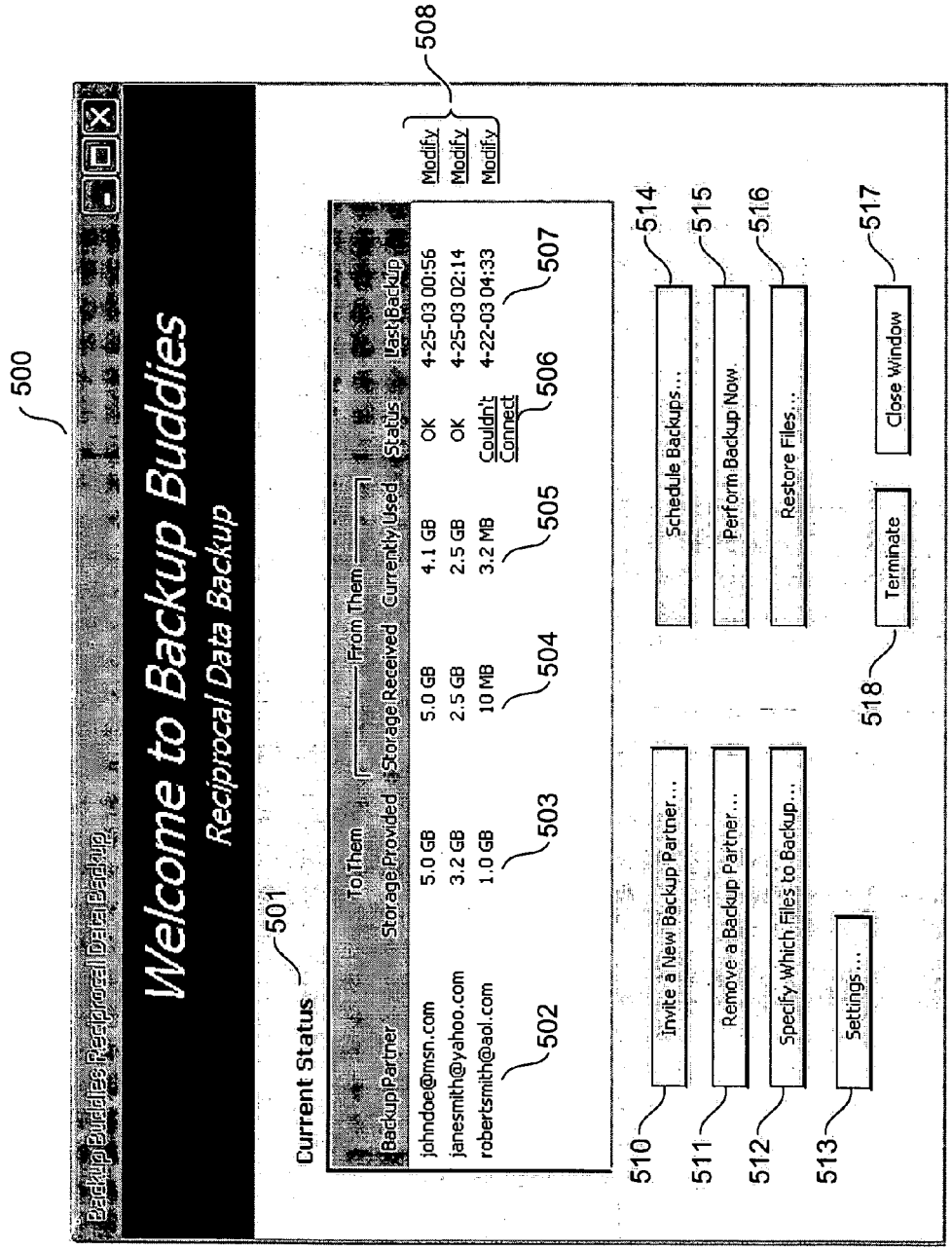
FIG. 5 is an example screen display of a user interface for managing a Reciprocal Backup System.

FIG. 5 is an example screen display of one such user interface for managing a Reciprocal Backup System. Application window 500 shows an application "Backup Buddies" executing in a Microsoft Windows™ environment. One skilled in the art will recognize that comparable applications can be executed in alternative operating system environments, such as Red Hat's Linux operating system. The Backup Buddies interface provides a current status window 501 and buttons 510-16 for invoking the various commands of the RBS. The application window 500 is closed upon selecting the Close button 517, although the Backup Buddies application continues to execute. To terminate the application, a user selects the Terminate button 518.

The current status window 501 shows status information for each backup partner 502 of the depicted system. For each partner, status window 501 provides an indication of the amount of data storage 504 provided on the backup partner system and an indication of the amount of reciprocal data storage 503 provided on the depicted system. In addition, the status window 501 indicates how much of the data storage on the backup partner system is currently used (excluding purgable data) in field 505. The status window 501 also indicates the status of the last RBS operation or awaited operation in status field 506 and when the last backup occurred in field 507. For example, status field 506 may be used to indicate whether the reciprocal backup system is currently waiting for a connection with the backup partner, whether the backup was successful, or if a problem was detected with the data stored, etc. In one embodiment, if a problem is indicated, the indicator is underlined and functions as a link (see, for example, third entry in status field 506), such that when the user selects it, a window is displayed to display more information about the problem and, as appropriate, options for addressing it.

The commands supported by the RBS shown in application window 500 include the ability to establish a reciprocal backup relationship by selecting button 510; remove a backup partner by selecting button 511; specify a set of data (files) to be backed up by selecting button 512; schedule backups by selecting button 514; perform a backup now (without waiting for a scheduled time) by selecting button 515; restore designated previously backed up data (files) by selecting button 516; and change various RBS settings by selecting button 513.

The RBS also allows a user also to modify a reciprocal backup relationship with a current backup partner by selecting the appropriate "modify" field 508 that corresponds to status information for a particular backup partner in current status window 501. When a modify field 508 is selected, a dialog similar to that used to establish the initial reciprocal backup relationship is provided for renegotiating features of the existing relationship, as well as for specifying additional functionality, such as partner specific settings as described below. A description of the process for establishing the initial reciprocal backup relationship, which is similar to the process for subsequently modifying the relationship, is described with reference to FIGS. 6, 7A, and 7B.

In one embodiment of the RBS, data to be backed up on a backup partner computer system is first encrypted to insure security of the stored data. Each backup partner computer system supplies its own encryption key to use for its own data. That is, the originating partner chooses the encryption key to be used on data that is stored on the depository partner's computer. The RBS supports any operable scheme for selecting an encryption key. For example, keys can be automatically chosen by the RBS; the user may choose individual key parameters, such as key length and trading encryption/decryption time against security strength, etc.; different keys may be used for each depository partner, or with each backup operation, or at specific time intervals, or immediately; or the user may choose to not encrypt backup data at all, or with selected partners but not others. One skilled in the art will recognize that other schemes may also be supported.

According to one scheme, to set the encryption key, the user invokes the change settings command by selecting the button 513. A dialog box or other form for obtaining user input is then displayed to allow the user to enter choices for encryption generation and management, such as using different encryption keys to use for files backed up to different partners. As mentioned, encryption keys may be specified for all partners individually, or just for some, using the user's specified default encryption key for use with the other partners. Other combinations are possible as well.

The example RBS interface supports three example mechanisms for initiating backup operations. First, the user can schedule (potentially recurring) backup operations. Scheduled backups occur automatically, preferably without user intervention or involvement (unless errors occur). A scheduled backup occurs at a time previously indicated by the user and copies data to a designated backup partner as specified in a standing backup list. Scheduled backups are set up through a scheduling interface, for example the dialog box described with reference to FIG. 9. Specifically, a standing backup list indicates a set of data (e.g., files or directories) along with a respective backup partner and a description of a method for connecting to the backup partner. The standing backup list is set or modified through another interface for selecting files (or other data) to be backed up, for example, the using the interface described with reference to FIG. 8.

Second, a "Backup Now" command can be invoked by selecting the button 515. This command backs up the data indicated in the standing backup list to the respectively indicated backup partners upon invocation of the command (with near-immediate initiation). When there is no data indicated in the standing backup list, the user is notified to create a standing backup list, for example using the interface of FIG. 8, and to retry the command thereafter. If a backup cannot be performed, for example, because an indicated backup partner is off-line (as with a dial-up or intermittent connection or otherwise unavailable), the data is cached locally or remotely through the user of a caching server. Later, when the backup partner connection is made, the cached data is used as the source of the backup operation. The Backup Now capability in conjunction with the ability to cache backed up data allows the user to capture snapshots of the data in a user controlled manner.

Third, a selected object (e.g., data, file, or directory) backup command can be invoked through an object's context menu. For example, in a Microsoft Windows™ environment, a context menu for a file or directory is invoked by pressing the "right-click" equivalent function on an input device such as a mouse after a selection of one or more objects has been indicated. When an individual object backup command is invoked, a backup operation is initiated for the selected object(s) data. In one embodiment, a dialog box is displayed to allow the user to indicate a backup partner for this backup operation, whether to included subobjects (such as subdirectories and files), and whether to add the selected object(s) to the standing backup list, if the object is not already present on the list.

In some embodiments, if a regularly scheduled backup is available (as set up using the first mechanism described above) then before an immediate backup operation is processed (i.e., a Backup Now command or a selected object backup command), the user is given an option to perform this immediate backup at the standard scheduled backup time. For example, when the user invokes either the selected object backup command or the Backup Now command, the RBS queries the user first to determine whether to actually perform the backup immediately or whether to instead add the indicated data to the backup data list to be processed at the next scheduled backup time. When the user indicates a preference to use the regularly scheduled backup time, then the RBS copies the indicated data to a cache. Later, when the scheduled backup takes place, the cached copies of the data will be transmitted to a backup partner for backup. The user can thus take a snapshot of files for backup and continue working on those files, yet not inconvenience partners for whom the bandwidth consumption of backup operations adversely affects other computer usage (for example, such users may have backups scheduled to be performed while they sleep).

Also, unlike scheduled backups, when a user invokes an immediate backup command, the user doesn't specify in the command itself how the user's computer system is connected to the network. If the user's computer system is currently connected to the Internet, the Reciprocal Backup System uses that connection. If there isn't a current Internet connection, but one has been specified for scheduled backups, then the RBS displays a dialog box to provide the user an option to have the RBS establish that connection and proceed. If the user declines that option, or if a connection has not been specified for scheduled backups, then the user is directed to establish a connection and then reissue the immediate backup command. One skilled in the art will recognize that this mechanism can be generalized to other networks by allowing the user to specify a default connection, that is which network(s) should be automatically used if an available connection is found.

Figure 6:
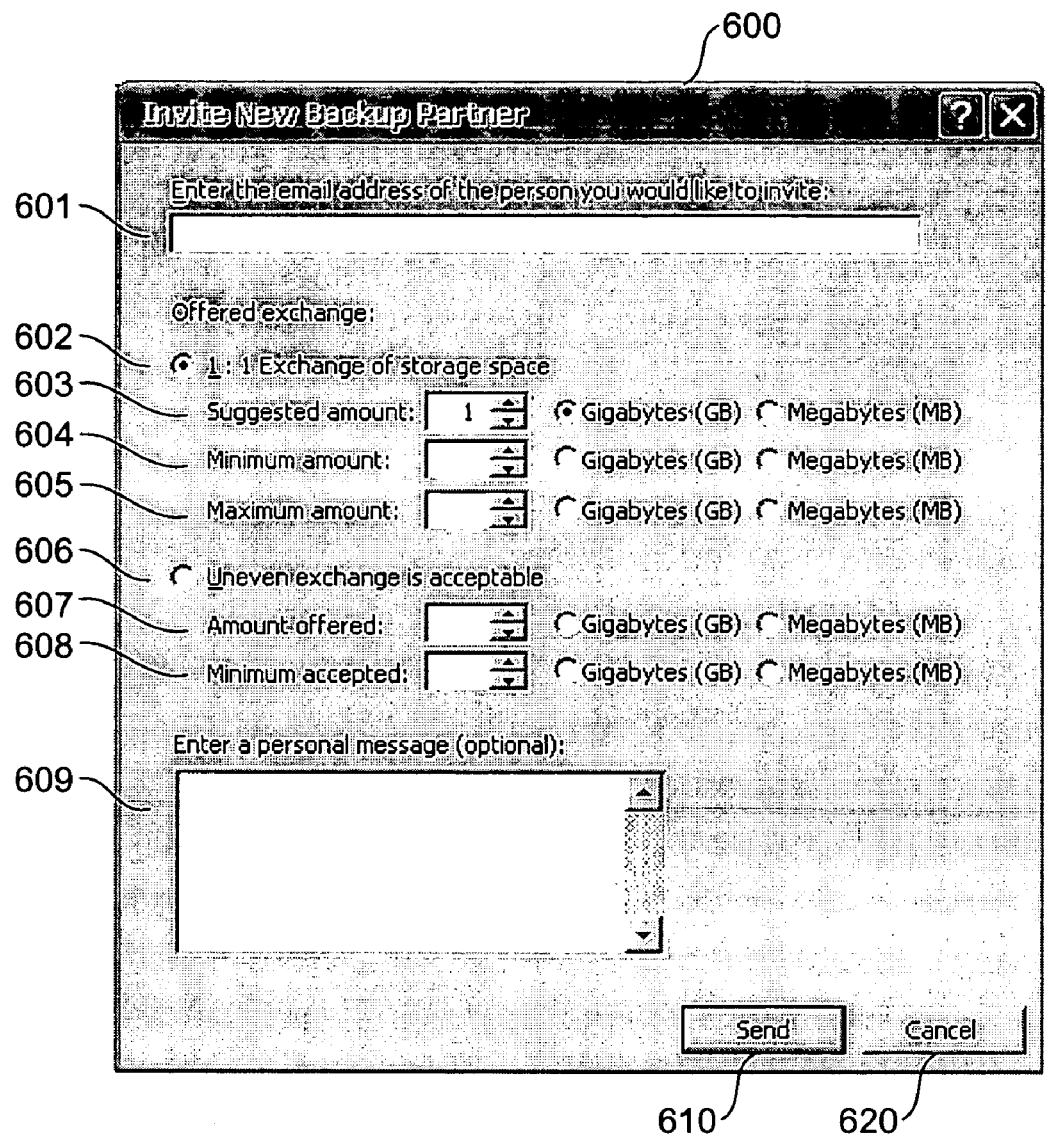
FIG. 6 is an example screen display of a dialog for establishing a reciprocal backup relationship.

As mentioned, before any backup can occur, a user needs to establish one or more reciprocal backup relationships with backup partners. To establish a new reciprocal backup relationship, the user selects a command, for example by depressing button 510 in FIG. 5, which displays a dialog box for negotiating the relationship. FIG. 6 is an example screen display of a dialog for establishing a reciprocal backup relationship. In the example user interface illustrated, a reciprocal backup relationship is established by specifying a desired set of backup relationship parameters, and then forwarding them by email to a desired backup partner user. One skilled in the art will recognize that other methods of notifying a potential backup partner can be utilized with the current techniques, such as by using other messaging protocols (like instant messaging), a physical phone call, and many other methods.

More specifically, a user specifies an email address for notifying the potential backup partner user in input field 601. The inviting user then specifies either in field 602 that the user is offering an even exchange of storage space, or in field 606 that the user is offering an uneven exchange of storage space. An even exchange indicates that the user is willing to allocate the same amount of reciprocal backup storage on the user's computer system (for the backup partner's use) as the user receives in backup storage from the backup partner. In contrast, an uneven exchange indicates that the user is willing to allocate a different amount of reciprocal backup storage on the user's computer system (for the backup partner's use) from the amount of backup storage the user receives from the backup partner. The interface shown indicates parameters that in one embodiment are used to perform a negotiation with the potential backup partner user. If an even exchange is offered, then the inviting user preferably indicates a suggested amount in field 603, a minimally acceptable amount in field 604, and a maximum acceptable amount in field 605. The minimum and maximum acceptable amounts are used if the invited user counteroffers an amount of storage that is not equal to the suggested amount. If an uneven exchange is offered, then the inviting user preferably indicates in field 607 an amount of reciprocal backup space being offered in exchange for a minimum acceptable amount of backup storage on the backup partner system indicated in field 608. One use of an uneven exchange is when the inviting user is willing to offer more reciprocal backup storage than needed from the desired backup partner. In addition to specifying the trade parameters, the inviting user can indicate a message to the desired backup partner user in input field 609.

In addition to the exchanges shown in FIG. 6, other negotiation logic may be incorporated, such as each backup partner suggesting its own desired backup storage amounts and then negotiating further or accepting the other partner's suggested amounts. One skilled in the art will recognize that other logic is also possible and that the negotiation may even be a simple acceptance or rejection of one backup partner's suggested amounts.

Figure 7A:
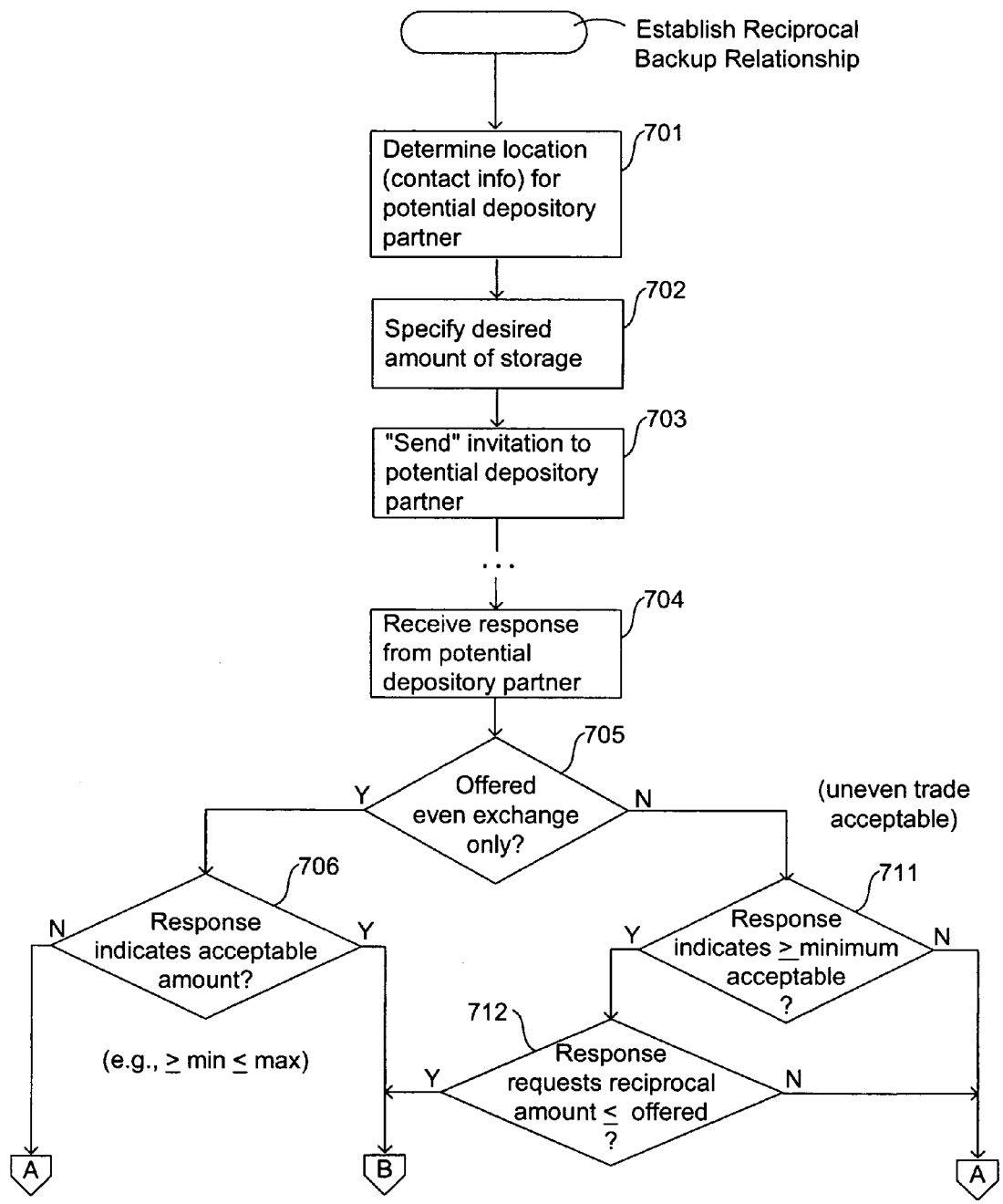
FIGS. 7A and 7B are example flow diagrams of a routine for establishing a reciprocal backup relationship with a backup partner.
Figure 7B:
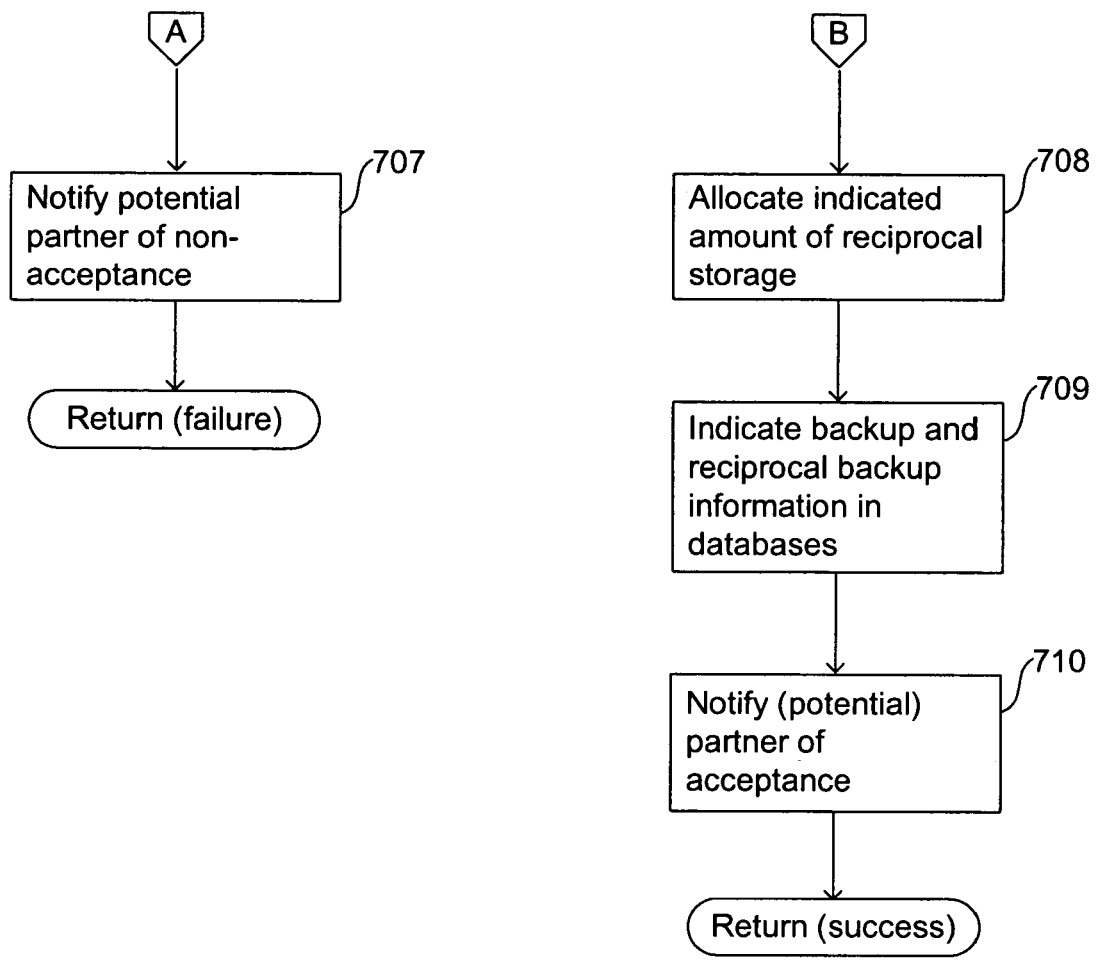

After determining parameters, the user depresses the Send button 610 to invoke a routine that sends an (email) invitation to the desired backup partner user. FIGS. 7A and 7B are example flow diagrams of a routine for establishing a reciprocal backup relationship with a backup partner. FIGS. 7A and 7B are written from the point of view of an inviting user. One skilled in the art will recognize that comparable routines exist from the invited users point of view. In step 701, the routine determines a location (for example, email contact information) for a potential (depository) backup partner. In step 702, the routine determines the storage parameter values indicated by the inviting user, and then in step 703 sends an invitation (for example, by email) to the determined location of the potential backup partner forwarding the determined parameter values.

When email is used to send the invitation, the email preferably contains a link the invited user can click on to accept (not shown). The logic executed by clicking on the link may navigate to a location on the network from where the Backup Buddy software can be downloaded and installed if a current version of the software is not detected. In some embodiments, the logic executed by clicking on the link allows the invited user to respond with a counteroffer which results in a negotiation with the inviting user. If the relationship parameters are accepted, a network connection is made between the backup partners and reciprocal backup activity can proceed.

In step 704, the routine receives a response to the invitation from the potential (depository) backup partner. Steps 705, 706, 711, and 712 are used to determine whether the inviting user's offer was accepted or whether an acceptable counteroffer was made. Although FIGS. 7A and 7B are depicted to stop if the first negotiation doesn't result in agreed upon storage amounts, one skilled in the art would recognize that a negotiation "loop" could be engaged to negotiate some number of times or until some other threshold is encountered. Specifically, in step 705, the routine determines whether only an even exchange was offered, and if so continues in step 706, else continues in step 711 to process an offer of an uneven exchange. In step 706, the routine determines whether the response indicates the offer was accepted or an acceptable counter offer was made (storage=suggested amount or storage=amount>=min AND<=max). If so, the routine continues in step 708 to accept the relationship and return a success code, or if not, continues in step 707 to notify the potential backup partner of non-acceptance (unless the potential partner flatly declined the proposed relationship, in which case no notice of non-acceptance is sent), and then returns a failure code. In step 711, if an uneven exchange was offered, then the routine determines whether the response indicates an acceptable amount of storage is available on the potential backup partner's system, and if so continues in step 712, otherwise continues in step 707 to notify non-acceptance and return a failure code. In step 712, the routine determines whether the invited user has requested an acceptable amount of reciprocal backup storage from the system (less than or equal to that originally offered), and if so, continues in step 708 to accept the relationship and return a success code, otherwise continues in step 707 to notify non-acceptance and return a failure code.

When a reciprocal backup relationship is established between two backup partner users, the agreed upon space is immediately allocated in step 708 on each of their corresponding computer systems. Depending upon operating system support, different techniques can be used to allocate the storage, for example allocating a single large file of the agreed upon size and then re-sizing the file smaller as space is needed for backups. In step 709, the RBS data repository information is set up (for example, initialization of the manifests) and in step 710, the routine notifies the backup partner of acceptance of any counteroffer and returns an indication of success. If for some reason, the agreed upon storage space is found to be unavailable on one or both machines, the backup partner users are notified and given the following choices: (1) adjust the relationship agreement to reflect the available space (either both sides being adjusted downward, or one partner accepting an uneven exchange); (2) hold off on initiation of the relationship until the space is available; or (3) abandon the relationship.

In an alternate embodiment, the agreed upon space is not allocated when the relationship is initiated; rather it is allocated as needed during backup operations, up to the agreed upon limit. In this embodiment there is no guarantee that the agreed space will in fact be available when needed and if it is not, then an error message is returned by the depository system during the failed backup operation and displayed to the originating user. The RBS then gives the originating user the options described below for handling an out-of-storage-space error during a backup operation.

A user may desire to modify the amount of storage shared with a particular backup partner. As described with reference to FIG. 5, the user selects the "Modify" link (e.g., link 508) that corresponds to the respective partner in the current status window (e.g., window 501). The RBS then displays a dialog box (not shown) to allow the user to enter new amounts of storage to be suggested to the partner, similar to the initial invitation described with reference to FIGS. 6, 7A, and 7B. And similarly, the RBS then sends a message to that backup partner and the partner may then accept or reject the new suggested amounts.

In one embodiment, the dialog box also allows the user to delete selected files stored on a backup partners' computer system (backed up files) to free up space. For example, the RBS shows a list of all the files and directories that are currently backed up to that computer system (not shown), and allows the user to choose particular files and directories to delete. To effect the actual change in the partner's computer system, the user clicks a "remove files" button (not shown), which causes all the chosen files and directories to be removed. In this list of files and directories, the notation "purgable" is shown next to each purgable file and directory as this indicates that there is no point in overtly removing such an object since it will be automatically removed anyway by the backup partner computer system when space is needed. In other embodiments, the RBS may allow a user to explicitly delete or mark as purgable each/all file(s).

Although not illustrated in FIGS. 6, 7A, and 7B, in some embodiments a caching server is available, which can be used as an intermediary between the originating and depository partners. An originating backup partner's system backs up objects to the caching server as though it were the depository partner and can restore them using a caching server as an intermediary when needed. Later, when the depository partner becomes available, the depository partner retrieves requests and data from the caching server as though the caching server were the originating partner. A caching server may be useful in situations where at least one of the backup partners has intermittent presence on the network. Access to such a server can be agreed upon in advance by the backup partners when establishing the initial reciprocal backup relationship. For example, as part of dialog box 600 in FIG. 6, the backup partner that initiates the relationship (or the backup partner that responds) can specify the network address of the caching server and other necessary account information, depending upon the caching server. Further, a user can also establish or change the parameters, location, availability, etc. of a caching server similar to modifying the other relationship parameters by selecting the "Modify" link (e.g., link 508) that corresponds to the respective partner in the current status window (e.g., window 501).

Figure 8:
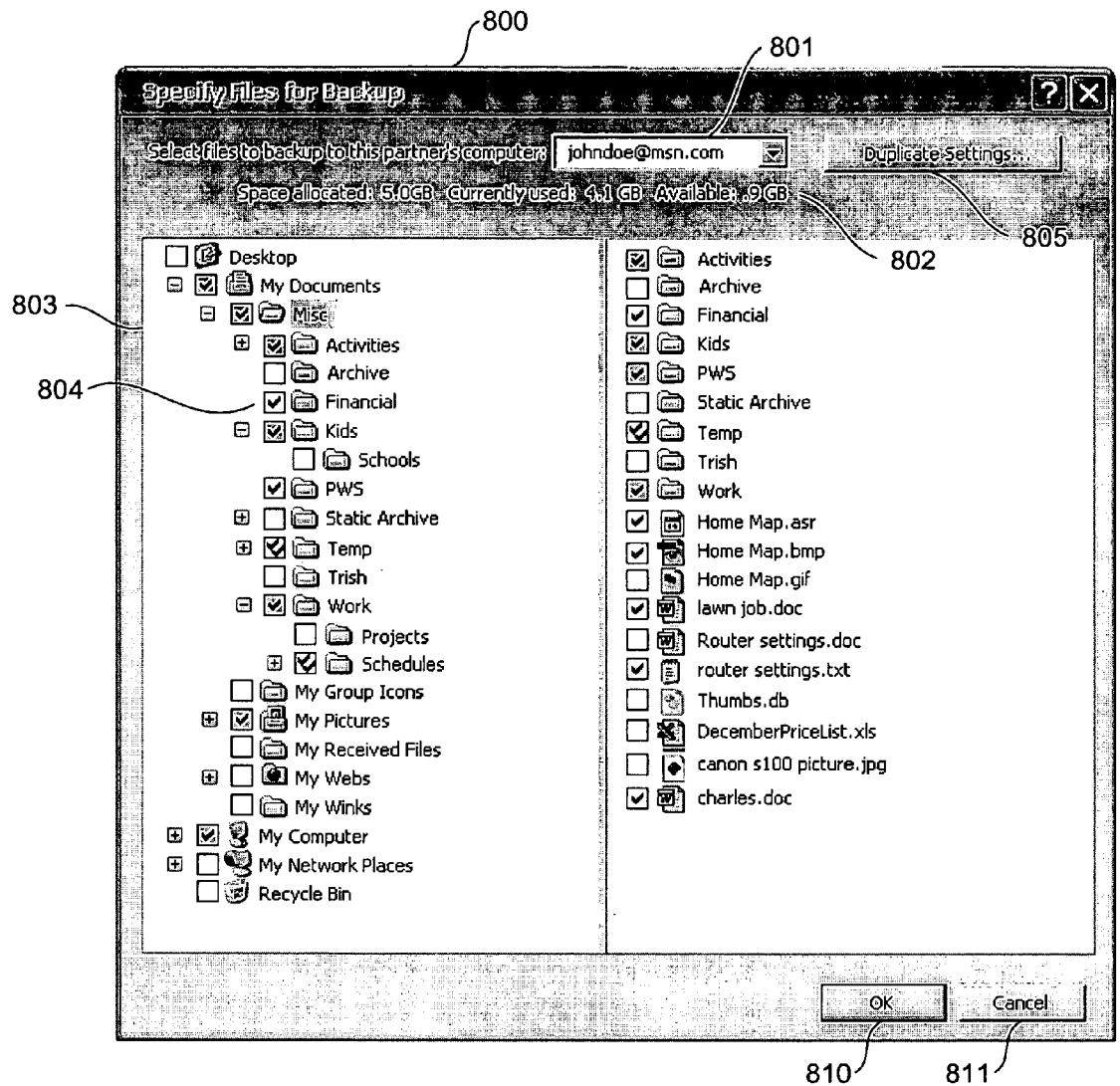
FIG. 8 is an example screen display of a dialog for specifying objects to be backed up using the Reciprocal Backup System.

As described with reference to FIG. 5, a standing backup list is used both for scheduled backups and for the "Backup Now" immediate backup command. A dialog to set the standing backup list can be invoked, for example, by pressing button 512 in the Backup Buddies application program window 500 in FIG. 5. FIG. 8 is an example screen display of a dialog for specifying objects to be backed up using the Reciprocal Backup System. When used with files and directories, the standing backup list contains an indication of which files and directories (objects) will be backed up automatically. The RBS displays a dialog box 800, which indicates which files and directories are currently indicated to be backed up to which backup partners. The user can modify the indications by selecting entries 804 on a per backup partner basis by choosing a backup partner from backup partner list 801. This allows different objects to be backed up to different partners. A current indication of the space available on the backup partner computer system is shown in status field 802.

The RBS also allows settings to be easily duplicated among backup partners by selecting the Duplicate Settings button 805 to display a dialog that allows the user to choose a source list (associated with a backup partner) to use to create the current standing backup list. This feature is particularly useful in at least two situations: (1) files being backed up to a particular displaying partner are particularly valuable and the user wants to back them up to an additional partner(s) for additional security, and (2) the user wants to move the backup storage from one partner to another, perhaps because the first partner will no longer be available or no longer is considered reliable.

According to FIG. 8, when a user wishes to select a file or directory to be a part of the selected backup list, the user "clicks" in (selects) the checkbox that corresponds to the file or directory. If the object is a directory, then only the files directly in that directory are included—not subdirectories. To cause all subdirectories and their files to also be included in the standing backup list, the user clicks again in the checkbox that corresponds to a directory, which is indicated by a double-check mark in the dialog box. Continued user clicks cause the selected item to cycle back through the states as described. A shaded check for a directory indicates that some but not all of its files are selected. When a directory's checkbox is selected and shown as checked, causing its contained files and optionally subdirectories to also be selected, the checkboxes for those selected files and subdirectories are also shown as checked when visible. The user is free to then change the setting for those contained files and subdirectories by clicking their checkboxes to de-select them (which would cause a check or double-check to turn into a shaded check for the containing directory). One skilled in the art will recognize that other user interface techniques and components for implementing such a list may be used.

When the user removes an already-backed-up file from the Standing Backup File List, then on the next backup operation, that file is marked as "purgable" on the backup partner's computer system. This means that when more space is need on that partner's computer system for backed up files, this "purgable" file can be deleted. But since the file isn't actually deleted until space is needed, the user may yet be able to subsequently retrieve the backed up copy.

Figure 9:
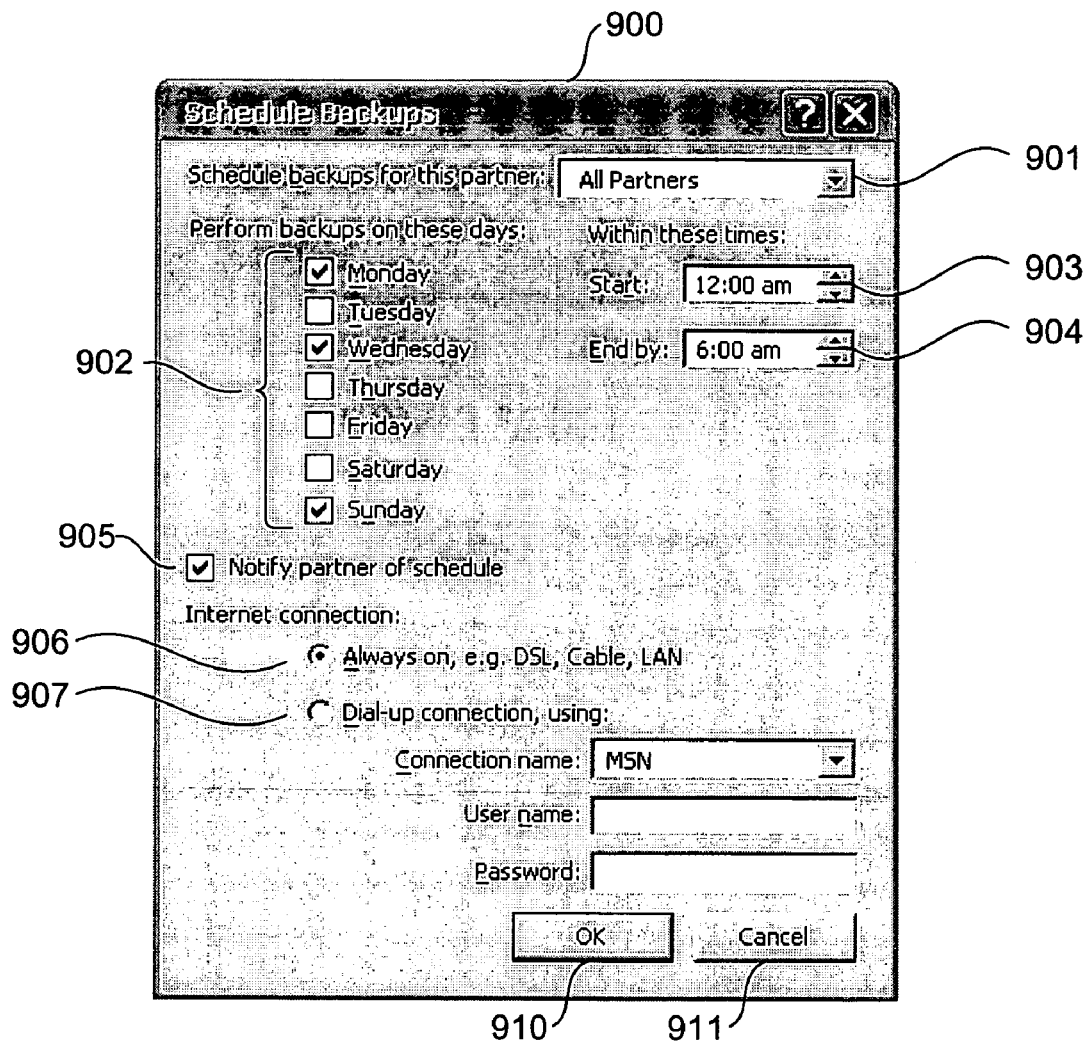
FIG. 9 is an example screen display of a dialog for specifying a backup schedule using the Reciprocal Backup System.

Once the standing backup list is created, to effectuate automatic backups, a backup schedule needs to be created. A user can invoke a dialog to schedule backups, for example, by pressing button 514 in the Backup Buddies application program window 500 in FIG. 5. FIG. 9 is an example screen display of a dialog for specifying a backup schedule using the Reciprocal Backup System. The user can specify a schedule for performing backups either to individual backup partners on a case by case basis or for all of them uniformly. In dialog box 900, the user designates a partner by clicking on the partner list 901 and choosing a specific partner or an indication of all partners from the list 901. Choosing all partners indicates that the schedule specified in the rest of the dialog box 900 will apply to all of them.

The user selects the day of week in day field 902 and a time period for the backup to occur in fields 903 and 904. Since it is often desirable to coordinate the scheduled transmission time with a partner, checking the notify field 905 causes the RBS to send a notification to the partner (or all partners if selected) informing them of the schedule and allowing them the option to place a similar schedule in effect on their side for this backup partner for reciprocal backup. In another embodiment, a further negotiation is supported if the initially set schedule is not acceptable to the other backup partner.

With scheduled backups, the user needs to specify how to connect to the network. The illustrated embodiment presents two options: (1) the computer can be assumed to be connected (for example with "always on" Internet connections such as DSL, cable, and other network connections) by selection of option 906; or (2) a dial-up connection can be used by selection of option 907. In this case, the user specifies connection information so that the RBS can initiate a connection if one isn't present when it is time to perform a backup.

Figure 10:
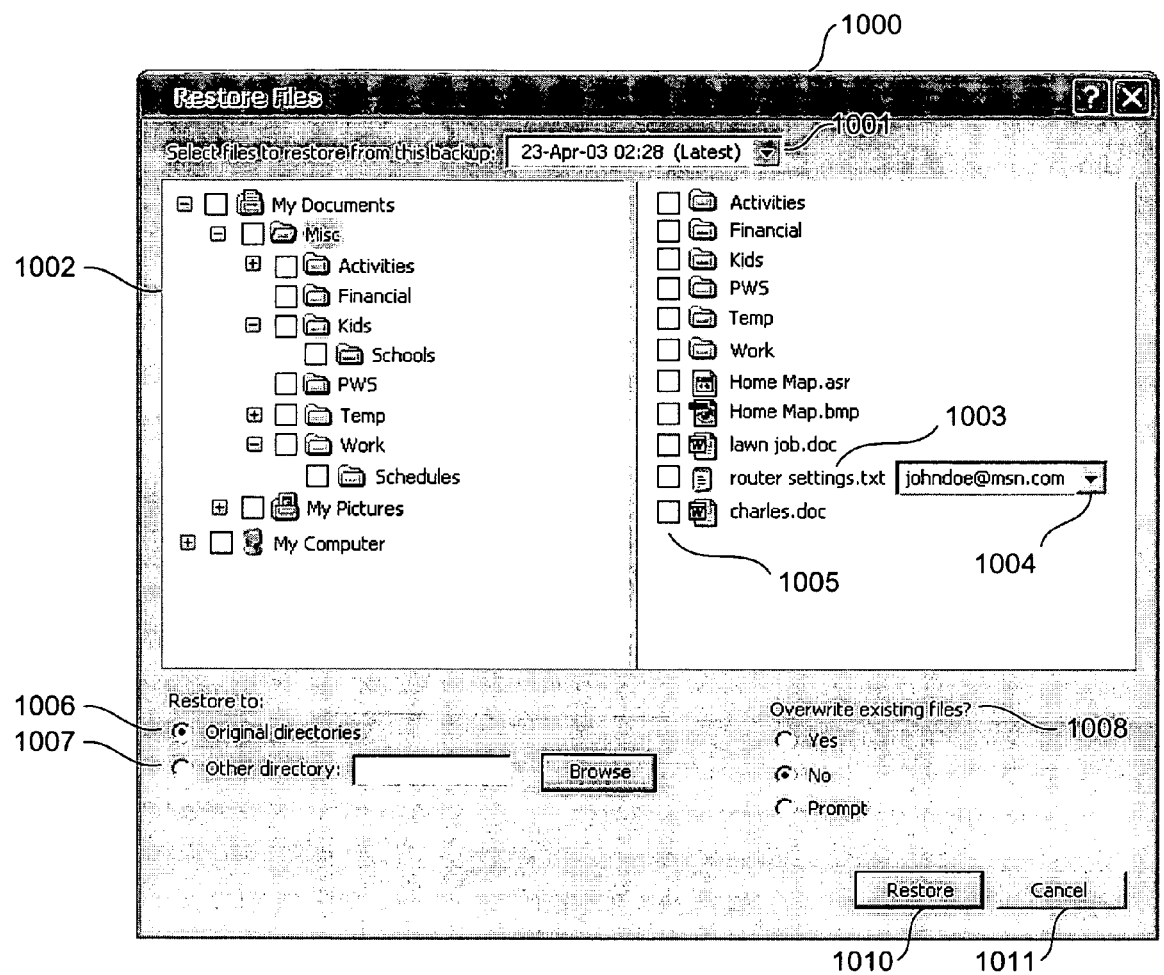
FIG. 10 is an example screen display of a dialog for specifying objects to be restored using the Reciprocal Backup System.

In addition to backing up files, a user can restore previously backed up files. A user can invoke a dialog to restore files, for example, by pressing button 516 in the Backup Buddies application program window 500 in FIG. 5. FIG. 10 is an example screen display of a dialog for specifying objects to be restored using the Reciprocal Backup System. In the embodiment illustrated by FIG. 10, the RBS presents previously backed up files and directories for the user to restore. One skilled in the art will recognize that in other embodiments, an application or other program code can present its own, potentially a hierarchy of, objects for the RBS to restore. The dialog box 1000 presents a list of available files and directories 1002 with added fields, such as checkbox 1005, for selecting files and directories to restore. The user selects a date and time in field 1001 to indicate which backup or backups should be used by the RBS for the restoration. The dates and times that are displayed in field 1001 are those for which backups were performed and for which copies are still presumably available on one or more partners computer systems. In addition, the user can designate an "All" choice in the date and time field 1001 to indicate that the RBS should automatically choose the backup from which to restore a particular file/directory. The RBS may make such choices based upon any number of heuristics, such as the latest backup from the partner most likely to respond in the shortest time period. Note that a reciprocal backup partner can delete, albeit inconsiderately, the backup store of a backup partner unilaterally in some embodiments. While encryption prevents one backup partner from reading another partner's backed up files, nothing prevents a partner from deleting another's backup storage, accidentally or not. Further, malfunctions occur on partners' computers just as on as one's own.

As the user chooses different backup periods in field 1001, the list of available files and directories 1002 changes to show just those files and directories which are available from that prior backup operation (or from any backup operation if "All" was chosen). The user may choose any of these backup periods and restore available files from just that backup. The user may also choose to select files from the last backup performed (shown as the date and time followed by "(Latest)" in field 1001).

Note that the list of available files and directories 1002 is consistent with the setting selected for field 1001. Thus, when "All" is selected in field 1001, then all files available for restoration, no matter when backed up or to which partner, are presented in the display 1002. For each selected file or directory indicated by object field 1003, the RBS lists in a partner list 1004 all of the backups and partners from which a backup copy of the object can potentially be restored. Specifically, a partner list 1004 is displayed when a selected file or directory indicated by object field 1003 is the currently selected object (the object has input focus). The user can then override any default chosen by the RBS on an object-by-object basis. Alternatively, when a particular backup event (or "latest") is selected in field 1001, then the file and directory list 1002 will show the files and directories from only a single prior backup operation at once. It will show the files and directories from all the backup partners who received files and directories in that backup operation—thus, a single restoration operation may well pull in files from multiple partners. When a particular file or directory is available from more than one backup partner, for example the file indicated in object field 1003, the user chooses from which partner to restore the file by selecting a partner from, for example, partner list 1004. Even though the copy backed up to different partners is most likely the same, the RBS presents the user an option to be particular about which copy is used since the user presumably intentionally backed up the file to multiple backup partners during the same backup operation. The user can also indicate a particular location to which to restore the files and directories by indicating a choice to use original locations in field 1006 or by specifying a new location in field 1007. In addition, the user indicates instructions for handling conflicts with existing files in field 1008.

Upon selecting the Restore button 1010, the RBS initiates the restoration operation according to the users selections in dialog 1000 and according to a specified connection or a default connection similar to that specified for use with the immediate backup commands. For example, if the user's computer system is currently connected to the network which connects to the other backup partners, then the RBS uses that connection. If there isn't a current network connection, but one has been specified for scheduled backups, or if, as in some embodiments, a default connection has been indicated, then the RBS displays a dialog box to provide the user an option to have the RBS establish that connection and proceed. If the user declines that option, or if a connection has not been specified for scheduled backups, then user is directed to establish a connection. If the backup partner is not connected or is for some reason unavailable or off-line, the RBS follows a set of procedures for handling off-line backup partners as described further below with reference to FIGS. 14A, 14B, 15A, and 15B. In summary, the RBS locates the backup partner on the network, and queries the user as to whether to try during the next scheduled backup operation, at specific intervals, or to abandon the request.

Note that backup operations can backup files to a cache as described in the immediate backup commands description. A cache is used for example, when a snapshot of files and directories is desired but a selected backup partner is off-line. The RBS considers these objects as effectively backed up from the viewpoint of restorations and are thus displayed as corresponding to the correct backup partner. If a user chooses to restore such files, then the RBS retrieves them from its own cache rather than requesting them from the backup partner.

Note that, in an embodiment that supports encrypted backups of objects, the RBS needs to decrypt objects when those objects are restored. In one embodiment, the reciprocal backup system stores in its database (or in a separate key database) an indication of the encryption key that was used for each file when it was backed up and automatically uses that encryption key to decrypt the file when it is restored. One skilled in the art will recognize that any well-known algorithm for performing the encryption and decryption as well as storing the encryption keys in a secure repository can be used with the RBS. In the case where the RBS' key data repository is damaged or lost, the RBS needs to supply the encryption key(s). In one embodiment, the RBS queries the user for an encryption key(s) to use when restoring files when the encryption key(s) are not available. In another embodiment the encryption key(s) themselves are backed up so that they can be restored by the RBS when a key is damaged or lost. Such key backup can be performed by, for example, (1) having the user back up the keys from the secure key repository onto removable media as a password-protected file; (2) having the user engage a commercial key escrow server to store them for the user; or (3) backing up the key repository as a password-protected file to a trusted backup partner.

Figure 11:
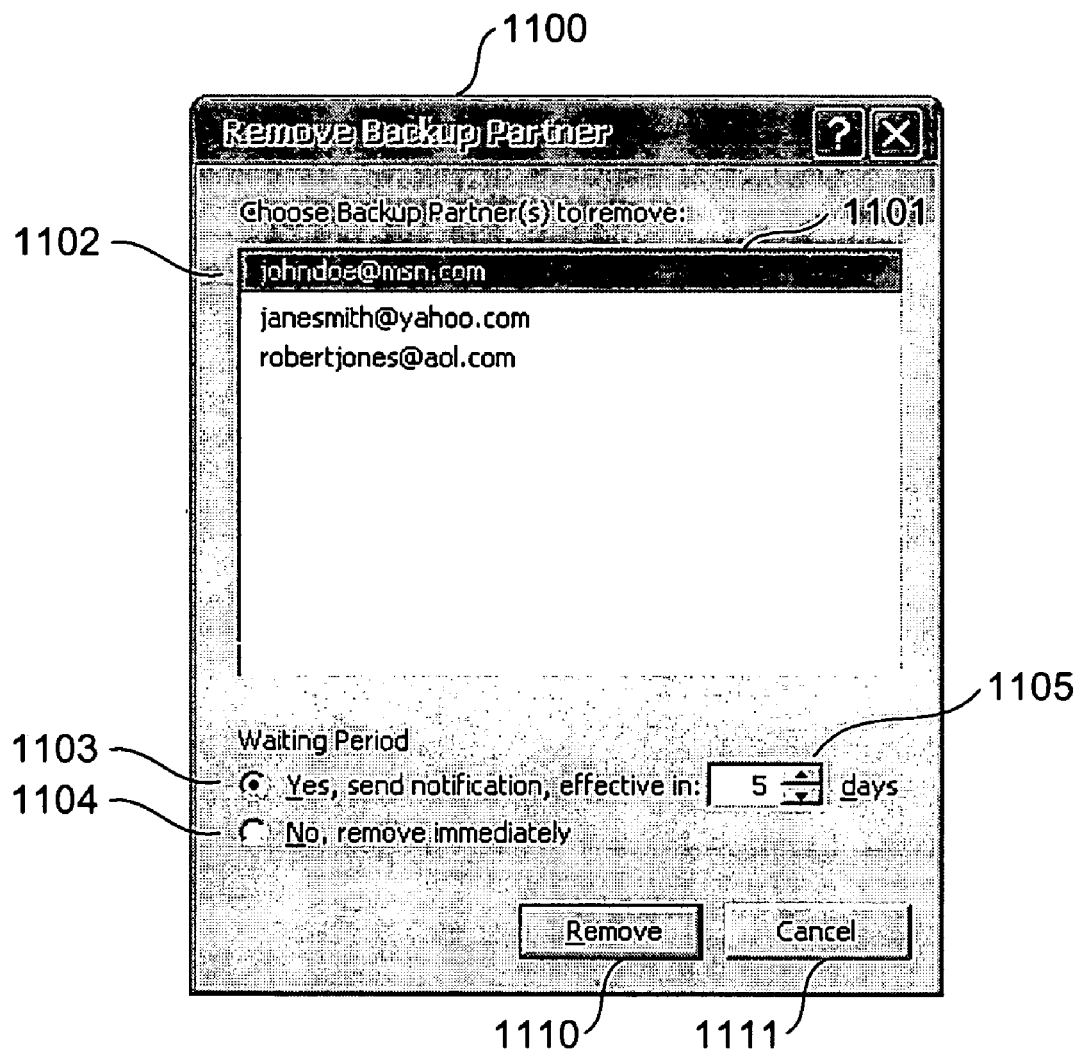
FIG. 11 is an example screen display of a dialog for removing a backup partner to end a reciprocal backup relationship.

At times, it becomes necessary for a user to end a reciprocal backup relationship with a backup partner. The user can invoke a dialog to remove a backup partner, for example, by pressing button 511 in the Backup Buddies application program window 500 in FIG. 5. FIG. 11 is an example screen display of a dialog for removing a backup partner to end a reciprocal backup relationship. Dialog box 1100 includes a list of current backup partners 1 101, from which a particular backup partner, for example, partner 1102, can be selected for removal. The user may optionally specify a waiting period so that the selected backup partner's reciprocally backed up files are not deleted without giving the backup partner an opportunity to determine alternative backup storage. When a waiting period 1103 is selected, the backup partner is notified that, in a number of days as specified in field 1105, termination of the reciprocal backup relationship will occur. If no waiting period 1104 is specified, then the termination is effective immediately upon pressing the Remove button 1110.

When a reciprocal backup relationship is ended, both backup partners' backup storage is deleted from each other's computer and the space is released. If the partner's computer isn't on-line this action has to wait until both systems come on-line and receive the notification. Although a partner can prevent the deletion of the backup storage by removing or disabling the reciprocal backup system from running on their computer, doing so isn't a security breach since each user's data is encrypted for storage on partners' computers.

Figure 12:
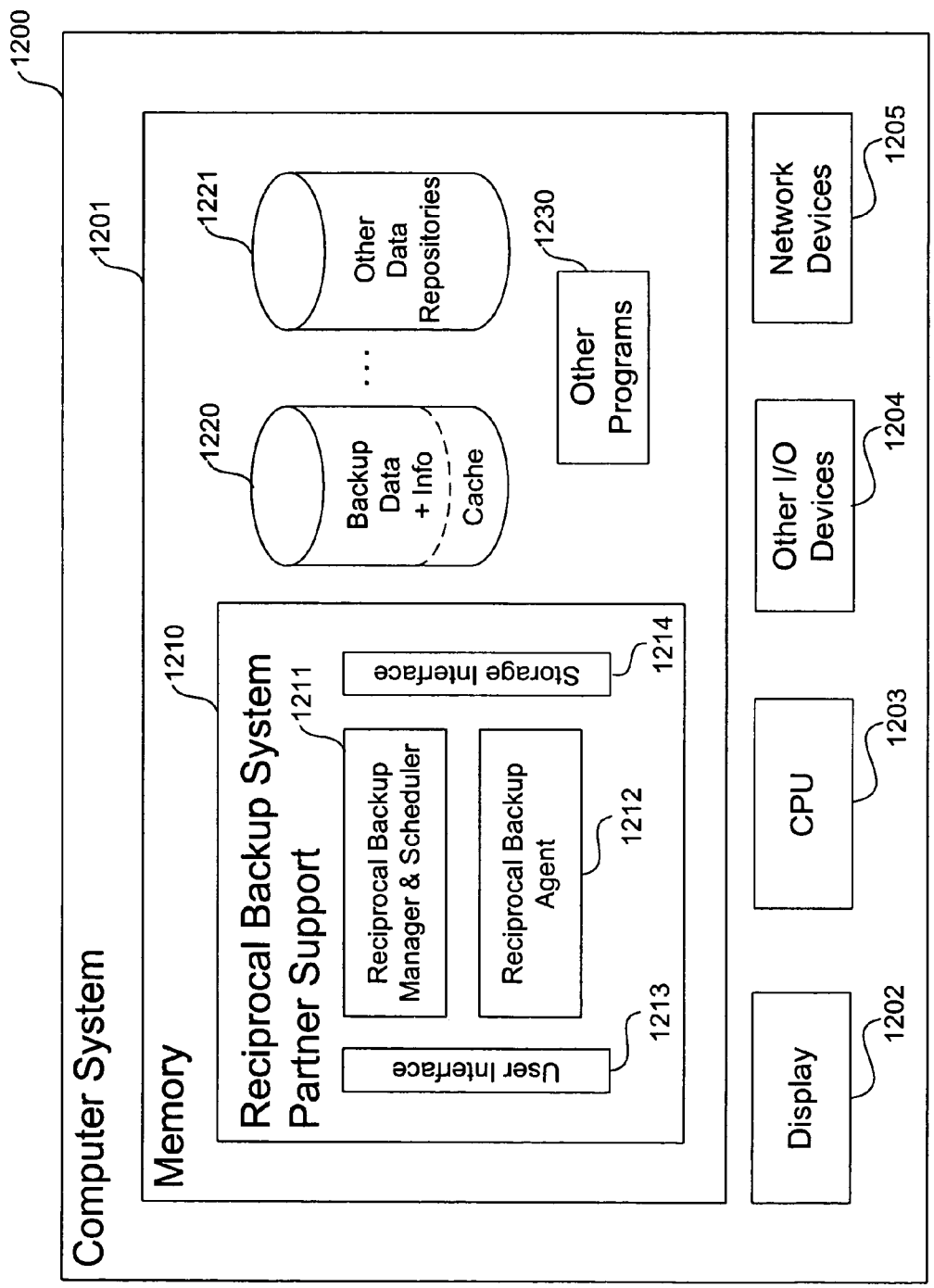
FIG. 12 is an example block diagram of a general purpose computer system for practicing embodiments of a Reciprocal Backup System.

FIG. 12 is an example block diagram of a general purpose computer system for practicing embodiments of a Reciprocal Backup System. The general purpose computer system 1200 may comprise one or more server and/or client computing systems and may span distributed locations. In addition, each block shown may represent one or more such blocks as appropriate to a specific embodiment or may be combined with other blocks. Moreover, the various blocks of the Reciprocal Backup System Partner Support 1210 may physically reside on one or more machines, which use standard interprocess communication mechanisms to communicate with each other.

In the embodiment shown, computer system 1200 comprises a computer memory ("memory") 1201, a display 1202, a Central Processing Unit ("CPU") 1203, Input/Output devices 1204, and network devices 1205. The Reciprocal Backup System Partner Support 1210 and reciprocal backup data storage, information, and cache 1220 of a typical RBS are shown residing in memory 1201. (The memory 1201 includes any type of computer memory including RAM, ROM, and persistent storage such as disk drives.) The components of the RBS Partner Support 1210 preferably execute on CPU 1203 and manage the reciprocal backup relationships, as described in previous figures. Other downloaded code 1230 and potentially other data repositories, such as repository 1221, also reside in the memory 1201, and preferably execute on one or more CPU's 1203. In a typical embodiment, the RBS Partner Support 1210 includes one or more a Reciprocal Backup Manager and Scheduler 1211, a Reciprocal Backup Agent 1212, a user interface 1213, and a storage interface 1214. As shown in FIGS. 4 and 12, many different arrangements of the components of the Reciprocal Backup Manager and Scheduler are possible.

In an example embodiment, components of the RBS Partner Support 1210 and data repositories 1220 are implemented using standard programming techniques. One skilled in the art will recognize that various object-oriented and distributed methodologies may be used. However, any of the RBS Partner Support components 1211-1214 may be implemented using more monolithic programming techniques as well. In addition, programming interfaces to the data stored as part of the reciprocal backup process can be available by standard means such as through C, C++, C#, and Java API and through scripting or tag-based languages such as JavaScript or XML, or through web servers supporting such. Portions of the backup data repository 1220 that are used to store backed up files are preferably implemented as one or more files in the native file system and other portions (such as the backup manifests and location information) are preferably implemented for scalability reasons as one or more databases rather than as a text files. However, any method for storing such information may be used. In addition, the storage interface 1214 may be implemented as stored procedures, or methods attached to stored "objects," although other techniques are equally effective.

One skilled in the art will recognize that the RBS including the RBS Partner Support 1210 and the backup data repositories 1220 may be implemented in a distributed environment that is comprised of multiple, even heterogeneous, computer systems and networks. For example, in one embodiment, the Reciprocal Backup Manager and Scheduler 1211, the Reciprocal Backup Agent 1212, the user interface 1213, the storage interface 1214 and the backup data repositories 1220 are all located in physically different computer systems. In another embodiment, various components of the RBS Partner Support 1210 are hosted each on a separate server machine and may be remotely located from the backed up data and backup information which are stored in the backup data repository 1220. Different configurations and locations of programs and data are contemplated for use with techniques of the present invention. In example embodiments, these components may execute concurrently and asynchronously; thus the components may communicate using well-known message passing techniques. One skilled in the art will recognize that equivalent synchronous embodiments are also supported by an RBS implementation. Also, other steps could be implemented for each routine, and in different orders, and in different routines, yet still achieve the functions of the RBS.

As described in FIGS. 1-11, one of the functions of a Reciprocal Backup System is to back up objects such as files and directories on a depository backup partner's computer system and to provide reciprocal backup storage to the backup partner. Another function is to restore a previously backed up file to its original location or an alternate location.

In order to support both of the backup and restoration functions, the RBS maintains several types of information in a data repository, including indications of which objects have been backed up to which depository backup partners, and conversely which originating partners have backed up which objects to it in its role as a depository partner. This information is used to generate "current backup manifests." A current backup manifest indicates the identification and properties of each object that is currently stored by one backup partner on another backup partner's computer system. One skilled in the art will recognize that any data structure sufficient for generating lists of objects can be used to create a current backup manifest, for example, a list, a database, a hash table, etc. In embodiments where the objects are files and directories, the data maintained for each backup of a resident file (backed up on a depository backup partner computer system) includes sufficient information to identify the location of the file in the resident system (e.g., the file/directory's name), and each backup event, including a last-modified date/time stamp, a backup date/time stamp that indicates when the file was backed up, a unique identifier, size, and checksum. The RBS also maintains data in the data repository for reciprocal backups of the objects stored locally on behalf of other backup partners (as originating partners). Backup manifests for such reciprocal backups are generated from this data and checked for accuracy by examining the actual file store and related database entries.

Figure 13:
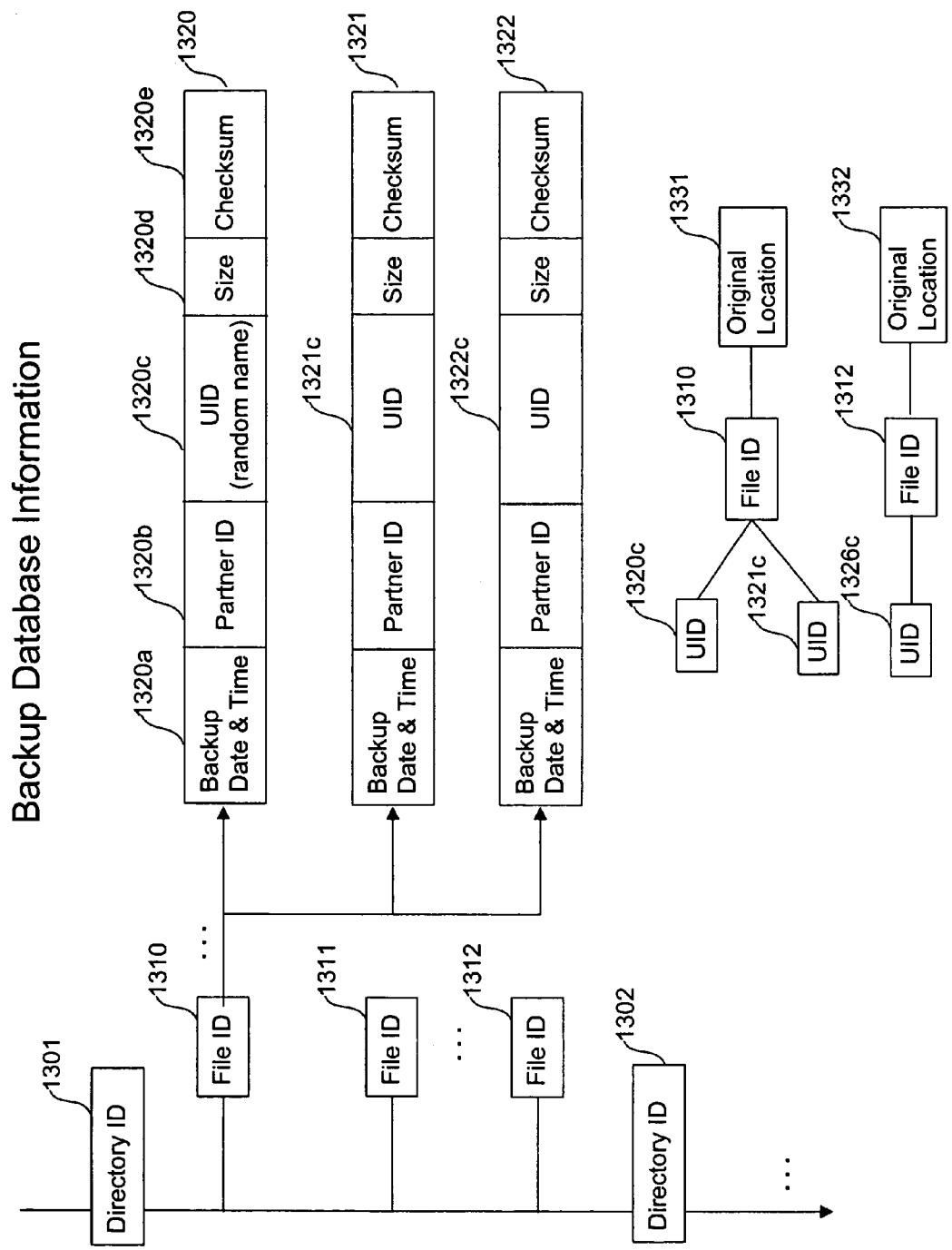
FIG. 13 is an example block diagram of backup manifests stored in a data repository for tracking backup files and reciprocal backup files.

FIG. 13 is an example block diagram of backup information stored in a data repository for tracking backup files and reciprocal backup files. In one embodiment, the information is stored in one or more database tables that are keyed to quick retrieval by object (file/directory) identifier and by backup partner identifier. For example, FIG. 13 illustrates three files with file identifiers 1310, 1311, and 1312 that have been backed up for a directory with directory identifier 1301. The file identified by file identifier 1310 is shown as having been backed up several times, which is indicated by backup events 1320, 1321, and 1322. Each backup event includes, along with other fields, an indication of the date and time of the backup 1320a, identification of the depository backup partner used 1320b, a unique identifier for the file used to identify the file on the depository backup partner's computer system 1320c, a size indicator 1320d, and a checksum for validating transmissions 1320e. The file's last-modified date, as indicated by the operating system, is also included in the record for each backup event (this is not shown in FIG. 13). In other implementations, other information may be additionally stored or different information may be stored. A similar set of information is kept for the reciprocal backups—files stored on the computer system on behalf of the depository partners—except that the unique identifier is the field used to identify the file since actual file and directory names and the hierarchical structure are not known.

In addition, the RBS may maintain other information in the backup data repository, such as a table organized by unique object identifier, so that a backed up file's original location is readily accessible for restoration purposes. For example, the RBS may maintain for each unique identifier, an indication of the corresponding file and its original location. In FIG. 13, unique identifiers 1320c and 1321c both correspond to file identifier 1310, whose identified file was backed up from location 1331 (representing two backups of the same file to two different depository partners). Similarly, unique identifier 1326c corresponds to file identifier 1312, which identified file was backed up from location 1332.

One of the central aspects of a Reciprocal Backup System is its ability to perform backup and restoration operations automatically on behalf of users, using peer-to-peer communication techniques, without the users needing to monitor the connection state of the various backup partner machines or knowing where its depository backup partners are located. One method for determining locations of backup partners is for the users to explicitly exchange network addresses, such as by email, before establishing the reciprocal backup relationship and when such addresses change. This method is onerous to the user and unreliable as addresses change and it may be difficult for a user to keep track of who needs to be notified. A preferred approach is to use an independent directory service which stores and serves network addresses. The independent directory service is a network-accessible server that the RBS on each user's computer system uses to pass along its own computer system network address and in return receive each of its backup partner computer systems' network addresses.

These directory services can take different forms. For example, a centralized directory service, such as the one Napster incorporates, stores all the users' information and serves it to others from a central server. Other known peer-to-peer file sharing services, such as Kazaa, provided a decentralized service, where multiple servers are used and the number of servers can flexibly change.

Because network addresses can change, especially the Internet IP addresses for home computers, the RBS checks the validity of a backup partner's network address on each exchange, re-retrieving it from the directory service as needed. And, when a user's network address does change (e.g. it's assigned a new IP address), the reciprocal backup system needs to update the directory service.

Note that, using an RBS, a backup partners' files don't go through the directory service. The service only used to communicate network addresses between backup partners. Once addresses are exchanged, files can be sent directly from partner to partner, as they do with other peer-to-peer file sharing services. If both backup partners using the RBS have a dial-up or otherwise intermittent connection, then a caching server may be used to store and forward files.

As mentioned with respect to the example user interface of an RBS described with reference to FIGS. 5-11, some computer systems may have more persistent connections to the network than others (e.g., an always-on connection versus a dial-up connection) and computer systems are sometimes unavailable for other reasons, such as a power failure. Thus, a reliable RBS needs to account for unavailable backup partners, including being able to locate computer systems when they are not on-line.

Figure 14A:
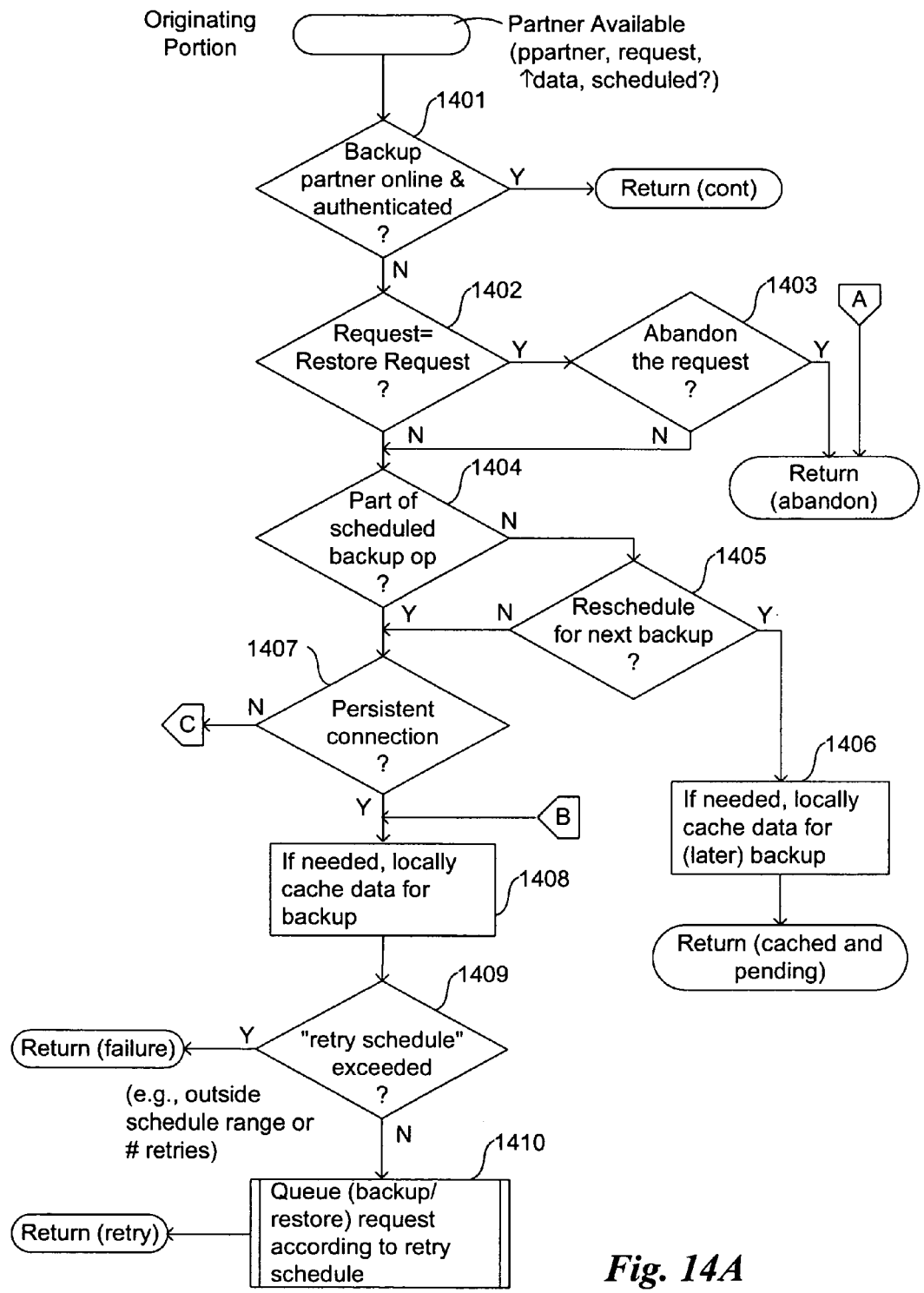
FIGS. 14A and 14B are an example flow diagram of an example availability testing routine provided by an RBS partner support component for determining in a peer-to-peer environment whether a desired backup partner is now available for a backup or restore operation.
Figure 14B:
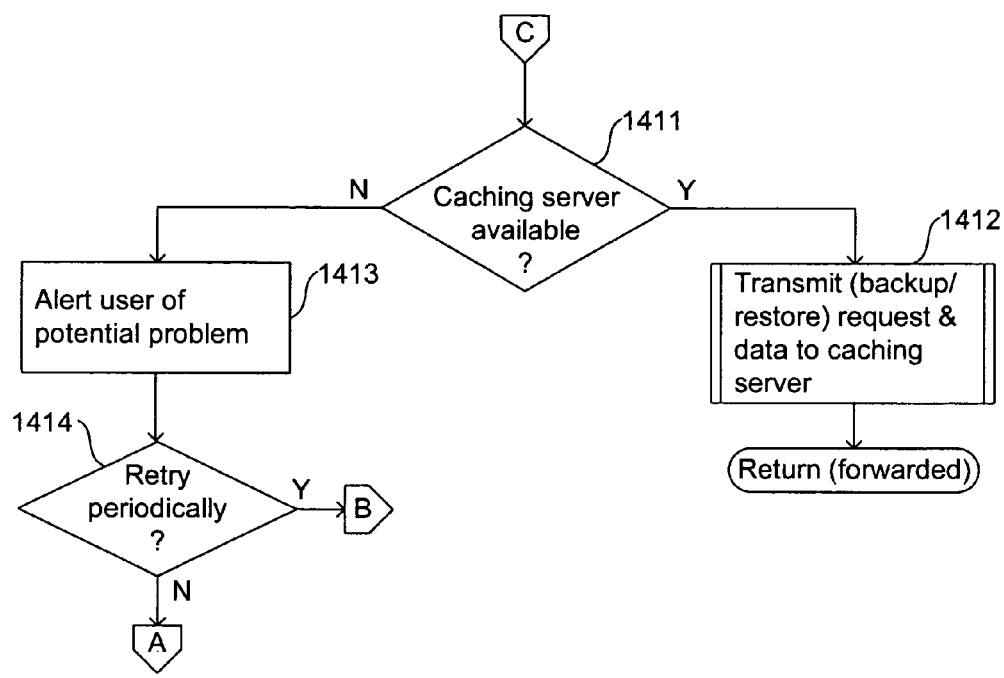

FIGS. 14A and 14B are an example flow diagram of an example availability testing routine provided by an RBS partner support component for determining in a peer-to-peer environment whether a desired backup partner is now available for a backup or restore operation. The availability testing is typically performed by the originating portion of the RBS partner component, such as originating portion 407 of the reciprocal backup agent 405 described with respect to FIG. 4. In summary, if a backup partner is not online, then either the request is abandoned, scheduled for another time, or user intervention is requested. When caching is available (either locally and/or through a caching server) then the request and data (in the case of a backup operation) are stored in a cache. Other arrangements and flows are contemplated, and those shown in FIGS. 14A and 14B are examples.

In step 1401, the routine determines whether a designated partner is on-line, for example, by sending the partner system a message over the network and authenticating the response. (In some embodiments in which a directory service is used, if the partner isn't available or cannot be authenticated, then the routine contacts the directory service for updated information.) If so, then the routine simply returns a "success" status, because its work is complete. If not, then the routine continues in step 1402 to determine whether the designated request was a restore operation, and, if so, inquires in step 1403 whether the user wishes to abandon the restore request. If in step 1403 the user chooses to abandon the request, then the routine returns an "abandonment" status; if not, the routine continues in step 1404. This status can be reflected in a current status window, such as status window 501 in FIG. 5. In step 1404, the routine determines if it was invoked as part of a pre-scheduled backup, and, if so, skips to step 1407 to avoid user interaction, and, if not, continues in step 1405. In step 1405, the routine inquires of the user whether to reschedule the user requested operation for the next scheduled backup (if one is scheduled). If so, then the routine continues in steps 1406, else continues in step 1407. In step 1406, if the data for the backup isn't already coming from a local cache (not shown), the data is cached, for example, using a local cache, for later transmission along with the designated request, and the routine returns a "cached & pending" status. The data may already be cached, for example, using snapshots described earlier for selected object immediate backup commands when the user requested the RBS to use the next scheduled backup. (The data may also be cached if the routine is invoked as a result of a retry operation.) In step 1407, the routine determines whether the originating partner has a persistent connection to the network, and, if so, continues in step 1408, else continues in step 1411. In step 1408, if the data for the backup isn't already coming from a local cache (not shown), then the routine snapshots the data by caching it, and continues in steps 1409. The request will be retried (and potentially fail again), but the data will remain in the cache. Other scenarios could also be implemented, including specific configuration options. In step 1409, the routine determines whether the retry schedule has been exceeded, and, if so, returns a "failure" status, otherwise continues in step 1410. In step 1410, the designated request is queued up for the depository partner and will be processed according to the retry schedule, and the routine returns a "retry" status.

If a persistent connection is not available, then in step 1411, the routine determines whether a caching server is available, and, if so, continues in step 1412, else continues in step 1413. In step 1412, the routine transmits the backup or restore request and the corresponding data to the caching server, and returns a "forwarded" status. The cached data and request will be retrieved by the depository partner when the depository partner comes on-line. Otherwise, in step 1413, the routine alerts the user that the depository partner is not currently on-line and no caching server is available so the backup operation cannot be performed at that time. In step 1414, the routine inquires whether the user would prefer the RBS to periodically retry the operation, and, if so, continues in step 1408 to cache the data if not already cached; otherwise, the routine returns an "abandoned" status. Note that continuing in step 1408 to cache the data at that time is one choice. Other implementations may inquire whether the user wants to snapshot the data, or may choose to default to not caching the data and thus backing up the data only as of the time the backup partner is available. These types of choices could be made as part of an RBS configuration process. Also, the RBS can be configured with a option to retry failed backup and restore operations for some period of time, number of attempts, or other metric to avoid user notifications in such situations. When configured as such, the user will be notified in step 1409 if the retry ultimately fails. Note that in the case of scheduled backups, the RBS will automatically retry periodically throughout the time period specified in the backup schedule without requiring user intervention.

The RBS partner support includes a scheduler, for example schedule 404 in FIG. 4. One skilled in the art will recognize that standard scheduling techniques and support can be implemented, including the processing of RBS backup and restore operation queues. When an operation is to be performed from the queue, then the RBS invokes the appropriate routine to handle the backup or restore operation. Additionally, in its role as a depository partner, the RBS is responsible for processing other originating partner requests. When both backup partner computer systems are on-line, the requests can be handled, for example, by the reciprocal backup agent of the depository partner, as soon as the requests are received from originating partners. However, when a system is off-line or intermittent, the requests may be queued on the originating partner computer system.

In some situations, the RBS of the originating partner will handle the queues and all retry backup and restore operations awaiting a backup partner's availability. In such cases, an intermittent or unavailable depository partner acts in a passive role, and awaits requests to be sent from the originating partners during periods when it is on-line. Alternatively, in other situations, such as when the depository partner comes on-line, the RBS of the depository partner polls for backup and restoration requests from each of its backup partners and from any configured caching servers when the depository partner comes on-line. One skilled in the art will recognize that many different synchronization options are available, and the RBS may be configured to use one or more such options.

In the situation where a backup partner is on-line and receives a request from a partner, that request will normally be handled immediately by the RBS without any user interaction or notification. This includes backup requests, restoration requests, integrity check requests, as well as other forms of requests and messages unless they overtly require user intervention or signify a circumstance that warrants user notification. In the alternative situation where a computer system has just come on-line, it will poll reciprocal backup partners (and caching servers that are used in such relationships) to see if there are any outstanding requests. In this situation, the RBS will optionally, based on user settings, provide the user with explicit control over the time such pending requests are serviced.

Figure 15A:
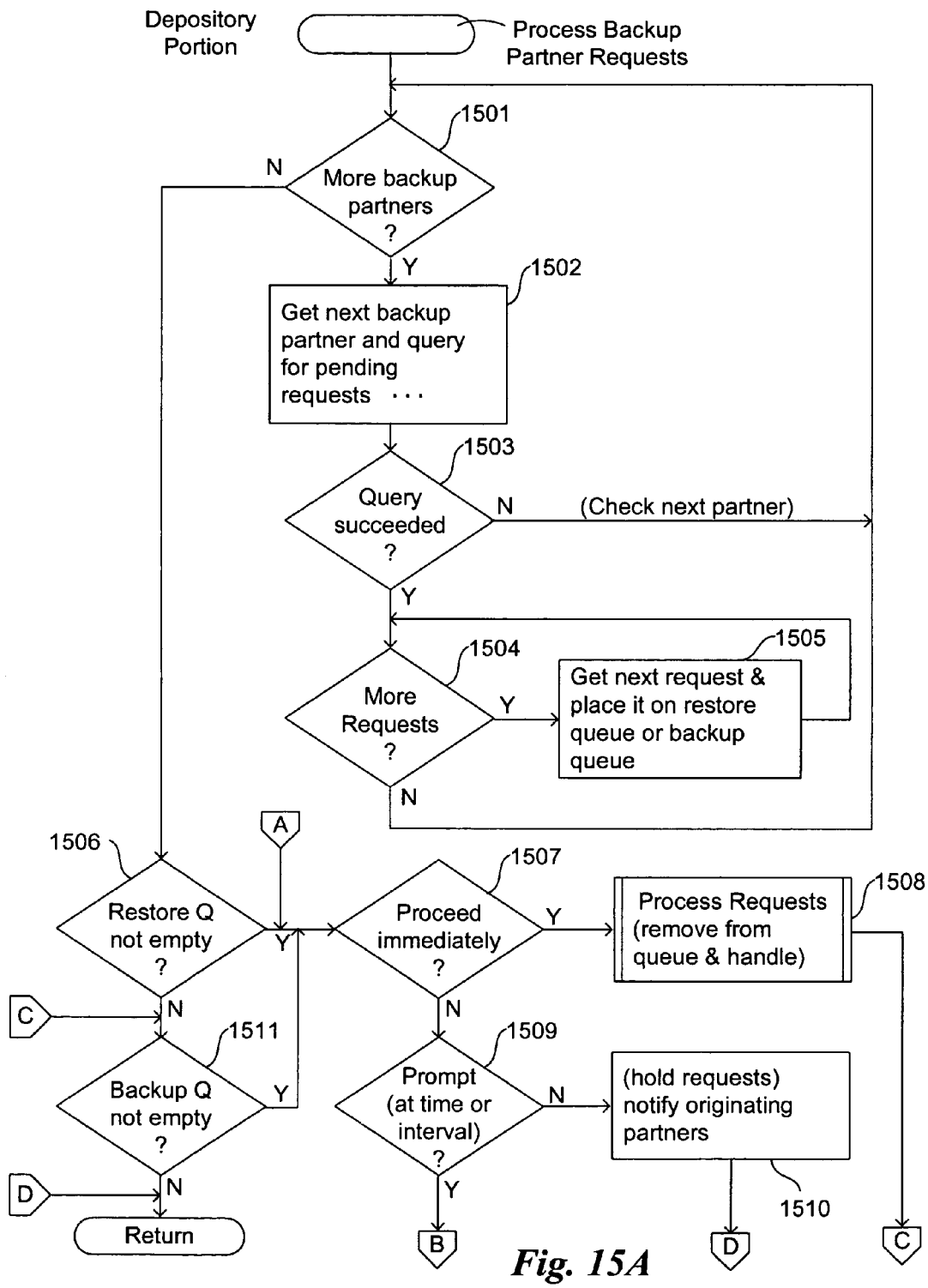
FIGS. 15A and 15B are an example flow diagram of an example request processing routine provided by an RBS Partner Support component for processing backup system requests in a peer-to-peer environment.
Figure 15B:
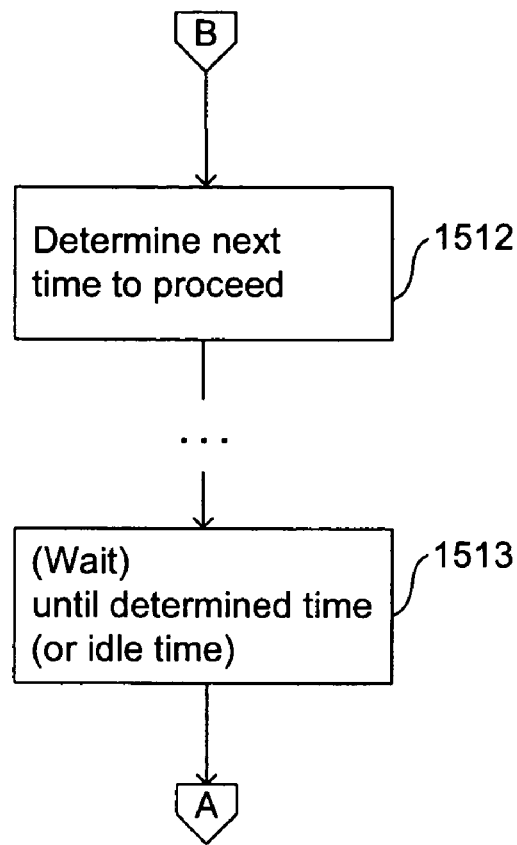
Figure 16A:
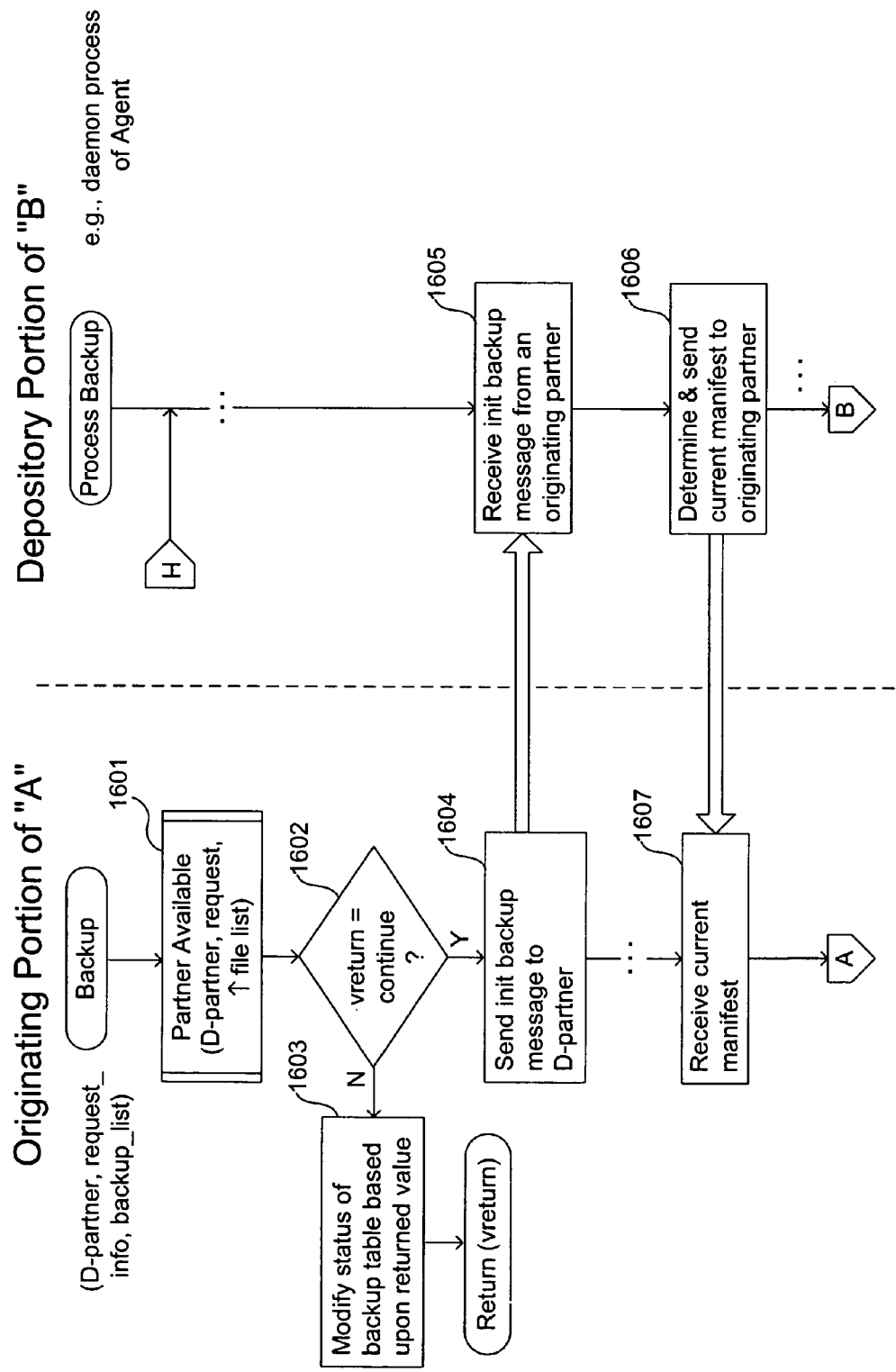
FIGS. 16A-16E are an example flow diagram of the interaction between the RBS partner support components of two backup partner computer systems to accomplish a backup operation in a Reciprocal Backup System.
Figure 16B:
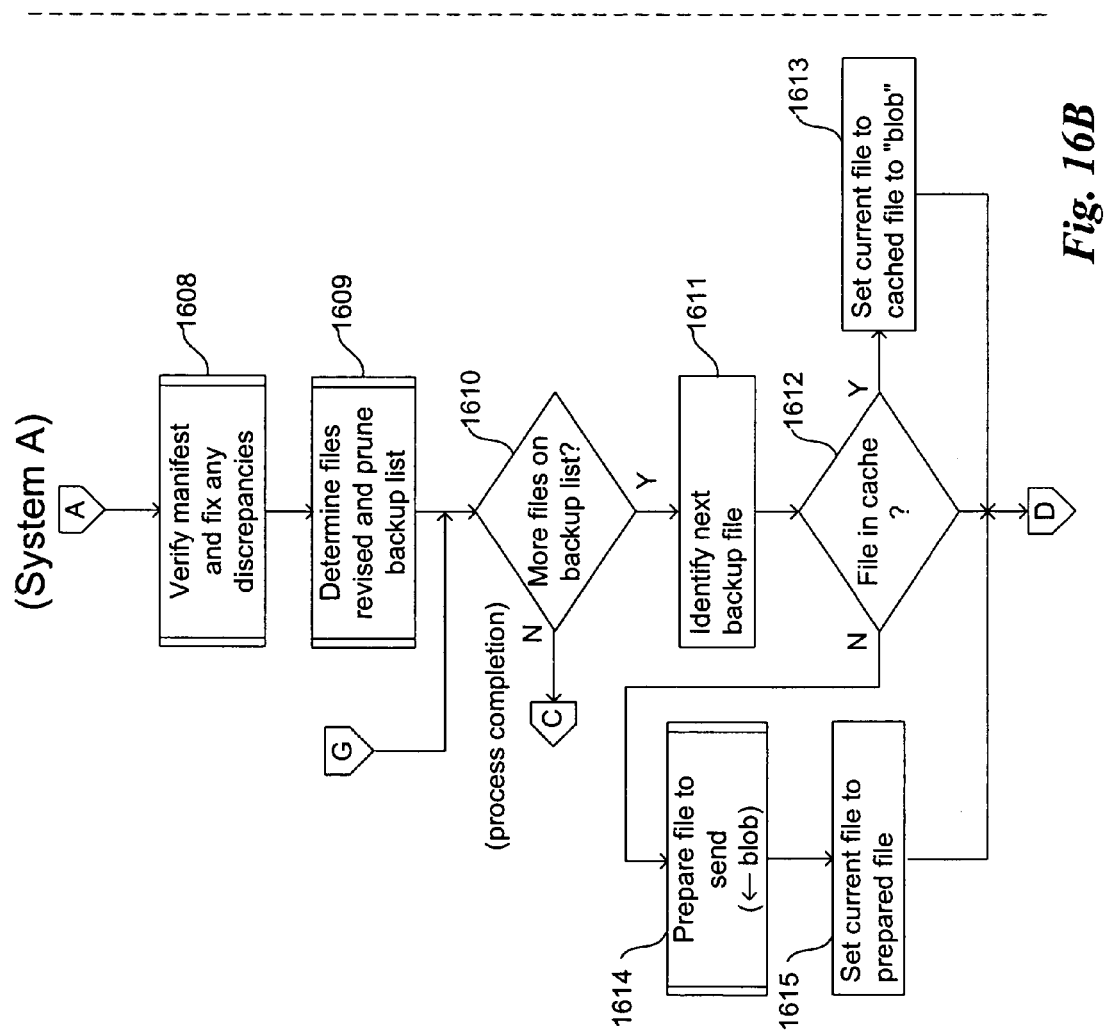
Figure 16C:
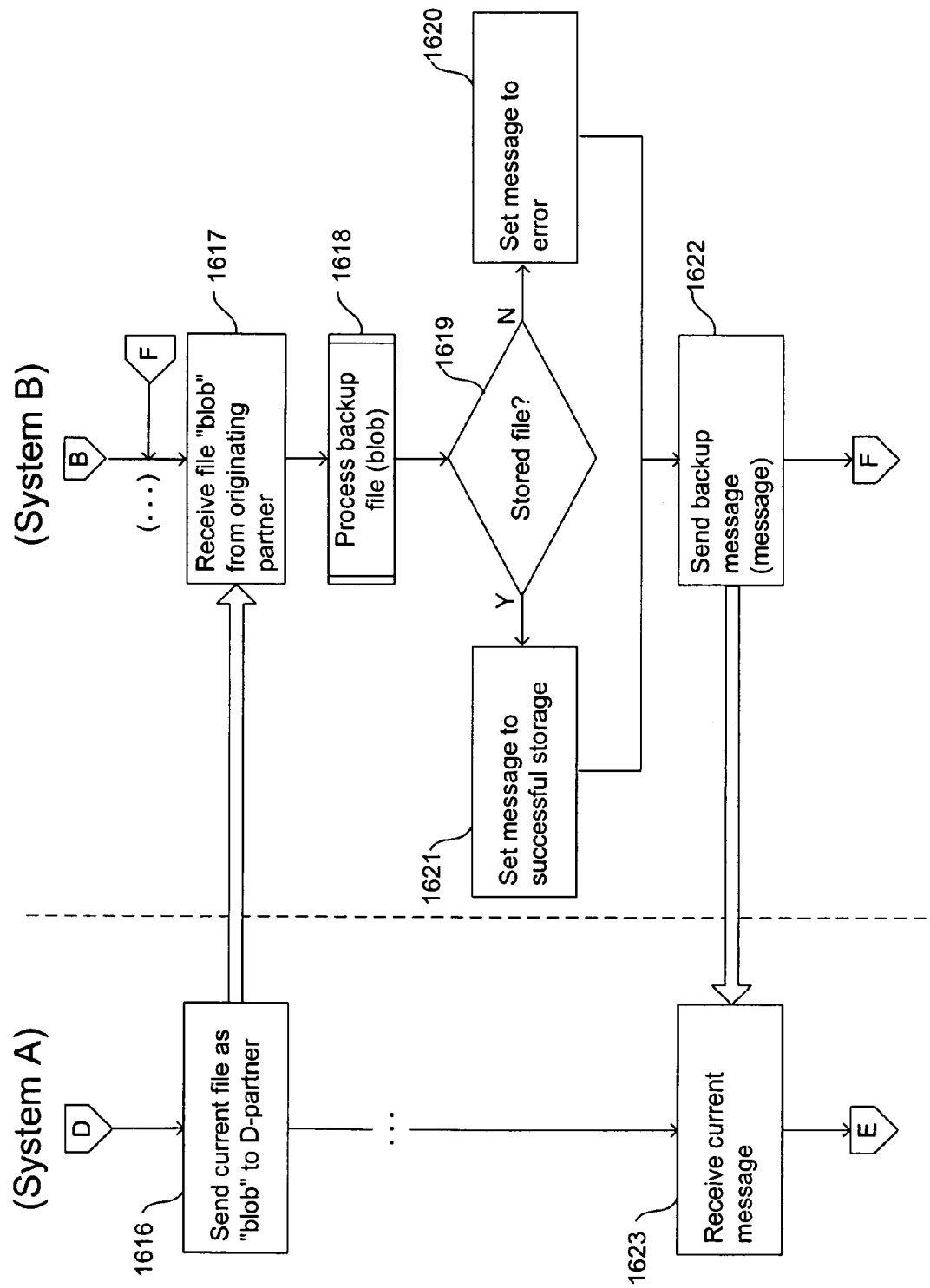
Figure 16D:
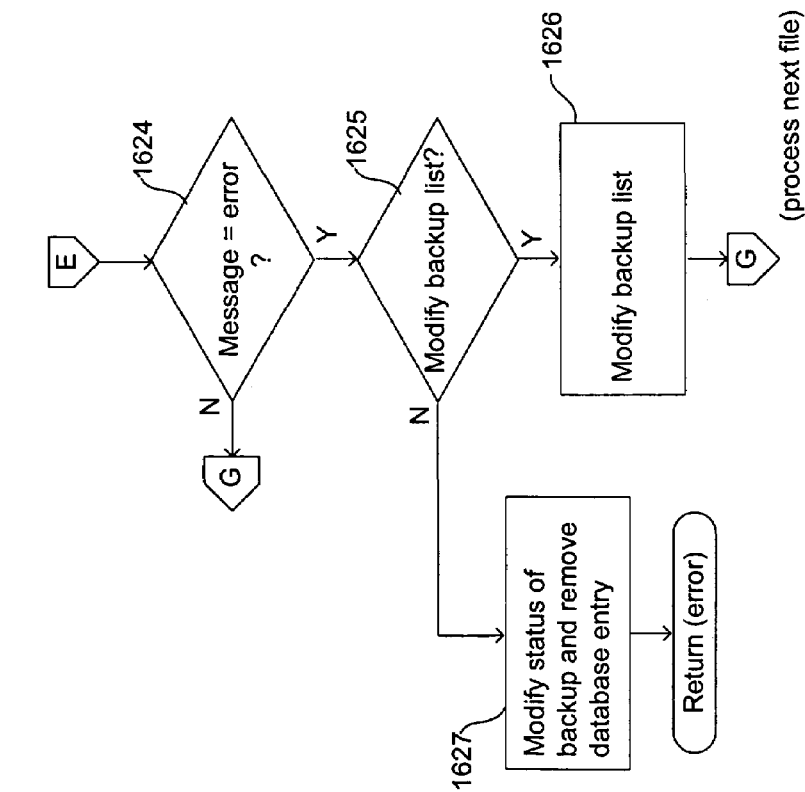
Figure 16E:
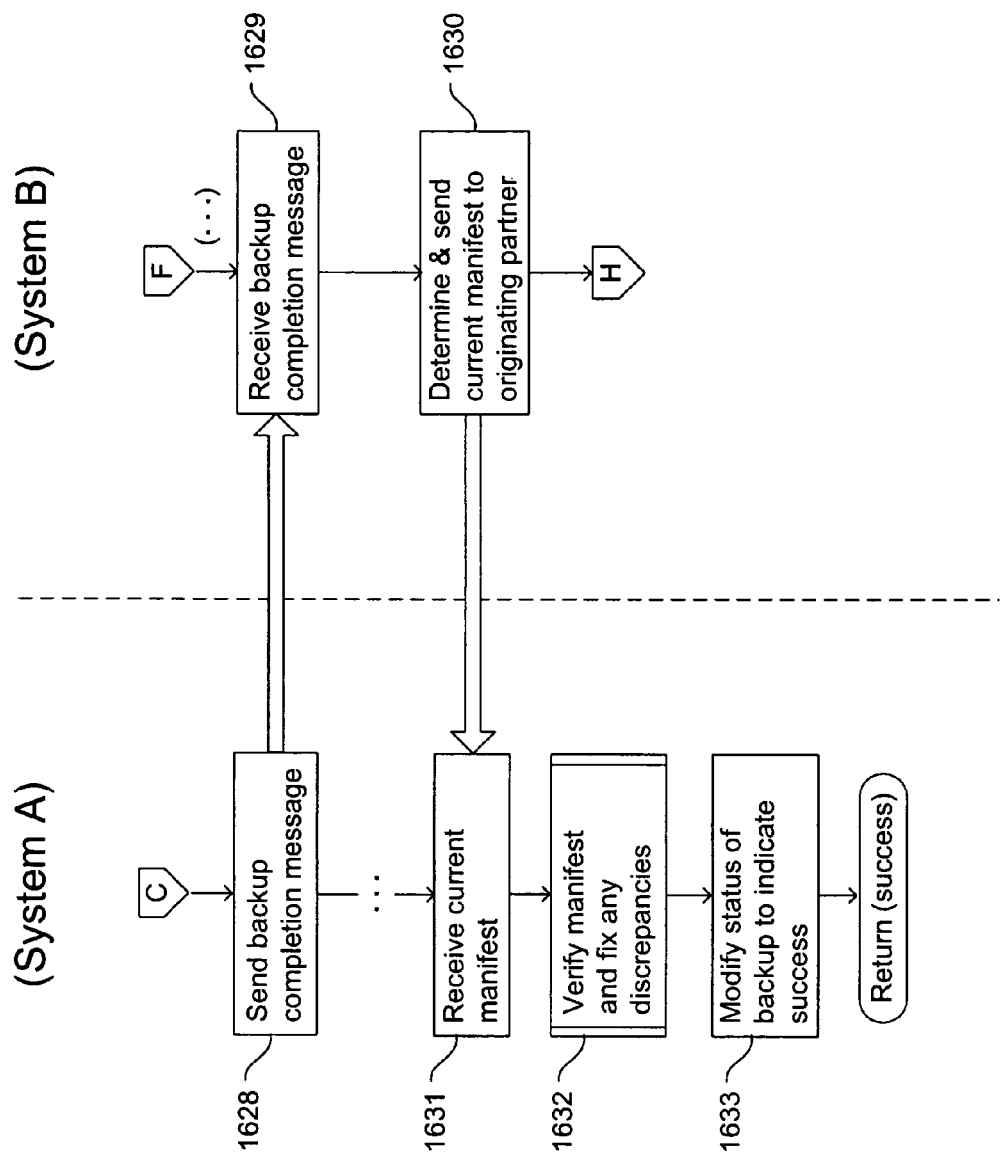

FIGS. 15A and 15B are an example flow diagram of an example request processing routine provided by an RBS Partner Support component for processing backup system requests in a peer-to-peer environment. This routine typically is invoked by a backup partner in its depository role when the computer system comes on-line to poll for and process reciprocal backup partner's queued requests. In summary, the routine queries each of its backup partners for pending requests, formulates queues to process the requests, and then processes the requests form the resultant queues. An implementation in which the depository partner polls for originating partner requests may allow the user of the depository partner system better control over when the computer resources are allocated to RBS functions, instead of merely accepting user requests as soon as the depository computer system comes on-line. Users can control how to handle restore requests separately from backup requests, so that restore requests can be handled in a more urgent fashion since backup requests can be cached with essentially no loss of functionality. Of course, other polled and non-polled embodiments are also possible.

Specifically, steps 1501-1505 provide a loop to obtain pending requests. In step 1501, the routine determines whether there are more backup partners (or caching servers) to process, and, if so, continues in steps 1502, else continues in step 1506. When a partner is known to have a caching server, the caching server is included in its list of backup partners. In this manner, requests that have been cached by an originating partner under an established reciprocal backup relationship that utilizes a caching server are properly handled. In step 1502, the routine contacts the next backup partner from a list of current backup partners and queries the next partner for pending requests. One skilled in the art will recognize that many messages are supported by the reciprocal backup agent traffic controller portion of the RBS, including responding to queries for pending requests. Standard messaging techniques may be used. In step 1503, if the query returns a request, then the routine continues in step 1504, else continues back to the beginning of the loop in step 1501 to query more backup partners. In step 1504, the routine determines whether there is an additional pending request, and, if so, in step 1505 places it on a (resident) restore request queue or a backup request queue as appropriate, and continues back to step 1504 to query for more pending requests. When no more requests are available from that backup partner, then the routine continues back to the beginning of the loop in step 1501 to query more backup partners.

In steps 1506-1511, the routine processes the resident restore request and backup request queues. In an alternative embodiment, steps 1506-1511 are performed for each backup partner within the loop specified by steps 1501-1505 prior to obtaining requests from another backup partner. In step 1506, if the restore request queue is not empty, then the routine continues in step 1507, else continues in step 1511. In step 1507, the routine inquires whether the user wishes to proceed immediately to process the restore queue, and if so continues in step 1508, else continues in step 1509. In step 1508, then the routine invokes a routine to remove the requests from the queue and process them accordingly. An example routine that processes a restore request from a depository partner perspective is described below with reference to FIGS. 19A-19D (FIG. 19). The routine then continues in step 1511 to process the backup request queue. If instead in step 1507 the user indicates a desire to wait, then in step 1509, the routine queries whether the user wishes to be prompted to perform the requested operation later (for example, when the system is otherwise idle) or to hold the request until a subsequent session. If not, the routine continues in step 1510, other continues in step 1512. In step 1510 the routine notifies the originating backup partner computer system so that its user can be notified, the requests are then held on the depository partner's request queues as pending, and the routine returns. Otherwise, if in step 1509 the user indicated that prompting is desired, the routine continues in step 1512. In step 1512, the routine determines from the user the next time to proceed and waits in step 1513 until such a time or until the system is idle, and then returns to step 1507 to prompt the user to see if the user is ready. (If the user terminates the network connection after indicating a desire to be later prompted in step 1509, then the RBS preferably detects this and notifies the user accordingly.) In step 1511, the routine begins processing the backup request queue. An example routine that processes a backup request from a depository partner perspective is described below with reference to FIG. 18. The routine determines whether the backup request queue has something on it, and, if so, continues in step 1507 to query the user as to how to process the backup requests. If the backup request queue is empty, then the routine returns, as it has processed both queues.

FIGS. 16A-16E (FIG. 16) are an example flow diagram of the interaction between the RBS partner support components of two backup partner computer systems to accomplish a backup operation in a Reciprocal Backup System. This routine is invoked for each depository partner indicated in a scheduled backup. When a backup operation is initiated, a designated depository partner, request information, and an indicator to the standing backup list or ad hoc backup list is provided. In summary, as soon as the designated depository partner (Partner B) is available, the current manifest for the originating partner (Partner A) on the depository system is verified, the files to be transmitted are identified, and then transmitted from the originating partner to the depository partner as encrypted files, along with unencrypted file properties such as a last-modified date/time stamp, size, and checksum. The files are processed by the depository partner in the illustrated embodiment one-by-one as they are received from the originating partner. One skilled in the art will recognize that many different flows and alternate architectures are possible, including changes to what is transmitted, whether the objects are sent individually, processed as they are received, when integrity checks are performed, etc. All such implementations can be used with the methods and systems of the present invention.

Specifically, in step 1601, the backup routine of the originating portion of the originating partner invokes a partner_available routine to determine whether the designated depository partner (Partner B) is available and authenticated. An example partner_available routine was described with reference to FIGS. 14A and 14B. In step 1602, if the partner_available routine returns a success status indicator, then the backup routine of the originating partner continues in step 1604, else continues in step 1603. In step 1603, the backup routine of the originating partner modifies the status indicator that corresponds to the depository partner in the current status window (e.g., status window 501 in FIG. 5) to correspond to the status returned by the partner_available routine. The backup routine then returns and reports the same status indicator. In step 1604, the backup routine of the originating partner sends an init backup message to the depository partner and awaits a response. (The routine interaction works synchronously or asynchronously, although an asynchronous version is illustrated.) The depository partner's process backup routine, which may be executed for example as a daemon process on the Backup Agent component of the depository partner's RBS Partner Support, is awaiting messages. When in step 1605 it receives the init backup message, the process backup routine continues in step 1606 to determine and send back to the originating partner the current backup manifest that corresponds to the originating partner's reciprocal backup storage on the depository partner's system, and then awaits the next message.

In step 1607, the originating partner's backup routine receives the current backup manifest and in step 1608 verifies its correctness. If discrepancies are noticed between what the originating partner determines should be stored on the depository partner computer system versus what the depository partner is reporting, then the originating partner can fix them. Each time there is a reciprocal backup transaction between partners (backing up or restoring a file in either direction) and at preset integrity-checking times or intervals, the depository partner sends a copy of its current backup manifest to the originating partner. The originating partner then checks the list of files including their last-modified date/time stamps, backup date/time stamps, sizes, and checksums against the originating partner's own database. If there is a discrepancy between what is reported by the depository partner and what is recorded in the originating partner's database, the RBS can handle the discrepancy as follows:

(1) if one or more files or directories are recorded in the database but missing or with different properties (size, data, checksum) on the depository partner's computer system, other than those files that are planned to be backed up in the present operation, a dialog box is displayed to give the user of the originating partner system the option of re-transmitting the file(s)/directory(ies) for backup at that time. If the user selects this option, the request is treated as if the user gave a Backup Now command. If not, the entries in the originating partner's database are removed, and depository partner is instructed to correspondingly remove entries and/or backed up files; or (2) if one or more files or directories are found on the depository partner's computer system but not recorded in the originating partner's database, a further check is made to see if the files exist on the originating partner's computer. If they are present, then the originating partner's database is simply adjusted to add these entries. If they are not present, then a dialog box is displayed giving the user of the originating partner system the option to either (a) restore the file(s)/directory(ies) at that time; or (b) delete the files from the depository partner's computer system. If the user chooses to restore the file(s)/directory(ies), the request is treated as if the user gave a Restore Files command.

A similar check can be made when the reciprocal backup relationship is first established, for example through the interface described with reference to FIG. 6. If it is found that one of the partners already has backup storage from the other, the user of the would be originating partner system is notified and given the option of restoring the files and directories. One situation in which this arises is when a user's local computer storage has been partially or fully lost, including the reciprocal backup system's database, and the user wants to restore backed up files. By re-establishing reciprocal backup relationships with their previous backup partners, the reciprocal backup system will discover their previously backed up files and can restore them. In one embodiment, explicit command support is offered for system recovery.

In step 1609, the originating partner's backup routine determines what files/directories need to be transmitted for the backup. If the backup is being performed for a selected list of files/directories, then this list is pruned to omit transmitting files that have not changed since the last backup, although the user can specify as an option to retransmit all indicated files regardless. Whenever possible, files are not re-transmitted if the current version already exists on the depository partner's computer system. The RBS can determine from the manifest whether a current version of the file exists from the file name (or unique identifier), size, last modified date/time stamp, and checksum. This situation can occur when a file is included in repetitive backup operations, but doesn't change in the interval.

Steps 1610-1626 constitute a loop to perform and process the back up of each file on the resulting, pruned backup file list. For a given file, if the copy to be backed up has been earlier transferred to the local cache, then the cached version of the file is transmitted instead of the file from its native location. This behavior enables the RBS to successfully implement snapshots. Once the backup operation is successful, the cached files that have been backed up are removed from the cache. Specifically, in step 1610, the originating partner's backup routine determines whether there are more files to process, and, if yes, continues in step 1611, else skips to step 1628 to complete the backup process. In step 1611, the backup routine identifies the next file to be backed up. In step 1612, the routine determines whether the file is present in the local cache, and, if so, the routine continues in step 1613 to set the current file to indicate the cached file "blob;" otherwise, continues in step 1614. In step 1614, the routine prepares the indicated next file for backup. In particular, the backup routine creates a blob (e.g., a data chunk) that contains the file in encrypted form (based upon the RBS' or user's previously specified encryption key or inquires for the same) and an unencrypted set of properties, including, for example, a last-modified date/time stamp, a backup date/time stamp, a size indication, and a checksum. Packaging the file to be transmitted along with its related data as a single blob is a convenient way to transmit those items together in a single transmission operation. One skilled in the art will recognize that these items could also be transmitted independently one at a time, without packaging them as a single blob. An example routine for preparing a file to send for backup is described below with reference to FIG. 17. The first time a file is backed up, the encrypted copy is given a randomly generated name, which is transmitted along with the file blob. The originating partner uses this name to identify the file blob when communicating with the depository partner, hiding the actual name. The originating partner stores this name associated with the file in its database as shown for example in FIG. 13. In step 1615, the routine sets the current file to indicate the prepared file. Then in step 1616, the originating partner's backup routine sends the indicated current file (either the cached file or the newly prepared blob) to the depository partner.

In step 1617, the depository partner's process backup routine receives a message with the file blob from the originating partner. In step 1618, the depository partner then invokes a routine to process and store the backup file with the received blob as the designated file to back up. The process backup file routine is described further with respect to FIG. 18. In step 1619, the process backup routine determines whether the file was stored successfully, and, if so, continues in step 1621 to set up a successful return message, else continues in step 1620 to set up an error message. In step 1622, the process backup routine sends the set message back to the originating partner.

In step 1623, the originating partner's backup routine receives the backup message from the depository partner indicating the status of the backup of the current file. If, in step 1624, the message indicates that an error occurred, then the backup routine continues in step 1625, otherwise the backup routine updates the database to reflect the successful backup of the file (not shown) and returns to the beginning of the loop in step 1610 to see if there are more files in the pruned list to back up. The error returned in step 1623 may indicate that there is insufficient space on the depository computer system to store the current file, or other errors. In step 1625, the user is thus queried (if no defaults are provided, for example, to complete a partial backup) to determine whether modifying the backup list is an acceptable alternative. If so, then the backup routine continues in step 1626 to present a dialog box that enables the user to modify the backup list and to specify whether to make these changes in effect for future backup operations. If not, then the backup routine continues in step 1627 to modify the status of the backup entry that corresponds to the depository partner in the current status window (e.g., status window 501 in FIG. 5) to indicate a failed backup operation and to remove any database entries that might otherwise indicate that a successful backup operation has occurred. The backup operation is then terminated with an error status.

In one embodiment, when the user has indicated a desire to modify the backup list, then in step 1626 the user is presented with a dialog box similar to the one described with reference to FIG. 8 but that also indicates the files/directories that could not be backed up. The user may then modify the backup list on a one time or persistent basis, removing some files from it and/or designating some of the files to be backed up to other partners' computers, or simply stopping the operation at that point. In addition, the user can attempt to modify the reciprocal backup relationship and request more space, or remove some of the already backed up files, using the "Modify" command (e.g., Modify link 508) that corresponds to the depository partner. A user might need to remove files in this manner instead of simply modifying the backup list when the files were backed up individually using the selected object backup command.

Once the backup list has been modified, the originating partner's backup routine returns to step 1610 to process the next file. When there are no more files to process then the backup routine continues in step 1628 to complete the backup operation. Specifically, in step 1628, the originating partner sends a backup completion message to the depository partner. The depository partner's process backup routine receives the completion message in step 1629, and in step 1630 determines and sends a current copy of its backup manifest for the originating partner back to the originating partner. The depository partner then awaits the next message. In step 1631, the originating partner's backup routine receives a copy of the current manifest and, in step 1632, verifies the manifest and fixes any discrepancies as described earlier. In step 1633, the backup routine modifies the status of the backup entry that corresponds to the depository partner in the current status window (e.g., status window 501 in FIG. 5) to indicate a successful backup operation, and returns, indicating that the backup operation was successful.

Note that, in an alternative embodiment, the RBS present on the originating partner computer system determines ahead of time whether or not there is sufficient room to store a given set of files/directories on a given depository partner computer system. Specifically, the RBS of the originating partner maintains information in its own data repositories that indicates which files are backed up to each depository partner and the size of each file. Therefore, the RBS should in theory be able to inform the user that a designated list of files will or will not fit prior to transmitting any files and can choose to disallow the backup operation if there is insufficient space. In addition, after the backup routine of the originating partner receives a copy of its current manifest from the depository partner, after any discrepancies are addressed, the routine has an additional opportunity to determine whether the selected files will fit on the depository partner's computer system before attempting to transmit them. Thus, a backup operation that results in insufficient space should be a rare occurrence, providing the depository partner truly has the committed amount of available storage.

Figure 17:
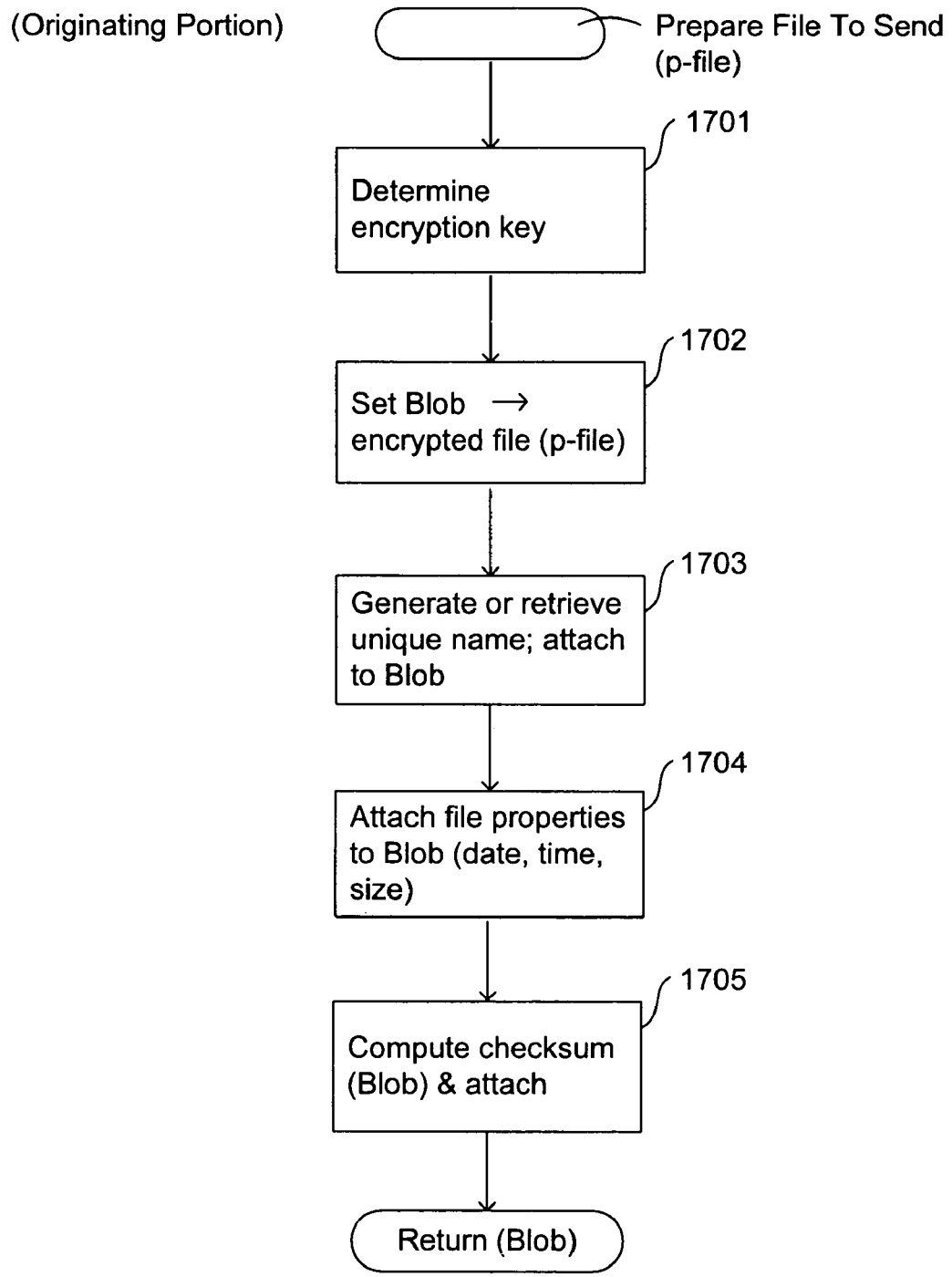
FIG. 17 is an example flow diagram of a file preparation routine provided by an RBS partner support component to prepare a file prior to sending it for backup to a backup partner computer system.

FIG. 17 is an example flow diagram of a file preparation routine provided by an RBS partner support component to prepare a file prior to sending it for backup to a backup partner computer system. This routine is invoked, for example, by the backup routine of the originating partner in step 1614 in FIG. 16 or when a file is transferred to the local cache. For each designated file, the file preparation prepares a data blob for transmission to the depository partner, although as mentioned one skilled in the art will recognize that these items could also be transmitted independently one at a time, without packaging them as a blob. Specifically, in step 1701, the routine determines an appropriate encryption key to use. Standard encryption techniques and user interfaces may be used to implement this step. In step 1702, the routine "loads" the encrypted file into the blob. In step 1703, the routine queries the database to determine if the file has previously been sent to this partner and, if so, retrieves the unique name previously assigned (not shown). Otherwise, the routine generates a unique name using standard techniques and then, regardless of which course was taken, loads the unique name into the blob as unencrypted data. This name is used by the depository partner to identify the file/directory to maintain security of the originating partner's data. In step 1704, the routine copies and attaches the file properties to the blob, including an operating system determined date/time stamp for this file's last modification and an indication of the file's size. In step 1705, the routine computes a checksum that will be used to verify the correctness of the transmitted bits, and attaches this checksum to the blob as well.

Figure 18:
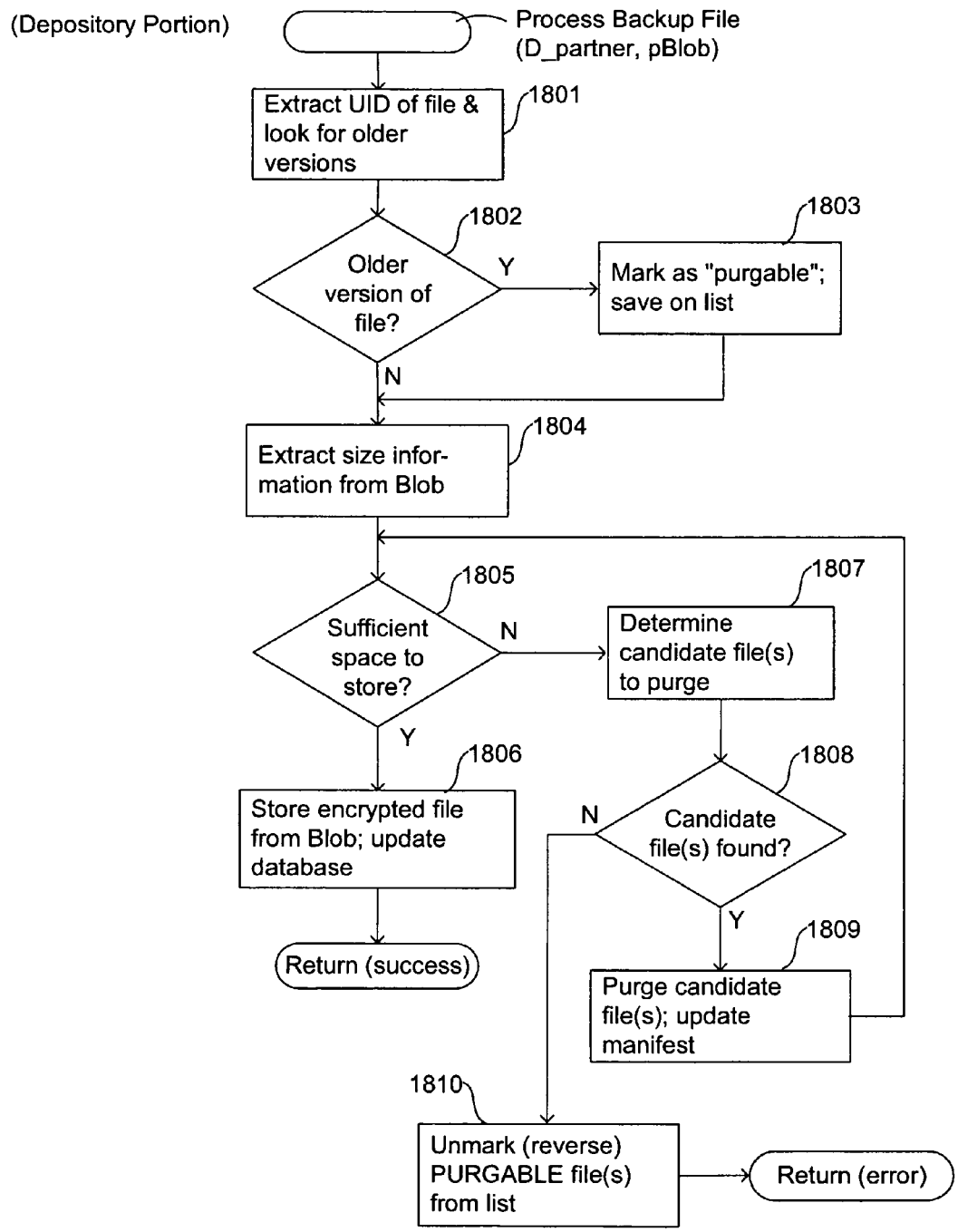
FIG. 18 is an example flow diagram of a process backup file routine provided by an RBS partner support component of a depository partner to process a received file for reciprocal backup.
Figure 19A:
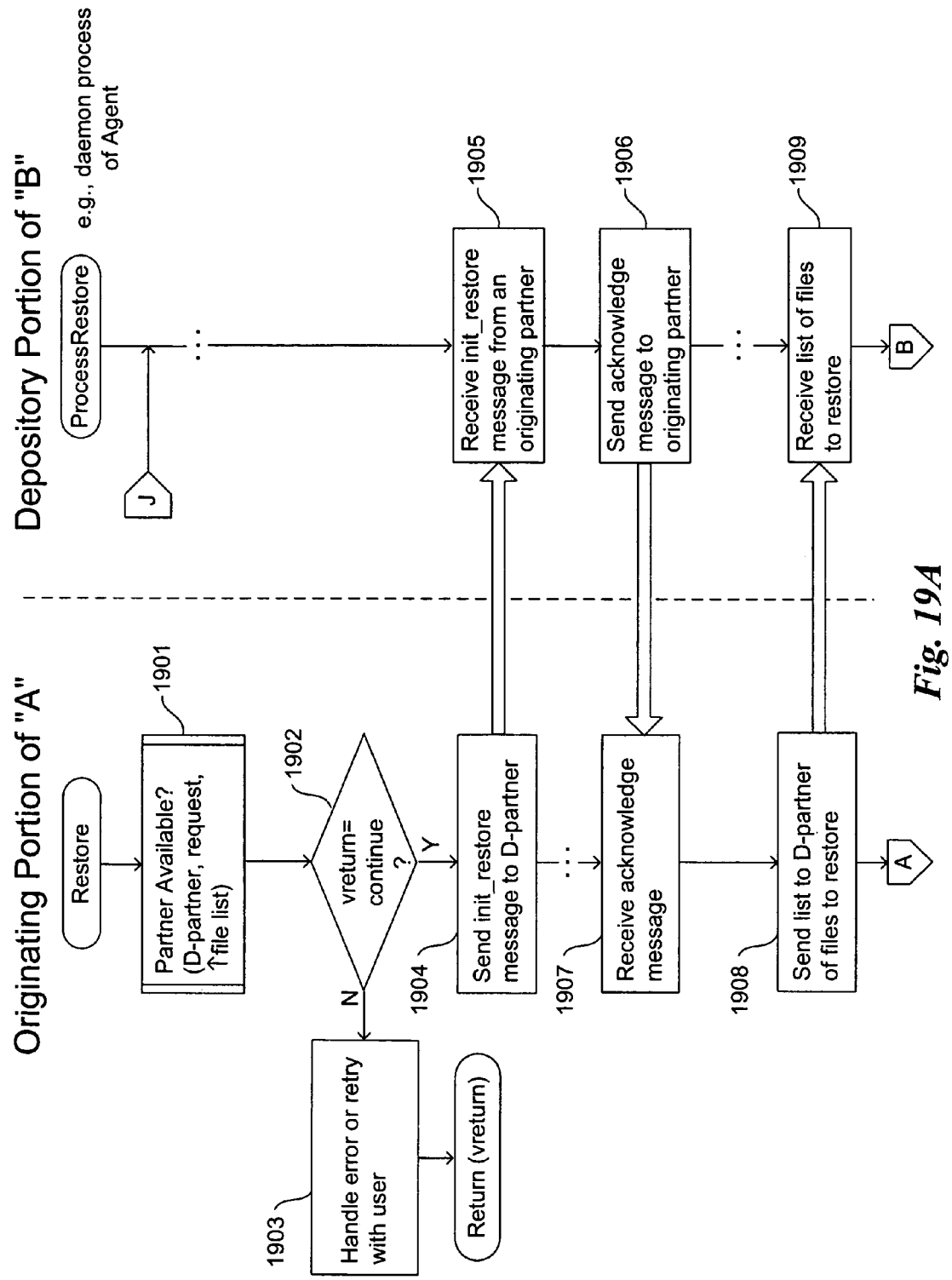
FIGS. 19A-19D are an example flow diagram of the interaction between the RBS partner support components of two backup partner computer systems to accomplish a restore operation in a Reciprocal Backup System.
Figure 19B:
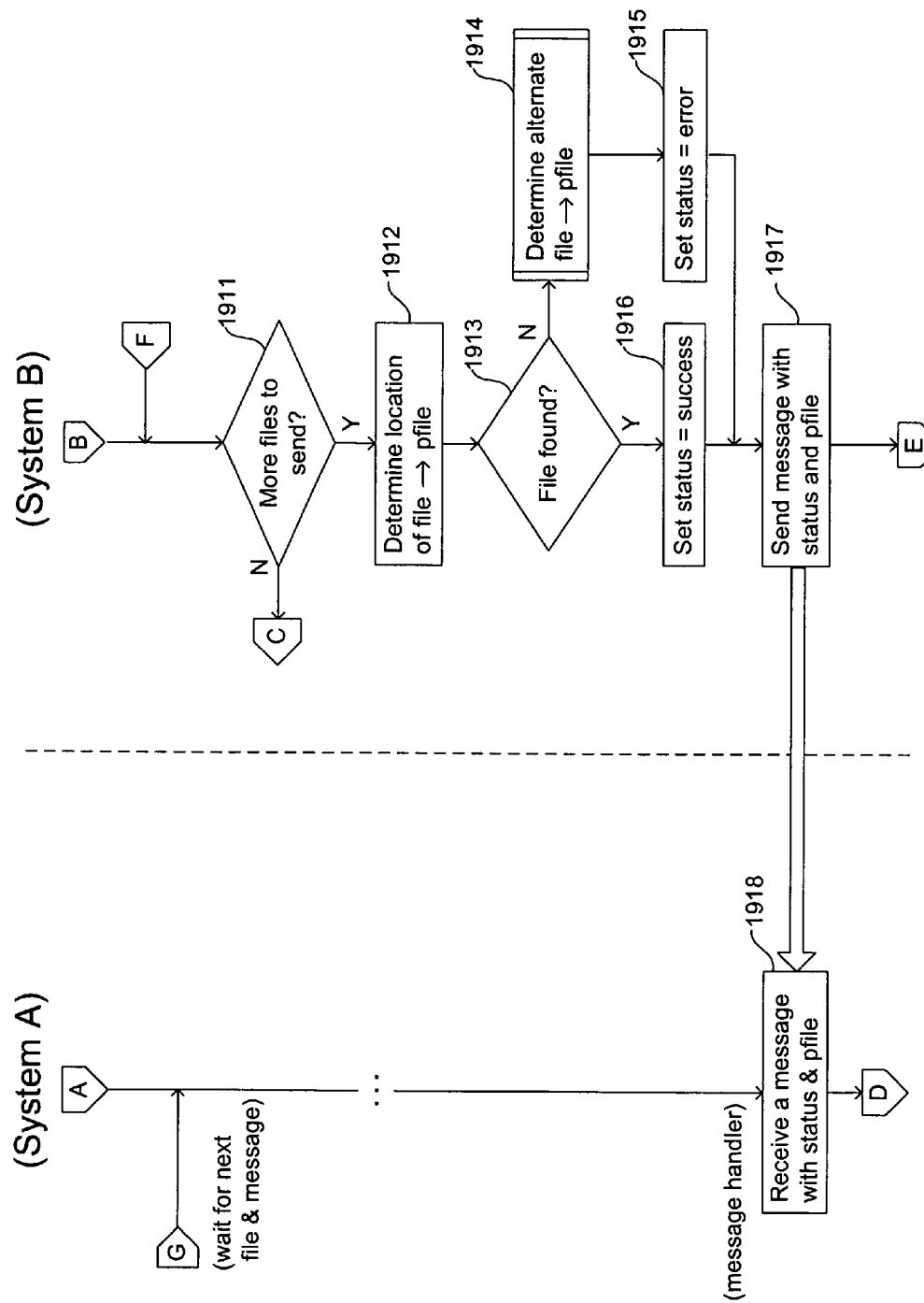
Figure 19C:
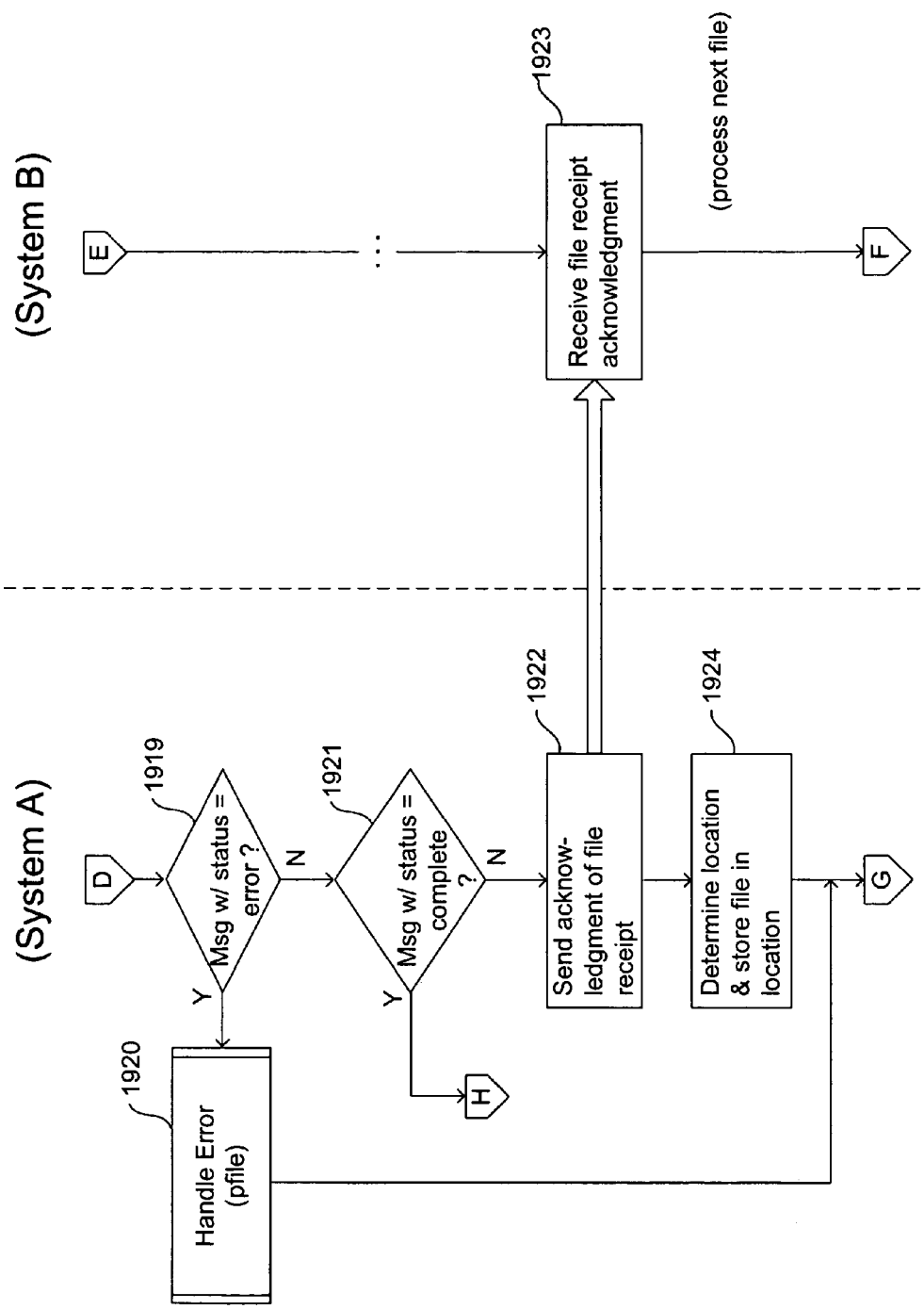
Figure 19D:
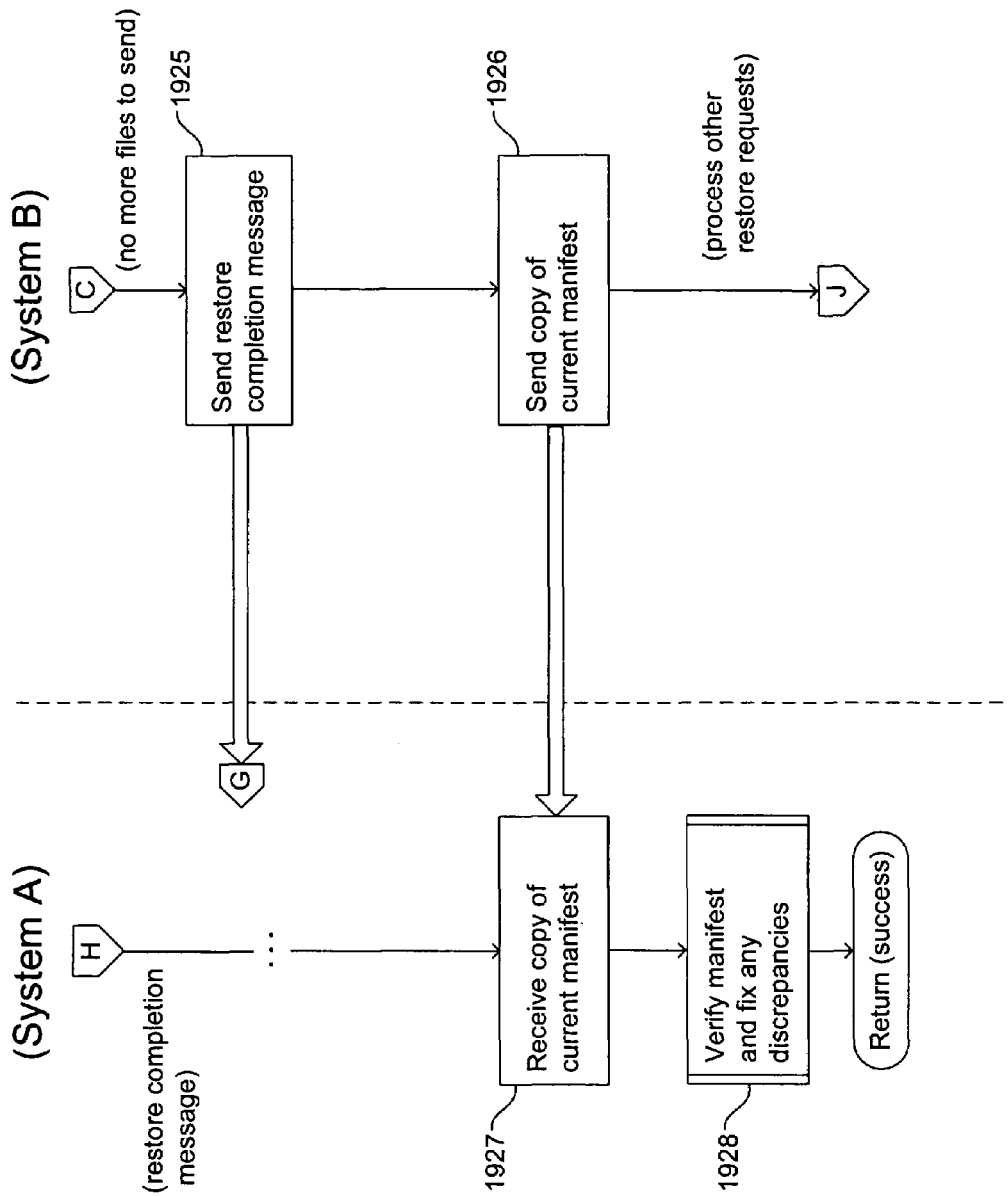

FIG. 18 is an example flow diagram of a process backup file routine provided by an RBS partner support component of a depository partner to process a received file for reciprocal backup. This routine is invoked, for example, by the process backup routine of the depository partner in step 1618 in FIG. 16. In summary, this routine is responsible for determining whether there is sufficient room to store a designated file, and, if not, attempt to make room and then store the file. Although not shown, the routine first computes the checksum of the file, and if there is a discrepancy between the computed and stored checksums, notifies the originating partner accordingly, and returns an error. Specifically, in step 1801, the routine extracts the unique identifier of the blob and determines whether there already exists earlier versions of the file. In step 1802, if not, then the routine continues in step 1804; otherwise, then in step 1803, the routine marks the earlier version(s) as "purgable" and saves it on a list of purgable files, and continues in step 1804. In step 1804, the routine extracts the size of the file from the designated blob and in step 1805 determines whether there is sufficient space to store the file. If there is sufficient space, the routine continues in step 1806, otherwise the routine continues in step 1807. In step 1806, the routine retrieves the encrypted file from the blob and stores it in the reciprocal storage designated for that originating partner. The routine also updates its data repository entries for that originating partner, to create or update an entry that corresponds to that unique name, stores the file properties received in the blob, and then returns a successful status.

In step 1807, because there is insufficient room for the designated file, the routine determines one or more candidate files to purge (delete). In general, older versions of files are kept around in backup storage until room is needed for incoming backup files. As described, when a new version is about to be stored, older versions are marked as purgable. In one embodiment, the oldest backed-up file that is marked as purgable is deleted first when room is needed. The routine thus determines whether the size of the purgable files, if any, are in total sufficiently large to release space for the designated file. In step 1808, if one or more candidate files are found that in total would yield sufficient space to store the new file, then the routine continues in step 1809, else continues in step 1810. In step 1809, the routine deletes the candidate file(s), updating the manifest and then returns to step 1805 to test for sufficient storage again. In step 1810, if no candidate file(s) for purging are found, then the most recent copy of the file is unmarked if it was marked as purgable in this operation (because the backup of the file will not succeed) and an error is returned. In one embodiment, the user of an originating partner computer system may specify that no automatic purging should be done. In this case, if there is insufficient storage space on the depository system, the process backup routine of FIG. 18 presents to the originating partner candidate files for deletion and allows the user to direct which files are deleted.

In one embodiment, the user of an originating partner computer system may wish to specify that certain groups of files, or all files, are to be backed up "atomically"—that is they are all backed up, or none are backed up if there is insufficient room. This allows the integrity of multi-file versions to be maintained. The process backup file routine of FIG. 18 would be modified to detect such a situation and the error messages would need to be handled appropriately in the backup process of FIG. 16. The determination of atomic operations can be handled on the originating partner side in advance of invoking the backup operation. Note that, when files are backed up "atomically," there is then a corresponding option to restore them atomically.

To enhance the reliability and integrity of backed up data, each RBS periodically polls all backup partners to request a current copy of its backup manifest. When a depository partner's RBS receives this request, it freshly checks the files present in its storage, recalculates their checksums, and incorporates that information into a current backup manifest which is then sent back to the requesting originating partner. If the originating partner discovers an error, the user is notified and it is handled as described above generally for errors. One default period for performing this check is once per day, although a user can configure the frequency, for example, through the settings button 513 in FIG. 5.

FIGS. 19A-19D are an example flow diagram of the interaction between the RBS partner support components of two backup partner computer systems to accomplish a restore operation in a Reciprocal Backup System. This routine is invoked for each depository partner indicated in a restore operation. When a restore operation is initiated, a designated depository partner, request information, and an indicator to a list of files to restore is provided. In summary, as soon as the designated depository partner (Partner B) is available, the files to be restored are identified, and then transmitted from the depository partner to the originating partner (Partner A) as encrypted files, along with unencrypted file properties such as a last-modified date/time stamp, backup date/time stamp, size, and checksum. The files are then processed (decrypted and restored) by the originating partner in the illustrated embodiment one-by-one as they are received from the depository partner. One skilled in the art will recognize that many different flows and alternate architectures are possible, including changes to what is transmitted, the whether objects are sent individually, processed as they are received, etc. All such implementations can be used with the methods and systems of the present invention.

Specifically, in step 1901, the restore routine of the originating portion of Partner A invokes a partner_available routine to determine whether the designated depository partner (Partner B) is available. An example partner_available routine was described with reference to FIGS. 14A and 14B. In step 1902, if the partner_available routine returns a success status indicator, then the restore routine of originating partner continues in step 1904, else continues in step 1903. As described above with reference to FIGS. 14A and 14B, if the depository partner is not available, the RBS queries the user to determine a disposition for the present restore operation. The user can direct the RBS to retry for a period of time, wait until the next scheduled backup operation and then retry, or abandon the operation without retrying. If retries are not immediately attempted or aren't successful, then in step 1903, the restore routine of the originating partner modifies the status indicator that corresponds to the depository partner in the current status window (e.g., status window 501 in FIG. 5) to correspond to the status returned by the partner_available routine. The backup routine then returns and reports the same status indicator.

In step 1904, the restore routine of the originating partner sends an init restore message to the depository partner and awaits a response. (The routine interaction works synchronously or asynchronously, although an asynchronous version is illustrated.) The depository partner's process restore routine, which may be executed for example as a daemon process on the Backup Agent component of the depository partner's RBS Partner Support, is awaiting messages. When in step 1905 it receives the init restore message, the process restore routine continues in step 1906 to send an acknowledge message back to the originating partner, and then awaits the next message.

In step 1907, the restore routine of the originating partner receives the acknowledge message and in step 1908, sends the designated list of files to restore to the depository partner, and then awaits a next message. In step 1909, the sent list is received by the process restore routine in a message and the process restore routine then loops over the list in steps 1911-1917 and 1923 to locate and send a copy of each requested file back to the originating partner. More specifically, in step 1911, the depository partner determines whether there are additional files to send, and, if so, continues in step 1912, else skips to step 1925 to begin the completion process of the restore operation. In step 1912, the process restore routine determines the location of the requested file (using the data stored in its data repository that corresponds to the originating partner's backups). In step 1913, the routine determines whether the requested file was located and, if so, continues in step 1916, else continues in step 1914. In step 1916, the process restore routine sets the restore operation's status code to successful and continues in step 1917. In step 1914, the process restore routine determines whether there is a candidate "alternate" file, and continues in step 1915. A technique for determining alternative files is described with respect to FIG. 20. Once the candidate file(s) are located and listed, then in step 1915, the process restore routine sets the restore operation's status code to reflect an "error" or "alternatives found" status and continues in step 1917. In step 1917, the process restore routine sends a message to the originating partner with an indication of the status and the list of alternative candidate files, if not empty, or a copy of the file if found.

In step 1918, the restore routine of the originating partner then receives the message with the status and the found file or the list of candidate files or an empty list if no alternative candidate files were found. In step 1919, if the received message indicates that an error has occurred, then the routine continues in step 1920 to handle the error and candidate files as described and returns to await the next file, otherwise continues in step 1921. In an alternative embodiment, alternative candidate files are not allowed and the restore operation for a requested file simply fails if the requested file isn't found. In step 1921, if the received message indicates that the file was found, then in step 1922, an acknowledgement message is sent to the depository partner, and the restore routine continues in step 1924 to determine the correct location for the received file, to store it accordingly, and then wait for the next file. In step 1921, if the received message was a completion message, then the file transmission is complete and the originating partner's restore routine skips to step 1927 to await the current backup manifest.

Meanwhile, in step 1923, the depository partner receives the acknowledgement and returns to the beginning of its processing loop in step 1911 to find the next file to send. In step 1925, when there are no more files to transmit, the process restore routine of the depository partner sends a restore completion message to the originating partner, which is eventually detected in step 1921. Then, in step 1926, the process restore routine of the depository partner determines and sends a copy of the current backup manifest to the originating partner, and loops back to step 1905 to await additional restoration requests.

In step 1927, the restore routine of the originating partner receives a copy of the current backup manifest, and in step 1928, verifies and fixes any discrepancies as described above with reference to FIG. 16. The restore routine then returns a successful status.

Figure 20:
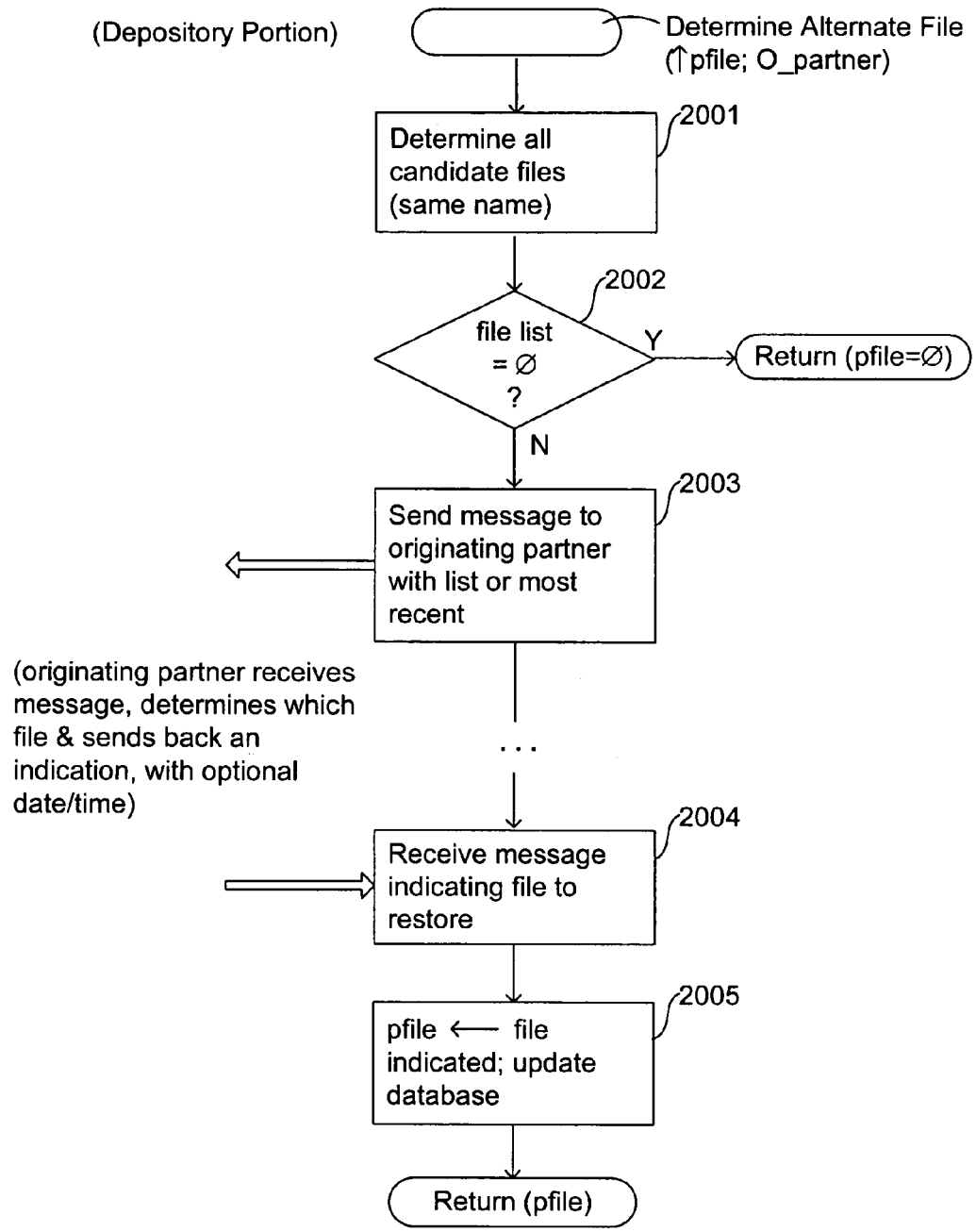
FIG. 20 is an example flow diagram of a determine alternative file routine provided by an RBS partner support component of a depository partner to find a requested file.

As mentioned, in step 1913 of FIG. 19, it may arise that the reciprocal backup system on a depository partner has no database entry for a file that has been requested for restoration or the file itself may be missing. This situation could occur if the database or file system is damaged for some reason, or if there is an error on the originating partner's side, or perhaps simply a bug in the software. FIG. 20 is an example flow diagram of a determine alternative file routine provided by an RBS partner support component of a depository partner to find a requested file. In step 2001, the reciprocal backup system searches the originating partner's reciprocal storage area on the depository computer system searching for files by the requested "name" (UID). Without the database entry it isn't possible to relate files to their last-modified date/time stamps, so if there is more than one file by that name, then in step 2003 the RBS will send back the most recent one found (judged by the file system's date/time stamp on the depository partner's computer system, which was the date/time it was backed up). The depository partner RBS will then enter the found file(s) into its database, along with a notation that the last-modified date/time stamps are unknown. Further requests for that same file will be handled the same way since the depository partner RBS will still be unable to correlate the files to versions specifically requested by their last-modified date/time stamps. If no file is found, then an empty list is returned to the process restore routine described in FIG. 19.

In one embodiment, instead of returning an indication of the most recent backed up file with the designated name, in step 2003, the depository partner RBS sends to the originating partner RBS the list of available files with that name along with their backup date/times and allows the originating partner RBS to select which file should be restored, querying the user if needed. In an enhanced mode, the depository RBS sends the list of the available file copies along with their backup date/times stamps to the originating partner RBS, and the originating partner RBS sends back their actual last-modified date/time stamps for entry in the depository RBS' data repository so that the file information is corrected as well. Accordingly, in step 2004, the routine receives a message indicating the file to restore and the corrected file information, and in step 2005 sets the current file indicator to point to that file, updating the database as needed. The routine then returns a copy of the indicated file.

As mentioned previously, reciprocal backup relationships may be configured to use a caching server, especially if one or both backup partners has a dial-up or other intermittent connection to the network. When an originating partner performs a backup operation using a caching server, the originating partner sends the (encrypted) files, their associated properties and a new backup manifest along with information to identify and locate the depository partner. To save multiple passes through the caching server, unlike the backup operation described above with reference to FIG. 16, the originating partner relies on its own data repository, rather than waiting to receive and verify the depository partner's current backup manifest to decide which files require backup.

Figure 21A:
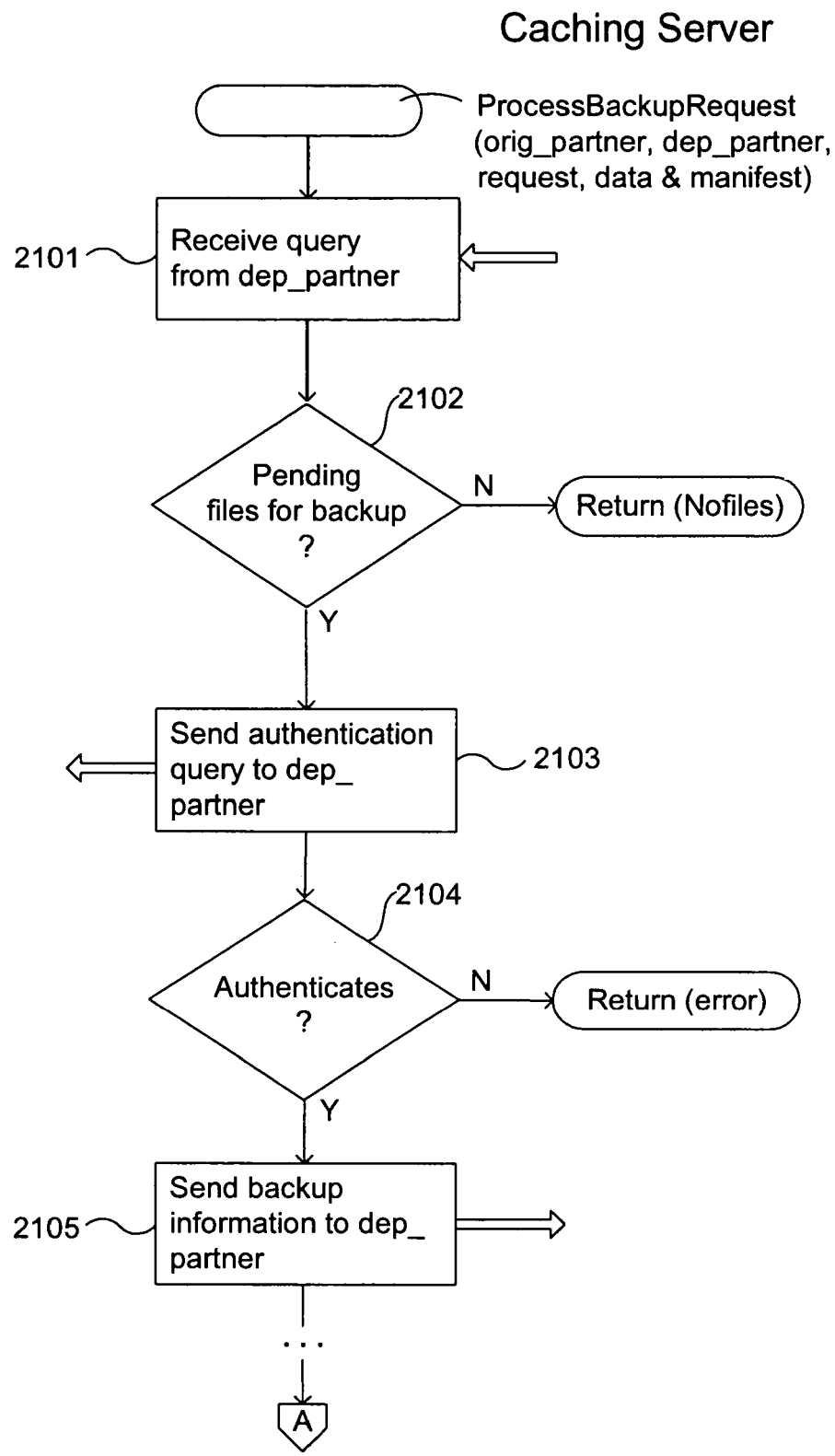
FIGS. 21A and 21B are an example flow diagram of a process backup request routine provided by a caching server to process a delayed backup request.
Figure 21B:
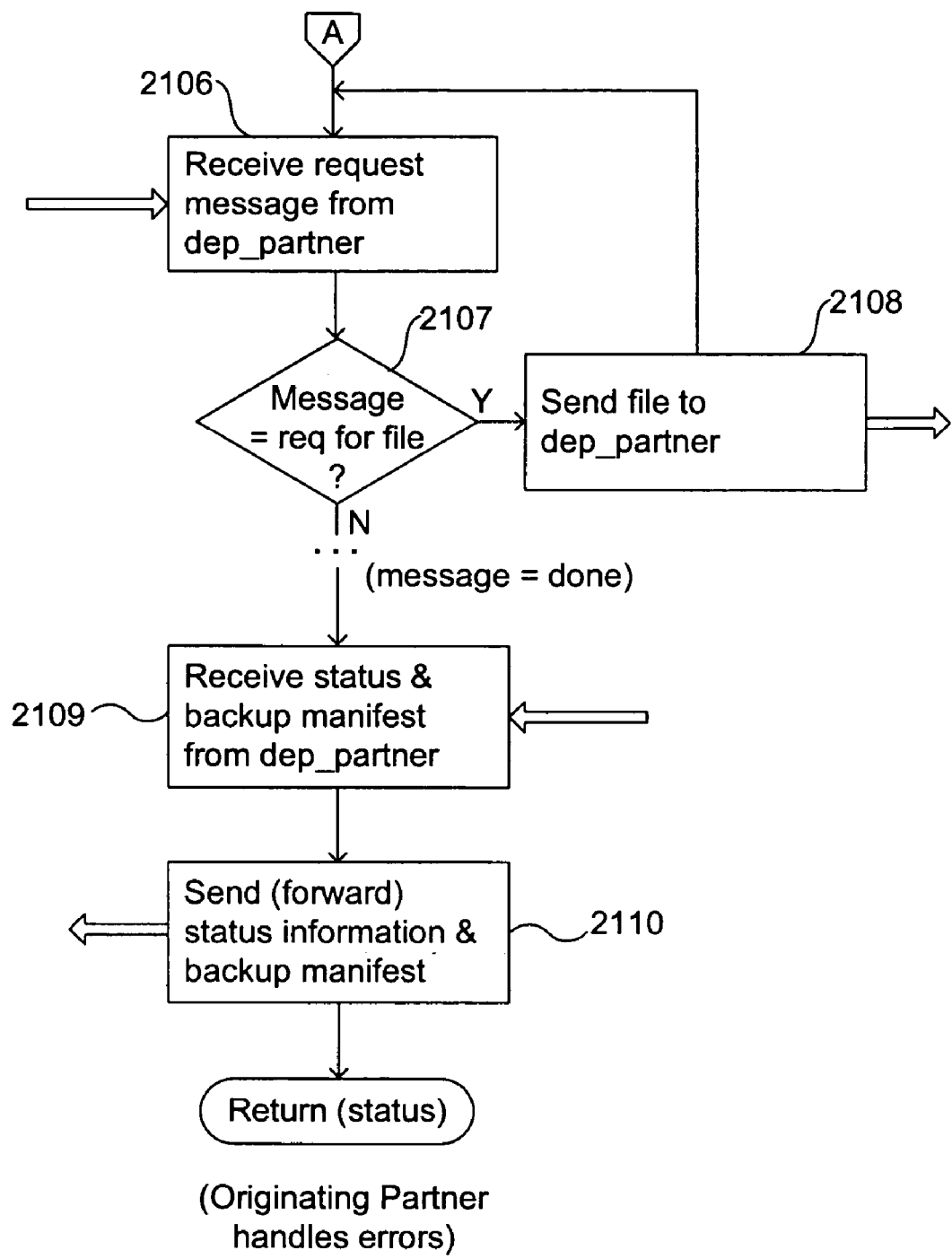

FIGS. 21A and 21B are an example flow diagram of a process backup request routine provided by a caching server to process a delayed backup request. When configured to use a caching server, a backup partner RBS sends backup requests to caching servers along with blobs of data to be delivered as well as restore requests. For simplicity, FIGS. 21A and 21B describe the use of the caching server by a backup partner in its originating partner role for backup operations. One skilled in the art will recognize that the interface is easily extended to support restore operations and to support a backup partner in its depository role to return data in response to restore requests. To improve efficiency, message-only handshaking is minimized when using a caching server.

Also, one skilled in the art will recognize that the caching server can be programmed to wait, or wait for some period of time for a depository partner to come on-line or may be designed to periodically poll for the depository partner (if the depository partner is generally on-line at a known address). In addition, different caching servers may offer different functionality and thus allow a backup partner to associate itself with a caching server that best serves its typical requirements. Other combinations are also possible. The example shown in FIGS. 21A and 21B illustrate a caching server that presumes that the depository partner requests files from the caching server when it comes on-line.

In step 2101, the caching server receives a backup query message from the designated depository partner. In step 2102, if there are no files pending backup, then caching server returns a message to the designated depository partner that no files await, otherwise continues in step 2103. In step 2103, the caching server sends an authentication query to the designated depository partner. In step 2104, if the caching server receives a response that properly authenticates, it continues in step 2105, else continues returns an error status. In step 2105, after a response from the designated depository partner has been authenticated, the server sends the list of files to be backed up along with their properties and an indication of the originating partner to the designated depository partner. The server then awaits a request message from the depository partner.

The depository partner is presumed to request files from the caching server in priority order (either explicitly with a designated priority list that is sent by the designated originating partner with the files, or implicitly through the order that the files were sent). Processing the files in priority order ensures that if there is insufficient storage space for all of them, the most important ones are stored. This priority ordering of files should be unnecessary because the originating partner performed its own calculations of size requirements using its own data repository records. Nonetheless, error situations do occur and to optimize the result when there is a miscalculation, the files are stored in priority order. The depository partner compares the received list of files and associated properties to its own storage and so can omit requesting files that are already present and current. This check is also duplicative and intended to account for unforeseen errors, as the originating partner performed this same comparison in pruning its backup list. In an alternative implementation, the caching server examines a backup manifest received from the originating partner and itself sequences the files in priority order as specified by the originating partner.

In step 2106, when a request message is received from the depository partner, the server continues in step 2107 to determine the type of message. In step 2107, if the message is indeed a request for a file, then in step 2108, the caching server sends the requested data blob to the depository partner and continues back to step 2106 to await the next request. The depository partner, upon receiving the file, handles the issue of purging files and other errors in a similar manner to that described with reference to FIG. 16.

In step 2107, if the message indicates that there are no more files to transmit, then either all of the files have been forwarded to the depository partner successfully, or there is no more space. In step 2109, the caching server waits until it receives a backup status message indicating which situation occurred and a current backup manifest from the depository partner, and continues in step 2110. In step 2110, the caching server forwards the status message and current backup manifest to the designated originating partner, and returns the status. The new backup manifest indicates and provides confirmation of which files were received and stored successfully. In one embodiment, the originating partner handles any errors. Depending upon the error, the originating partner may resend files as necessary and/or presents the backup request to the user for modification (as it would without a caching server, although in this case letting the user know that a caching server is being used and the time effects implied by that use). One skilled in the art will recognize that other alternatives can be implemented.

Although not shown in FIGS. 21A and 21B, in performing a restoration, the originating partner sends a restore request message to the depository partner (via the caching server) and if successful, the depository partner responds with the requested files(s), its current backup manifest, and a successful completion message. If unsuccessful, the depository partner responds with an error message and the originating reciprocal backup system notifies the user as it would without a caching server, although in this case letting the user know that a caching server is being used and the time effects implied by that use.

Although the examples above have primarily focused upon use of the Reciprocal Backup System for files and directories, one skilled in the art will recognize that the RBS can also be enhanced to used by applications to back up application data. For example, in conjunction with a database program, an RBS can provide backup services for portions of data from the database. The application program would be programmed to interface to functionality of the RBS, for example using exported RBS interfaces to the functionality. To perform backup, the application program provides the RBS interface (the originating partner portion) with the data units to be backed up as data blobs; a unique name for each blob; and associated property information, such as a size, a last-modified date/time stamp, and a checksum. The RBS handles the object data as if it were data from a file system, encrypting it and forwarding the encrypted data blob along with the associated properties to a depository partner and storing the relevant information in its data repository.

Restoration is initiated by the application program by making a request to the RBS originating partner portion interface, identifying the data to be restored by the unique name provided during the backup operation, and optionally the last-modified date/time stamp or backup date/time stamp. If a date/time stamp isn't specified, then the latest backup is restored. The RBS would then retrieve and decrypt the restored data and forward it back to the application program. One skilled in the art will recognize that other ways for specifying and carrying out the backup and restoration of application data could also be supported using the techniques described herein.

A depository partner for application data can be designated in any of a number of ways, including: (1) an application can specify a designated depository partner as part of the backup request made to the RBS interface; (2) a user interface can be presented, potentially tailored to the application, allowing users to specify which partner to use; or (3) the file specification dialog described with respect FIG. 8 can be modified to handle "objects" more generally, thereby allowing the user to direct application data to designated depository partners in a similar manner to that described for files.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 60/476,594, entitled "SYSTEM FOR RECIPROCAL DATA BACKUP SERVICES BETWEEN COMPUTERS ON A NETWORK," filed Jun. 6, 2003, and U.S. Provisional Patent Application No. 60/495,697 entitled "SYSTEM FOR RECIPROCAL DATA BACKUP SERVICES BETWEEN COMPUTERS ON A NETWORK," filed Aug. 15, 2003, are incorporated herein by reference, in their entirety.

From the foregoing it will be appreciated that, although specific embodiments of the invention have been described herein for purposes of illustration, various modifications may be made without deviating from the spirit and scope of the invention. For example, one skilled in the art will recognize that the methods and systems for performing reciprocal data backup discussed herein are applicable to other architectures other than a windowed or graphical user interface architecture. For example, the RBS facilities may be embedded in a self-contained system. Also, portions of the reciprocal backup services may be offered for fee as opposed to storage reciprocity. One skilled in the art will also recognize that the methods and systems discussed herein are also applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A peer-to-peer reciprocal backup system in a network of computer systems, comprising:
   an originating computer system that is structured to:
      establish a reciprocal backup relationship with one of the computer systems, the relationship specifying an amount of backup storage for backups of data from the originating computer system on the one of the computer systems and an amount of reciprocal backup storage available on the originating computer system for storing backups of data from the one of the computer systems;
      transmit data to the one of the computer systems to be backed up according to the established reciprocal backup relationship; and
      receive data from the one of the computer systems to be backed up according to the established reciprocal backup relationship;
   a depository computer system that is structured to:
      participate as the one of the computer systems in establishing the reciprocal backup relationship with the originating computer system;
      receive data from the originating computer system to be backed up according to the established reciprocal backup relationship; and
      transmit data to the originating computer system to be backed up according to the established reciprocal backup relationship.

2. The backup system of claim 1 wherein the originating computer system is further structured to:
   request previously backed up data from the one of the computer systems; and
   receive previously backed up data from the one of the computer systems responsive to the request; and
   wherein the depository computer system is further structured to send the requested data to the originating computer system upon receiving a restore request.

3. A method for performing peer-to-peer reciprocal backup in a network of computer systems, comprising:
   establishing a reciprocal backup relationship between an originating partner computer system ("originating partner") and a depository partner computer system ("depository partner"), the relationship specifying an amount of backup storage for backups of data from the originating partner on the depository partner and an amount of reciprocal backup storage on the originating partner for storing backups of data from the depository partner;
   transmitting data from the originating partner to the depository partner to be backed up according to the established reciprocal backup relationship;
   storing the data transmitted from the originating partner on backup storage of the depository partner;
   transmitting data from the depository partner to the originating partner to be backed up according to the established reciprocal backup relationship; and
   storing the data transmitted from the depository partner on backup storage of the originating partner.

4. The method of claim 3, further comprising:
   requesting a copy of previously backed up data from the depository partner;
   transmitting the requested data from the depository partner to the originating partner in response to the request; and
   storing the data transmitted from the depository partner in a storage location of the originating partner to restore the requested data.

5. A peer-to-peer reciprocal backup system in a network of computer systems, comprising:
   an originating computer system that is structured to:
      establish a reciprocal backup relationship with one of the computer systems, the relationship specifying an amount of backup storage for backups of data from the originating computer system on the one of the computer systems and an amount of reciprocal backup storage available on the originating computer system for storing backups of data from the one of the computer systems; and
      transmit data to be backed up according to the established reciprocal backup relationship; and
   a depository computer system that is structured to:
      participate as the one of the computer systems in establishing the reciprocal backup relationship with the originating computer system; and receive data from the originating computer system to be backed up according to the established reciprocal backup relationship.

6. The system of claim 5 wherein the depository computer system is further structured to:
receive a request from the originating computer system for data to be restored on the originating computer system; and
locate and return previously backed up data that corresponds to the received request from the originating computer system for data to be restored.

7. The system claim 5 wherein the originating computer system is further structured to:
receive data from the depository computer system to be backed up according to the established reciprocal backup relationship.

8. The system of claim 5 wherein the originating computer system is further structured to:
receive a request from the depository computer system for data to be restored on the depository computer system; and
locate and return previously backed up data that corresponds to the received request from the depository computer system for data to be restored.

9. The system of claim 5 wherein the originating computer system is further structured to establish the reciprocal backup relationship by:
issuing an invitation to the one of the computer systems to establish the reciprocal backup relationship; and
negotiating a requested amount of storage and an amount of reciprocal storage available.

10. The system of claim 5 wherein the originating computer system is further structured to transmit the data to be backed up to a cache.

11. The system of claim 10 wherein the cache is located on a caching server.

12. The system of claim 10 wherein the cache is storage located on the originating computer system.

13. The system of claim 10 wherein the depository computer system receives the data to be backed up from the cache.

14. A software interface expressed as instructions stored in a computer-readable memory medium of an originating computer system for causing a computer processor to manage peer-to-peer reciprocal backup relationships in a network of computer systems, comprising:
an originating partner portion that, when executed by a computer processor, establishes a reciprocal backup relationship that specifies an amount of backup storage for storing data from the originating computer system on a one of the computer systems and an amount of reciprocal backup storage available on the originating computer system for storing data from the one of the computer systems; and
transmits data to be backed up on the one of the computer systems according to the established reciprocal backup relationship; and
a depository partner portion that, when executed by a computer processor, receives data to be backed up according to the established reciprocal backup relationship; and
causes the received data to be stored.

15. The software interface of claim 14, further comprising:
a second depository partner portion that is stored on a computer-readable memory medium of the one of the computer systems with which the reciprocal backup relationship is established and that, when executed, participates in the establishing of the reciprocal backup relationship, receives data from the originating partner portion, and causes the data to be stored on the one of the computer systems.

16. The software interface of claim 14, further comprising:
a second originating partner portion that is stored on the computer-readable memory medium of the one of the computer systems with which the reciprocal backup relationship is established and that, when executed, forwards data to the depository partner portion to be backed up on the originating computer system according to the established reciprocal backup relationship.

17. The software interface of claim 14 wherein the originating partner portion transmits data by transmitting data to a cache prior to transmitting the data to the one of the computer systems.

18. The software interface of claim 14 wherein the originating partner portion transmits at least a portion of the data to be backed up as encrypted data.

19. The software interface of claim 14 wherein the originating partner portion is further structured to determine a backup schedule and transmit the data to be backed up in accordance with the determined backup schedule.

20. The software interface of claim 14 wherein the originating partner portion is further structured to request restoration of data previously backed up according to the established reciprocal backup relationship.

21. The software interface of claim 14 wherein the depository partner portion is further structured to receive a request for data to be restored.

22. The software interface of claim 14 wherein the transmitted data to be backed up is a file, a directory, or an application-specific data structure.

23. A computer-implemented method for performing backup from an originating computer system to storage located on at least one of a plurality of depository computer systems connected over a network, comprising:
establishing at least one reciprocal backup relationship with one of the depository computer systems by, requesting a reciprocal backup relationship with the one of the depository computer systems; and
negotiating for an amount of storage for backups to storage on the one of the depository computer systems by specifying a desired amount of storage for backups from the originating computer system and receiving a response that indicates that the desired amount of storage for backups is available along with an indication of a reciprocal desired amount of storage;
specifying data to be backed up;
determining a depository partner computer system from the established reciprocal backup relationships; and
indicating to the determined depository partner the specified data for backup to storage of the determined depository partner.

24. The method of claim 23 wherein the specifying the data to be backed up comprises using a graphical user interface to determine specific objects to be backed up.

25. The method of claim 23, further comprising:
transmitting the specified data to the determined depository partner.

26. The method of claim 25, wherein the transmitting to the determined depository partner, further comprises:
authenticating the determined depository partner computer system.

27. The method of claim 25 wherein the transmitting is delayed until the determined depository partner indicates that the determined depository partner is on-line.

28. The method of claim 25 wherein the transmitting further comprises:
transmitting the specified data as encrypted data to the determined depository partner.

29. The method of claim 28, further comprising:
transmitting unencrypted meta information regarding the specified data so that the depository partner can identify the transmitted encrypted data.

30. The method of claim 25, further comprising:
before transmitting the specified data to the determined depository partner, determining whether there is sufficient storage remaining on the determined depository partner to backup the specified data.

31. The method of claim 23 wherein the indicating to the determined depository partner the specified data further comprises:
determining a caching server; and
transmitting the specified data to the caching server for later transmission to the determined depository partner.

32. The method of claim 23 wherein the indicating to the determined depository partner the specified data further comprises:
caching the specified data for backup in storage on the originating computer system for later transmission to the determined depository partner.

33. The method of claim 32, the caching permitting multiple snapshots of the specified data to be indicated for backup.

34. The method of claim 23, further comprising:
specifying a schedule for performing the backup; and
sending the specified data for backup based upon the specified schedule.

35. The method of claim 23, further comprising:
determining data to be restored to storage on the originating computer system;
determining a depository partner computer system for restoration that previously backed up the determined data to be restored; and
requesting from the determined depository partner for restoration the data to be restored.

36. The method of claim 35, further comprising:
receiving from the depository partner for restoration the data to be restored.

37. The method of claim 35, further comprising:
determining a second depository partner computer system for restoration that had previously backed up at least a portion of the data to be restored; and
requesting from the second determined depository partner for restoration the portion of the data to be restored; and
receiving at least portions of the data to be restored from both the second determined depository partner for restoration and the determined depository partner for restoration.

38. The method of claim 37 wherein the data to be restored constitutes a complete restoration of data of the originating computer system.

39. The method of claim 23 wherein the determining of the depository partner is selected based upon the specified data.

40. The method of claim 23 wherein the specified data specifies at least one file.

41. The method of claim 23 wherein the specified data specifies a directory.

42. The method of claim 23 wherein the specified data is a standing backup list.

43. The method of claim 23 wherein the specified data is application-specific.

44. The method of claim 23 wherein the specified data are portions of a database.

45. The method of claim 44 wherein the portions of the database are stored in an application-specific manner in a block of storage that is treated as if it were a file.

46. The method of claim 23, the negotiating for the amount of storage further comprising:
specifying a desired amount of storage for backups from the originating computer system; and
specifying an amount of storage for reciprocal backups of data from the one of the depository computer systems.

47. The method of claim 46 wherein the specified desired amount of storage for backups and the specified amount of storage for reciprocal backups represents an even trade.

48. The method of claim 46 wherein the specified desired amount of storage for backups and the specified amount of storage for reciprocal backups represents an uneven trade.

49. The method of claim 46, the specifying the amount of storage for reciprocal backups of data from the one of the depository computer systems further comprising:
receiving an indication from the depository computer system that indicates a modification of the amount of storage for reciprocal backups.

50. The method of claim 23, the negotiating for the amount of storage further comprising:
receiving a response from the one of the depository computer systems that indicates an acceptance of the requested reciprocal backup relationship.

51. The method of claim 23, the negotiating for the amount of storage further comprising:
receiving a response from the one of the depository computer systems that indicates a requested modification of the requested reciprocal backup relationship.

52. The method of claim 23 wherein the negotiating for an amount of storage for backups to storage on the one of the depository computer systems comprises accepting the negotiated requested reciprocal backup relationship.

53. The method of claim 23 wherein the reciprocal desired amount is not the same as the desired amount specified for backups from the originating computer system.

54. The method of claim 23 wherein the reciprocal desired amount is the same as the desired amount specified for backups from the originating computer system.

55. The method of claim 23 wherein the negotiating for the amount of storage further comprises:
specifying a desired amount of storage for backups from the originating computer system;
receiving a response that indicates an alternative amount of storage available for backups from the originating computer system;
indicating to the one of the depository computer systems that the alternative amount of storage is acceptable.

56. The method of claim 55 wherein the receiving the response that indicates the alternative amount of storage, further comprises:
receiving a response that indicates a reciprocal desired amount of storage for backups from the depository computer system to storage on the originating computer system.

57. The method of claim 56 wherein the indicating to the one of the depository computer systems that the alternative amount of storage is acceptable, further comprises:
  indicating to the one of the depository computer systems that the indicated reciprocal desired amount of storage is available.

58. The method of claim 23, wherein the negotiating results in an even allocation for reciprocal backup storage.

59. The method of claim 23, wherein the negotiating results in an uneven allocation for reciprocal backup storage.

60. The method of claim 23 wherein the establishing at least one reciprocal backup relationship with one of the depository computer systems establishes reciprocal backup relationships with a plurality of the depository computer systems; and further comprising:
  determining a second depository partner computer system from the established reciprocal backup relationships; and
  indicating to the determined second depository partner a second specified data for backup to storage of the determined second depository partner.

61. The method of claim 60 wherein the specified data and the second specified data is the same, thereby providing a redundant backup strategy.

62. The method of claim 60 wherein the specified data and the second specified data are different data.

63. The method of claim 60 wherein a portion of the specified data and a portion of the second specified data is the same and a portion of the specified data and a portion of the second specified data is different.

64. The method of claim 23, further comprising:
  requesting removal of a reciprocal backup relationship with one of the depository computer systems.

65. The method of claim 64, further comprising:
  removing access to backup data of the originating computer system that reside on the one of the depository computer systems after a period of time.

66. The method of claim 64, further comprising:
  removing access to backup data of the originating computer system that reside on the one of the depository computer systems immediately.

67. The method of claim 64, further comprising:
  automatically purging the backup data of the originating computer on the depository computer system.

68. A computer-readable memory medium containing instructions for controlling a computer processor in an originating computer system to electronically perform backup to storage located on at least one of a plurality of depository computer systems connected over a network, by:
  establishing at least one reciprocal backup relationship with one of the depository computer systems by, requesting a reciprocal backup relationship with the one of the depository computer systems; and
    negotiating for an amount of storage for backups to storage on the one of the depository computer systems by specifying a desired amount of storage for backups from the originating computer system and receiving a response that indicates that the desired amount of storage for backups is available along with an indication of a reciprocal desired amount of storage;
  specifying data to be backed up;
  determining a depository partner computer system from the established reciprocal backup relationships; and
  indicating to the determined depository partner the specified data for backup to storage of the determined depository partner.

69. The memory medium of claim 68 wherein the specifying the data to be backed up comprises using a graphical user interface to determine specific objects to be backed up.

70. The memory medium of claim 68 further comprising instructions that control a computer processor to perform backup by transmitting the specified data to the determined depository partner.

71. The memory medium of claim 70 wherein the transmitting to the determined depository partner further comprises:
  authenticating the determined depository partner computer system.

72. The memory medium of claim 70 wherein the transmitting is delayed until the determined depository partner indicates that the determined depository partner is on-line.

73. The memory medium of claim 70 wherein the transmitting further comprises:
  transmitting the specified data as encrypted data to the determined depository partner.

74. The memory medium of claim 73, further comprising instructions that control a computer processor to perform backup by:
  transmitting unencrypted meta information regarding the specified data so that the depository partner can identify the transmitted encrypted data.

75. The memory medium of claim 70, further comprising instructions that control a computer processor to perform backup by:
  before transmitting the specified data to the determined depository partner, determining whether there is sufficient storage remaining on the determined depository partner to backup the specified data.

76. The memory medium of claim 68 wherein the indicating to the determined depository partner the specified data further comprises:
  determining a caching server; and
  transmitting the specified data to the caching server for later transmission to the determined depository partner.

77. The memory medium of claim 68 wherein the indicating to the determined depository partner the specified data further comprises:
  caching the specified data for backup in storage on the originating computer system for later transmission to the determined depository partner.

78. The memory medium of claim 77, the caching permitting multiple snapshots of the specified data to be indicated for backup.

79. The memory medium of claim 68, further comprising instructions that control a computer processor to perform backup by:
  specifying a schedule for performing the backup; and
  sending the specified data for backup based upon the specified schedule.

80. The memory medium of claim 68, further comprising instructions that control a computer processor to perform backup by:
  determining data to be restored to storage on the originating computer system;
  determining a depository partner computer system for restoration that previously backed up the determined data to be restored; and
  requesting from the determined depository partner for restoration the data to be restored.

81. The memory medium of claim 80, further comprising instructions that control a computer processor to perform backup by:
  receiving from the depository partner for restoration the data to be restored.

82. The memory medium of claim 80, further comprising instructions that control a computer processor to perform backup by:
  determining a second depository partner computer system for restoration that had previously backed up at least a portion of the data to be restored; and
  requesting from the second determined depository partner for restoration the portion of the data to be restored; and
  receiving at least portions of the data to be restored from both the second determined depository partner for restoration and the determined depository, partner for restoration.

83. The memory medium of claim 80 wherein the data to be restored constitutes a complete restoration of data of the originating computer system.

84. The memory medium of claim 68 wherein the determining of the depository partner is selected based upon the specified data.

85. The memory medium of claim 68 wherein the specified data specifies at least one file.

86. The memory medium of claim 68 wherein the specified data specifies a directory.

87. The memory medium of claim 68 wherein the specified data is a standing backup list.

88. The memory medium of claim 68 wherein the specified data is application-specific.

89. The memory medium of claim 68 wherein the specified data are portions of a database.

90. The memory medium of claim 89 wherein the portions of the database are stored in an application-specific manner in a block of storage that is treated as if it were a file.

91. The memory medium of claim 68, the negotiating for the amount of storage further comprising:
  specifying a desired amount of storage for backups from the originating computer system; and
  specifying an amount of storage for reciprocal backups of data from the one of the depository/computer systems.

92. The memory medium of claim 91 wherein the specified desired amount of storage for backups and the specified amount of storage for reciprocal backups represents an even trade.

93. The memory medium of claim 91 wherein the specified desired amount of storage for backups and the specified amount of storage for reciprocal backups represents an uneven trade.

94. The memory medium of claim 91, the specifying the amount of storage for reciprocal backups of data from the one of the depository computer systems further comprising:
  receiving an indication from the depository computer system that indicates a modification of the amount of storage for reciprocal backups.

95. The memory medium of claim 68, the negotiating for the amount of storage comprising:
  receiving a response from the one of the depository computer systems that indicates an acceptance of the requested reciprocal backup relationship.

96. The memory medium of claim 68, the negotiating for the amount of storage comprising:
  receiving a response from the one of the depository computer systems that indicates a requested modification of the requested reciprocal backup relationship.

97. The memory medium of claim 68 wherein the negotiating for an amount of storage for backups to storage on the one of the depository computer systems comprises accepting the negotiated requested reciprocal backup relationship.

98. The memory medium of claim 68 wherein the reciprocal desired amount is not the same as the desired amount specified for backups from the originating computer system.

99. The memory medium of claim 68 wherein the reciprocal desired amount is the same as the desired amount specified for backups from the originating computer system.

100. The memory medium of claim 68 wherein the negotiating for the amount of storage further comprises:
  specifying a desired amount of storage for backups from the originating computer system;
  receiving a response that indicates an alternative amount of storage available for backups from the originating computer system;
  indicating to the one of the depository computer systems that the alternative amount of storage is acceptable.

101. The memory medium of claim 68 wherein the negotiating results in an even allocation for reciprocal backup storage.

102. The memory medium of claim 68 wherein the negotiating results in an uneven allocation for reciprocal backup storage.

103. The memory medium of claim 68 wherein the establishing at least one reciprocal backup relationship with one of the depository computer systems establishes reciprocal backup relationships with a plurality of the depository computer systems; and containing further instructions for controlling a computer processor to perform backup by:
  determining a second depository partner computer system from the established reciprocal backup relationships; and
  indicating to the determined second depository partner a second specified data for backup to storage of the determined second depository partner.

104. The memory medium of claim 103 wherein the specified data and the second specified data is the same, thereby providing a redundant backup strategy.

105. The memory medium of claim 103 wherein the specified data and the second specified data are different data.

106. The memory medium of claim 103 wherein a portion of the specified data and a portion of the second specified data is the same and a portion of the specified data and a portion of the second specified data is different.

107. The memory medium of claim 68, further comprising instructions that control a computer processor by:
  requesting removal of a reciprocal backup relationship with one of the depository computer systems.

108. The memory medium of claim 107, further comprising instructions that control a computer processor by:
  removing access to backup data of the originating computer system that reside on the one of the depository computer systems after a period of time.

109. The memory medium of claim 107, further comprising instructions that control a computer processor by:
  removing access to backup data of the originating computer system that reside on the one of the depository computer systems immediately.

110. The memory medium of claim 107, further comprising instructions that control a computer processor by:
  automatically purging the backup data of the originating computer on the depository computer system.

111. A reciprocal backup system in an originating computer system connected by a network to a plurality of peer computer systems, comprising:

a reciprocal backup negotiation mechanism that establishes at least one reciprocal backup relationship with at least one of the peer computer systems by, requesting a reciprocal backup relationship with the one of the depository computer systems; and negotiating for an amount of storage for backups to storage on the one of the depository computer systems by specifying a desired amount of storage for backups from the originating computer system and receiving a response that indicates that the desired amount of storage for backups is available along with an indication of a reciprocal desired amount of storage;

an interface that is structured to allow specification of data to be backed up and to determine a depository partner from the established reciprocal backup relationships for backup of the specified data; and a reciprocal backup agent that is structured to transmit the specified data to the determined depository partner for backup.

112. The system of claim 111 wherein the interface is a graphical user interface.

113. The system of claim 111 wherein the reciprocal backup agent is further structured to receive requests to store data for backup from a one of the peer computer systems.

114. The system of claim 111 wherein the reciprocal backup agent is structured to authenticate the determined depository partner computer system.

115. The system of claim 111 wherein the reciprocal backup agent is structured to delay transmitting until the determined depository partner indicates that the determined depository partner is on-line.

116. The system of claim 111 wherein the reciprocal backup agent is structured to transmit to the determined depository partner the specified data as encrypted data.

117. The system of claim 116 wherein the reciprocal backup agent is structured to transmit unencrypted meta information regarding the specified data so that the depository partner can identify the transmitted encrypted data.

118. The system of claim 111, the reciprocal backup agent is further structured to determine whether there is sufficient storage remaining on the determined depository partner to backup the specified data before transmitting the specified data to the determined depository partner.

119. The system of claim 111, the reciprocal backup agent is further structured to transmit the specified data to a caching server for later transmission to the determined depository partner.

120. The system of claim 111, the reciprocal backup agent is further structured to transmit the specified data by caching the specified data for backup in storage on the originating computer system for later transmission to the determined depository partner.

121. The system of claim 120 wherein the caching permits multiple snapshots of the specified data to be indicated for backup.

122. The system of claim 111, the reciprocal backup agent further structured to:

specify a schedule for performing the backup; and transmit the specified data for backup based upon the specified schedule.

123. The system of claim 111, the reciprocal backup agent further structured to:

determine data to be restored to storage on the originating computer system;

determine a depository partner computer system for restoration that previously backed up the determined data to be restored; and request from the determined depository partner for restoration the data to be restored.

124. The system of claim 123, the reciprocal backup agent further structured to receive from the depository partner for restoration the data to be restored; and store the received data on the originating computer system.

125. The system of claim 123, the interface further structured to determine a second depository partner computer system for restoration that had previously backed up at least a portion of the data to be restored; and the reciprocal backup agent further structured to:

request from the second determined depository partner for restoration the portion of the data to be restored; and receive at least portions of the data to be restored from both the second determined depository partner for restoration and the determined depository partner for restoration.

126. The system of claim 123 wherein the data to be restored constitutes a complete restoration of data to the originating computer system.

127. The system of claim 111 wherein the depository partner is determined based upon the specified data.

128. The system of claim 111 wherein the specified data specifies at least one file.

129. The system of claim 111 wherein the specified data specifies a directory.

130. The system of claim 111 wherein the specified data is a standing backup list.

131. The system of claim 111 wherein the specified data is application-specific.

132. The system of claim 111 wherein the specified data are portions of a database.

133. The system of claim 132 wherein the portions of the database are stored in an application-specific manner in a block of storage that is treated as if it were a file.

134. The system of claim 111 wherein the specified data is stored in a block of storage that is treated as if it were a file.

135. The system of claim 111, the negotiation mechanism further structured to establish the at least one reciprocal backup relationship by:

specifying a desired amount of storage for backups from the originating computer system; and specifying an amount of storage for reciprocal backups of data from the one of the depository computer systems.

136. The system of claim 135 wherein the specified desired amount of storage for backups and the specified amount of storage for reciprocal backups represents an even trade.

137. The system of claim 135 wherein the specified desired amount of storage for backups and the specified amount of storage for reciprocal backups represents an uneven trade.

138. The system of claim 135, the negotiation mechanism further structured to receive an indication from the depository computer system that indicates a modification of the amount of storage for reciprocal backups.

139. The system of claim 111, the negotiation mechanism further structured to receive a response from the one of the depository computer systems that indicates an acceptance of the requested reciprocal backup relationship.

140. The system of claim 111, negotiation mechanism further structured to receive a response from the one of the depository computer systems that indicates a requested modification of the requested reciprocal backup relationship.

141. The system of claim 111 wherein the negotiation mechanism is structured to negotiate for an amount of storage for backups to storage on the one of the depository computer systems by accepting the negotiated requested reciprocal backup relationship as specified.

142. The system of claim 111 wherein the negotiation mechanism is further structured to negotiate for the amount of storage by:
specifying a desired amount of storage for backups from the originating computer system;
receiving a response that indicates an alternative amount of storage available for backups from the originating computer system;
indicating to the one of the depository computer systems that the alternative amount of storage is acceptable.

143. The system of claim 111 wherein the negotiation results in an even allocation for reciprocal backup storage.

144. The system of claim 111 wherein the negotiation results in an uneven allocation for reciprocal backup storage.

145. The system of claim 111 wherein
the negotiation mechanism is further structured to establish reciprocal backup relationships with a plurality of the depository computer systems;
the interface is further structured to determine a second depository partner computer system from the established reciprocal backup relationships; and
the reciprocal backup agent is further structured to transmit to the determined second depository partner a second specified data for backup to storage of the determined second depository partner.

146. The system of claim 145 wherein the specified data and the second specified data is the same, thereby providing a redundant backup strategy.

147. The system of claim 145 wherein the specified data and the second specified data are different data.

148. The system of claim 145 wherein a portion of the specified data and a portion of the second specified data is the same and a portion of the specified data and a portion of the second specified data is different.

149. The system of claim 111, the interface further structured to allow removal of a reciprocal backup relationship with one of the depository computer systems.

150. A computer-implemented method for establishing a reciprocal backup relationship between computer systems connected over a network, comprising:
receiving an invitation request to a reciprocal backup relationship with an originating computer system, the request having an associated requested amount of backup storage; and
determining whether to support the requested amount of backup storage and responding to the received invitation with the determination including:
negotiating with the originating computer system for a different amount of backup storage than the requested amount associated with the invitation request by, responding to the received invitation indicating the different amount of backup storage available;
indicating an amount of reciprocal backup storage desired from the originating computer system; and
receiving a response from the originating computer system that indicates whether the amount of reciprocal backup storage is accepted by the originating computer system.

151. The method of claim 150, the responding to the received invitation with the determination, further comprising:
responding to the received invitation indicating an amount of reciprocal backup storage desired from the originating computer system.

152. The method of claim 151, further comprising:
indicating in the responding to the received invitation a cost associated with requested amount of backup storage.

153. The method of claim 150 wherein the responding to the received invitation with the determination indicates a determination to support the requested amount of backup storage.

154. The method of claim 153, further comprising:
receiving data to be backed up from the originating computer system;
allocating backup storage; and
storing the received data in the allocated backup storage.

155. The method of claim 154, further comprising:
when a request for restoration of data is received from the originating computer system,
determining a location of the requested data in the backup storage;
retrieving the requested data from the determined location; and
forwarding the retrieved data to the originating computer system.

156. The method of claim 154 wherein at least a portion of the received data is encrypted.

157. The method of claim 154 wherein the received data is a file, a directory, or an application-specific data structure.

158. The method of claim 154, further comprising:
automatically purging data from the allocated backup storage as needed.

159. The method of claim 150, further comprising:
receiving a request from the originating computer system to perform a backup of specified data or a restore of requested data.

160. The method of claim 150 wherein the network is a wide-area network, a local area network, or the Internet.

161. The method of claim 150, further comprising:
receiving a request for removal of the reciprocal backup relationship; and
removing access by the originating computer system to a corresponding backup storage.

162. The method of claim 161, further comprising:
automatically purging data from the corresponding backup storage.

163. The method of claim 150, the negotiating further comprising:
responding to the received invitation indicating the different amount of backup storage available; and
indicating an amount of reciprocal backup storage desired from the originating computer system.

164. The method of claim 150, the negotiating further comprising:
receiving a response from the originating computer system that indicates that the different amount of available backup storage is accepted by the originating computer system, thereby establishing the reciprocal backup relationship with the originating computer system.

165. A computer-readable memory medium containing instructions for controlling a computer processor to electronically establish a reciprocal backup relationship between computer systems connected over a network, by:
  receiving an invitation request to a reciprocal backup relationship with an originating computer system, the request having an associated requested amount of backup storage;
  determining whether to support the requested amount of backup storage;
  negotiating with the originating computer system for a different amount of backup storage than the requested amount associated with the invitation request; and
  responding to the received invitation with the determination.

166. The memory medium of claim 165, the responding to the received invitation with the determination, further comprising:
  responding to the received invitation indicating an amount of reciprocal backup storage desired from the originating computer system.

167. The memory medium of claim 165, further containing instructions that control the computer processor to establish the reciprocal backup relationship by:
  receiving a request from the originating computer system to perform a backup of specified data or a restore of requested data.

168. The memory medium of claim 165 wherein the network is a wide-area network, a local area network, or the Internet.

169. The memory medium of claim 165, further containing instructions that control the computer processor to establish the reciprocal backup relationship by:
  when it is determined to support the requested amount of backup storage, responding to the received invitation to indicate that the reciprocal backup relationship is supported.

170. The memory medium of claim 169, further containing instructions that control the computer processor by:
  receiving data to be backed up from the originating computer system;
  allocating backup storage that corresponds to the originating computer system; and
  storing the received data in the allocated backup storage.

171. The memory medium of claim 170, further containing instructions that control the computer processor by:
  when a request for restoration data is received from the originating computer system,
    determining a location of the requested data in the backup storage;
    retrieving the requested data from the determined location; and
    forwarding the retrieved data to the originating computer system.

172. The memory medium of claim 170 wherein at least a portion of the received data is encrypted.

173. The memory medium of claim 170 wherein the received data is a file, a directory, or an application-specific data structure.

174. The memory medium of claim 170, further comprising instructions for controlling the computer processor to automatically purge data from the allocated backup storage as needed.

175. The memory medium of claim 169, further containing instructions that control the computer processor by:
  receiving a request for removal of the reciprocal backup relationship; and
  removing access by the originating computer system to the corresponding backup storage.

176. The memory medium of claim 175, further containing instructions that control the computer processor to automatically purge data from the corresponding backup storage.

177. The memory medium of claim 165 wherein the negotiating with the originating computer system for a different amount of backup storage further comprises:
  responding to the received invitation indicating the different amount of backup storage available; and
  indicating an amount of reciprocal backup storage desired from the originating computer system.

178. The memory medium of claim 165 wherein the negotiating with the originating computer system for a different amount of backup storage further comprises:
  responding to the received invitation indicating the different amount of backup storage available;
  indicating an amount of reciprocal backup storage desired from the originating computer system; and
  receiving a response from the originating computer system that indicates whether the amount of reciprocal backup storage is accepted by the originating computer system.

179. The memory medium of claim 165 wherein the negotiating with the originating computer system for a different amount of backup storage further comprises:
  responding to the received invitation indicating the different amount of backup storage available;
  indicating an amount of reciprocal backup storage desired from the originating computer system; and
  receiving a response from the originating computer system that indicates that the different amount of available backup storage and the amount of reciprocal backup storage desired from the originating computer system are accepted by the originating computer system, thereby establishing the reciprocal backup relationship with the originating computer system.

180. A reciprocal backup system in a depository computer system connected by a network in a peer-to-peer relationship to at least one originating computer system comprising:
  a reciprocal backup negotiation mechanism that is structured to receive from the originating computer system an invitation request to a reciprocal backup relationship with the originating computer system, the request having an associated requested amount of backup storage;
    determine whether to support the requested amount of backup storage;
    negotiate with the originating computer system for a different amount of backup storage than the requested amount associated with the invitation request; and
    respond to the received invitation with the determination; and
  a reciprocal backup agent that is structured to electronically receive data from the originating partner for backup.

181. The system of claim 180 wherein the response to the received invitation indicates an amount of reciprocal backup storage desired from the originating computer system.

182. The system of claim 180 wherein the response to the received invitation indicates a determination to support the requested amount of backup storage.

183. The system of claim 180 wherein the network is a wide-area network, a local area network, or the Internet.

184. The system of claim 180 wherein the reciprocal backup agent is structured to allocate backup storage.

185. The system of claim 184 wherein the backup agent is structured to store the received data in the allocated backup storage.

186. The system of claim 184 wherein the backup agent is structured to automatically purge data from the allocated backup storage as needed.

187. The system of claim 184 wherein the reciprocal backup agent is structured to:
receive a request for removal of the reciprocal backup relationship; and
remove access by the originating computer system to the allocated backup storage.

188. The system of claim 187, wherein the backup agent is structured to automatically purge data from the allocated backup storage.

189. The system of claim 180 wherein the backup agent is further structured to receive a request to restore previously backed up data.

190. The system of claim 180 wherein the backup agent structured to:
determine a location of the previously backed up data;
retrieve the previously backed up data from the determined location; and
forward the retrieved data to the originating computer system.

191. The system of claim 180 wherein at least a portion of the received data is encrypted.

192. The system of claim 180 wherein the received data is a file, a directory, or an application-specific data structure.

193. The system of claim 180 wherein the negotiation mechanism is structured to:
respond to the received invitation indicating the different amount of backup storage available; and
indicate an amount of reciprocal backup storage desired from the originating computer system.

194. The system of claim 180 wherein the negotiation mechanism is structured to:
respond to the received invitation indicating the different amount of backup storage available;
indicate an amount of reciprocal backup storage desired from the originating computer system; and
receive a response from the originating computer system that indicates whether the amount of reciprocal backup storage is accepted by the originating computer system.

195. The system of claim 194 wherein the received response indicates that the different amount of available backup storage and the amount of reciprocal backup storage desired from the originating computer system are accepted by the originating computer system, thereby establishing the reciprocal backup relationship with the originating computer system.

196. A method for automatic restoration of backup data to an originating computer system, the backup data stored according to a plurality of reciprocal backup relationships, comprising:
determining a portion of data to be restored from a first depository partner computer system, the portion of the data backed up according to an established reciprocal backup relationship with the first depository partner;
determining a second portion of data to be restored from a second depository partner computer system, the second portion of data backed up according to an established reciprocal backup relationship with the second depository partner;
requesting the determined portion of data from the first depository partner;
requesting the determined second portion of data from the second depository partner;
receiving and restoring the determined portion and the determined second portion to effectuate restoration of the backup data; and
wherein the restoring of the determined portion and the determined second portion to effectuate restoration of the backup data are not performed if the receiving of the determined portion and determined second portion are not completed correctly.

197. The method of claim 196 wherein multiple depository partners have previously backed up the portion of the data and the determining of the portion of data to be restored from the first depository partner selects between the multiple depository partners to determine the first depository partner from which the portion of data is to be restored.

198. The method of claim 196 wherein the receiving and restoring of the determined portion and the determined second portion are processed according to a backup schedule.

199. The method of claim 196 wherein the receiving of the determined portion or the determined second portion are received from a caching server.

200. The method of claim 196 wherein the first depository partner and the second depository partner are the same computer system.

201. The method of claim 196 wherein the first depository partner and the second depository partner are different computer systems.

202. The method of claim 196 wherein the restoring further comprises restoring to a target location that is not the original location.

203. The method of claim 196 wherein the portion of the data to be restored and the second portion of the data to be restored comprise a complete restoration of data of the originating computer system.

204. The method of claim 203 wherein the restoring of the determined portion and the determined second portion to effectuate restoration of the backup data are not performed if the receiving of the determined portion and determined second portion are not completed correctly.

205. A computer-readable memory medium containing instructions for controlling a computer processor to automatically restore backup data to an originating computer system, the backup data stored according to a plurality of reciprocal backup relationships, by:
determining a portion of data to be restored from a first depository partner computer system, the portion of the data backed up according to an established reciprocal backup relationship with the first depository partner;
determining a second portion of data to be restored from a second depository partner computer system, the second portion of data backed up according to an established reciprocal backup relationship with the second depository partner;
requesting the determined portion of data from the first depository partner;
requesting the determined second portion of data from the second depository partner; and
receiving and restoring the determined portion and the determined second portion to effectuate restoration of the backup data;

wherein the portion of the data to be restored and the second portion of the data to be restored comprise a complete restoration of data of the originating computer system; and wherein the storing of the determined portion and the determined second portion to effectuate restoration of the backup data are not performed if the receiving of the determined portion and determined second portion are not completed correctly.

206. The memory medium of claim 205 wherein multiple depository partners have previously backed up the portion of the data and the determining of the portion of data to be restored from the first depository partner selects between the multiple depository partners to determine the first depository partner from which the portion of data is to be restored.

207. The memory medium of claim 205 wherein the receiving and restoring of the determined portion and the determined second portion are processed according to a backup schedule.

208. The memory medium of claim 205 wherein the receiving of the determined portion or the determined second portion are received from a caching server.

209. The memory medium of claim 205 wherein the first depository partner and the second depository partner are the same computer system.

210. The memory medium of claim 205 wherein the first depository partner and the second depository partner are different computer systems.

211. The memory medium of claim 205 wherein the restoring further comprises restoring to a target location that is not the original location.

212. The memory medium of claim 205 wherein the restoring of the determined portion and the determined second portion to effectuate restoration of the backup data are not performed if the receiving of the determined portion and determined second portion are not completed correctly.

213. A reciprocal backup system for automatic restoration of backup data to an originating computer system, the backup data stored according to a plurality of reciprocal backup relationships, comprising:

a storage interface that communicates with at least one storage repository associated with the originating computer system;

a restoration interface that is structured to determine a portion of data to be restored from a first depository partner computer system, the portion of the data backed up according to an established reciprocal backup relationship with the first depository partner; and determine a second portion of data to be restored from a second depository partner computer system, the second portion of data backed up according to an established reciprocal backup relationship with the second depository partner; and a reciprocal backup agent that is structured to request the determined portion of data from the first depository partner;

request the determined second portion of data from the second depository partner;

receive the determined portion and the determined second portion; and forward the received portions to the storage interface to effectuate restoration of the backup data to the storage repository;

wherein the backup agent does not perform forwarding the received portions to effectuate restoration of the determined portion and the determined second portion if the received determined portion and determined second portion are not received correctly.

214. The system of claim 213 wherein multiple depository partners have previously backed up the portion of the data and the restoration interface determines the portion of data to be restored from the first depository partner by selecting between the multiple depository partners.

215. The system of claim 213 wherein the backup agent receives the determined portion and the determined second portion according to a backup schedule.

216. The system of claim 213 wherein the backup agent receives the determined portion or the determined second portion from a caching server.

217. The system of claim 213 wherein the first depository partner and the second depository partner are the same computer system.

218. The system of claim 213 wherein the first depository partner and the second depository partner are different computer systems.

219. The system of claim 213 wherein the storage interface effectuates to a target location that is not the original location.

220. The system of claim 213 wherein the portion of the data to be restored and the second portion of the data to be restored comprise a complete restoration of data of the originating computer system.

221. A peer-to-peer reciprocal backup system in a network of computer systems, comprising:

an originating computer system that is structured to:

establish a reciprocal backup relationship with preselected one of the computer systems identified as peers of the originating computer system, the relationship specifying an amount of backup storage for backups of data from the originating computer system on the pre selected computer systems and an amount of reciprocal backup storage available on the originating computer system for storing backups of data from the pre selected computer systems;

transmit data to the pre-selected computer systems to be backed up according to the established reciprocal backup relationship; and receive data from the pre selected computer systems to be backed up according to the established reciprocal backup relationship;

a depository computer systems structured to:

participate as one of the computer systems identified as peers of the originating computer system in establishing the reciprocal backup relationship with the originating computer system;

receive data from the originating computer system to be backed up according to the established reciprocal backup relationship; and transmit data to the originating computer system to be backed up according to the established reciprocal backup relationship.

222. The backup system of claim 221 wherein the originating computer system is further structured to:

request previously backed up data from the pre selected computer systems; and receive previously backed up data from the pre selected computer systems responsive to the request; and wherein the depository computer systems is further structured to send the requested data to the originating computer system upon receiving a restore request.

223. The backup system of claim 221 wherein the originating computer system is further structured to:
  request a reciprocal backup relationship with the depository computer systems; and
  negotiate for an amount of storage for backups to storage on the depository computer systems by specifying a desired amount of storage for backups from the originating computer system; and
    receiving a response that indicates that the desired amount of storage for backups is available along with an indication of a reciprocal desired amount of storage.

224. A method for performing peer-to-peer reciprocal backup in a network of computer systems, comprising:
  establishing a reciprocal backup relationship between an originating partner computer system ("originating partner") and a depository partner computer system ("depository partner"), the relationship specifying an amount of backup storage for backups of data from the originating partner on the depository partner and an amount of reciprocal backup storage on the originating partner for storing backups of data from the depository partner, the depository partner pre-selected from one or more computer systems identified as peers of the originating partner;
  transmitting data from the originating partner to the depository partner to be backed up according to the established reciprocal backup relationship;
  storing the data transmitted from the originating partner on backup storage of the depository partner;
  transmitting data from the depository partner to the originating partner to be backed up according to the established reciprocal backup relationship; and
  storing the data transmitted from the depository partner on backup storage of the originating partner.

225. The method of claim 224, further comprising:
  requesting a copy of previously backed up data from the depository partner;
  transmitting the requested data from the depository partner to the originating partner in response to the request; and
  storing the data transmitted from the depository partner in a storage location of the originating partner to restore the requested data.

226. The method of claim 224, the establishing the reciprocal backup relationship between the originating partner and the depository partner further comprising:
  requesting a reciprocal backup relationship with the depository partner;
  negotiating for an amount of storage for backups to storage on the depository partner by, specifying a desired amount of storage for backups from the originating partner; and
    receiving a response that indicates that the desired amount of storage for backups is available along with an indication of a reciprocal desired amount of storage.

227. A peer-to-peer reciprocal backup system in a network of computer systems, comprising:
  an originating computer system that is structured to:
    establish a reciprocal backup relationship with one of one or more pre-selected computer system identified as peers of the originating computer system, the relationship specifying an amount of backup storage for backups of data from the originating computer system on the one of the one or more identified computer system and an amount of reciprocal backup storage available on the originating computer system for storing backups of data from the one of the one or more identified computer system; and
    transmit data to be backed up according to the established reciprocal backup relationship; and
  a depository computer system that is structured to:
    participate as the one of the one or more identified computer system in establishing the reciprocal backup relationship with the originating computer system; and
    receive data from the originating computer system to be backed up according to the established reciprocal backup relationship.

228. The system of claim 227 wherein the depository computer system is further structured to:
  receive a request from the originating computer system for data to be restored on the originating computer system; and
  locate and return previously backed up data that corresponds to the received request from the originating computer system for data to be restored.

229. The system of claim 227 wherein the originating system is further structured to:
  receive data from the depository computer system to be backed up according to the established reciprocal backup relationship.

230. The system of claim 227 wherein the originating computer system is further structured to:
  receive a request from the depository computer system for data to be restored on the depository computer system; and
  locate and return previously backed up data that corresponds to the received request from the depository computer system for data to be restored.

231. The system of claim 227 wherein the originating computer system is further structured to establish the reciprocal backup relationship by:
  issuing an invitation to the one of the one or more identified computer systems to establish the reciprocal backup relationship; and
  negotiating a requested amount of storage and an amount of reciprocal storage available.

232. The system of claim 227 wherein the originating computer system is further structured to:
  request a reciprocal backup relationship with the depository computer systems; and
  negotiate for an amount of storage for backups to storage on the depository computer systems by, specifying a desired amount of storage for backups from the originating computer system; and
    receiving a response that indicates that the desired amount of storage for backups is available along with an indication of a reciprocal desired amount of storage.

233. A software interface expressed as instructions stored in a computer-readable memory medium of an originating computer system for causing a computer processor to manage peer-to-peer reciprocal backup relationships in a network of computer systems, comprising:
  an originating partner portion that, when executed by a computer processor, establishes a reciprocal backup relationship that specifies an amount of backup storage for storing data from the originating computer system on one of one or more pre-selected computer systems identified as peers of the originating computer system and an amount of reciprocal backup storage available on the originating computer system for storing data from the one of the identified computer systems; and transmits data to be backed up on the one of the identified computer systems according to the established reciprocal backup relationship; and a depository partner portion that, when executed by a computer processor, receives data to be backed up according to the established reciprocal backup relationship; and causes the received data to be stored.

234. The software interface of claim 233, further comprising:

a second depository partner portion that is stored on a computer-readable memory medium of the one of the identified computer systems with which the reciprocal backup relationship is established and that, when executed, participates in the establishing of the reciprocal backup relationship, receives data from the originating partner portion, and causes the data to be stored on the one of the identified computer systems.

235. The software interface of claim 233, further comprising:

a second originating partner portion that is stored on the computer-readable memory medium of the one of the identified computer systems with which the reciprocal backup relationship is established and that, when executed, forwards data to the depository partner portion to be backed up on the originating computer system according to the established reciprocal backup relationship.

236. The software interface of claim 233 wherein the originating partner portion, when executed:

requests a reciprocal backup relationship with the one of the identified computer systems; and negotiates for an amount of storage for backups to storage on the one of the identified computer systems by, specifying a desired amount of storage for backups from the originating computer system; and receiving a response that indicates that the desired amount of storage for backups is available along with an indication of a reciprocal desired amount of storage.

237. The software interface of claim 233 wherein the originating partner portion, when executed, transmits at least a portion of the data to be backed up as encrypted data.

238. The software interface of claim 233 wherein the originating partner portion is further structured to determine a backup schedule and transmit the data to be backed up in accordance with the determined backup schedule.

239. The software interface of claim 233 wherein the originating partner portion is further structured to request restoration of data previously backed up according to the established reciprocal backup relationship.

240. The software interface of claim 233 wherein the depository partner portion is further structured to receive a request for data to be restored.

241. The software interface of claim 233 wherein the transmitted data to be backed up is a file, a directory, or an application-specific data structure.

* * * * *

UNITED STATES PATENT AND TRADEMARK OFFICE
CERTIFICATE OF CORRECTION

PATENT NO.         : 7,328,366 B2  
APPLICATION NO. : 10/838293  
DATED                 : February 5, 2008  
INVENTOR(S)       : Eric Michelman It is certified that error appears in the above-identified patent and that said Letters Patent is hereby corrected as shown below:

Column 39  
Line 58, "the method of claim 37" should read as --the method of claim 35--.

Column 53  
Line 5, "wherein the storing" should read as --wherein the restoring--.

Column 56  
Line 8, "system" should read as --systems--.

Signed and Sealed this

Sixth Day of January, 2009

JON W. DUDAS  
*Director of the United States Patent and Trademark Office*